US012603189B2

(12) United States Patent
    Crichlow

(10) Patent No.: US 12,603,189 B2
(45) Date of Patent:      Apr. 14, 2026

(54) DEVICES, SYSTEMS, AND METHODS FOR CLOSURE OF DEEP GEOLOGICAL NUCLEAR WASTE DISPOSAL REPOSITORY

(71) Applicant: Henry Crichlow, Norman, OK (US)

(72) Inventor: Henry Crichlow, Norman, OK (US)

( * ) Notice: Subject to any disclaimer, the term of this patent is extended or adjusted under 35 U.S.C. 154(b) by 671 days.

(21) Appl. No.: 17/981,272

(22) Filed: Nov. 4, 2022

(65) Prior Publication Data

US 2024/0153661 A1      May 9, 2024

(51) Int. Cl.
    *G21F 9/00*      (2006.01)
    *B09B 1/00*      (2006.01)
    *G21F 9/36*      (2006.01)
(52) U.S. Cl.
    CPC ................ *G21F 9/36* (2013.01); *B09B 1/008*
                                                (2013.01)
(58) Field of Classification Search
    CPC .................................. G21F 9/36; B09B 1/008
    USPC ......................................................... 588/17
    See application file for complete search history.

(56) References Cited

U.S. PATENT DOCUMENTS

| | | | |
|---|---|---|---|
| 2020/0269293 A1* | 8/2020 | Crichlow | B09B 3/20 |
| 2020/0273591 A1* | 8/2020 | Muller | G21F 5/008 |
| 2020/0411206 A1* | 12/2020 | Crichlow | G21F 1/02 |
| 2024/0105353 A1* | 3/2024 | Muller | G21F 9/24 |

* cited by examiner

*Primary Examiner* — James E McDonough
(74) *Attorney, Agent, or Firm* — Eric Kelly

(57)                ABSTRACT

Devices, systems, and methods are used to seal and close a deeply located waste repository such that waste and byproducts thereof within the deeply located waste repository are prevented from migrating upwards past a modified cap-zone over geologically relevant time. The waste repository is located within a deep geologic formation. The modified cap-zone is located above the deep geologic formation and below a terrestrial surface of the Earth. The modified cap-zone is a portion of a cap-zone that gets modified by: (1) having at least one radial-hole made into the cap-zone; (2) reaming away portions of the cap-zone rock from around a wellbore that passes through the cap-zone to form a void-volume; (3) filling the void-volume with a crushed rock composite; (4) melting the crushed rock within the void-volume and native and intact rock of the cap-zone; and then (5) cooling that formally melted rock to yield the modified cap-zone.

22 Claims, 13 Drawing Sheets

Top View

NOT TO
SCALE

DEVICES, SYSTEMS, AND METHODS FOR CLOSURE OF DEEP GEOLOGICAL NUCLEAR WASTE DISPOSAL REPOSITORY

TECHNICAL FIELD OF THE INVENTION

The present invention relates in general to sealing access to a geologically deeply located waste repository (with waste) and more specifically to using pyro-metamorphosis in a cap zone above the deeply located waste repository to implement a robust and long-lasting seal in that cap zone to prevent migration of waste materials out of the deeply located waste repository.

COPYRIGHT AND TRADEMARK NOTICE

A portion of the disclosure of this patent application may contain material that is subject to copyright protection. The owner has no objection to the facsimile reproduction by any-one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Today (circa 2022) there is a massive quantity of nuclear waste accumulating across the Earth. There are essentially two major types of nuclear waste. High-level (nuclear/radioactive) waste (HLW) from the generation of electric power in nuclear fired power plants (which generate spent nuclear fuel rods [SNF]), military nuclear operations; and low-level waste (LLW) from other industrial radioactive sources and production systems. Both types of radioactive waste must be addressed, controlled, and disposed of safely. This patent application addresses safe, economically feasible, physically feasible, and politically feasible devices, systems, and methods for the long-term storage (disposal) these types of (radioactive) waste; and how to importantly prevent and/or mitigate migration of the dangerous waste away from the given deep geological storage repositories.

Current prior art disposal of HLW in vertical wellbores involves placement of HLW within waste capsules that are then usually in a bottom third section of the vertical wellbores. Plugs have been placed above the emplaced waste capsules (with the HLW). Above these plugs are various backfill materials which are designed to swell and fill up the vertical wellbores above the plugs. However, in practice there are some structural/physical changes which may occur in and near the wellbore and native rock formation interface region between the drilled-out wellbore and the native rock formation, as a result of the drilling process. Fissures, microfractures, and/or permeability changes may occur at the interface between the wellbore and into the native rock, sometimes called "near-wellbore damage" in the oil drilling industry. These changes with respect to HLW disposal are undesirable as these changes may contribute to and may allow fluid bypass, migration, and/or movement of (radioactive) waste material(s) over time out of the intended/desired waste repository.

The feasibility of efficient deep geological waste disposal relies upon constructing, implementing, creating, placing, locating, and/or forming an effective seal/plug between the borehole/wellbore (that leads to the waste repository) and the ecosphere (including local water tables), that ensures the waste, its components, and/or its byproducts do not communicate with the surface biosphere (or local water table) through the borehole or the near-borehole region. This requires that the seal/plug subsystem be reliable and long-lasting with little degradation over tens of thousands of years.

Additionally, a disturbed zone usually develops next to and surrounds the borehole because of drilling damage, formation of mud cake on the rock face, and/or limited fissures in the rock caused by the resulting stress differences created by the mechanics of the borehole drilling operations. The near-borehole damaged zone may have a zone where microfractures (which are disseminated throughout the rock mass) and macrofractures (which are essentially microfractures that have coalesced into visible features) increase the permeability of the rock surrounding and next to the borehole.

The ability of standard techniques to effectively seal the wellbore is also generally unknown. An innovative system for sealing the disposal/repository zone and preventing and/or mitigating the migration of radioactive materials (such as, but not limited to, radionuclides) is therefore needed and it should address some of the uncertainties in seal design, such as long-term degradation of seals and effective sealing within the hear-borehole damaged zone surrounding and next to the borehole to prevent advection and movement of radioactive materials away from the disposal/repository zone.

Ideally, borehole seals should provide complete and permanent isolation of the waste stored there below, preventing liquids and gases from flowing upwards through the borehole and its associated disposal zone more easily than through the surrounding geological barrier. Sealing emplacement methods and systems must be as reliable as possible and the seals them-selves must have as low a risk of failure as is reasonably practicable. In addition, borehole seals should be resistant to thermal, chemical, and mechanical alteration under the anticipated range of downhole temperatures, pressures, and geochemical conditions.

In a first prior art approach, disposal of nuclear waste in boreholes, particularly vertical boreholes has been based on placing the waste capsules in the bottom third of the vertical wellbore and then mechanically sealing a section or the rest of the wellbore above the waste zone to prevent radionuclide advection and/or migration of the waste products. The seal may limit and/or delay vertical radionuclide transport, particularly away from the disposal zone. In the prior art, the upper portion of the vertical borehole includes the seal zone or cap zone where seals and plugs (bentonite seals, cement plugs, silica sand/crushed rock ballast) were emplaced directly against the borehole wall, and the upper vertical borehole zone where plugs are emplaced against the cemented casing of the vertical borehole. These seals are designed to act directly against the host rock to inhibit vertical fluid flux and radionuclide transport up the borehole. These prior art sealing options include materials like concrete, bentonite, and asphalt. Although this redundant system of multiple seals consisting of alternating layers of cement and bentonite is based upon standard accepted oilfield practices, the long-term performance of materials such as cement and bentonite is still uncertain. Concerns include the mechanical and chemical stability of these components over long periods of time (e.g., tens of thousands of years) and the effect of high temperatures and corrosive environments on the sealing devices/materials.

Another prior art approach has tried to provide sealing systems that are based on rock welding of a granite rock disposal/repository formation in which the waste capsules are disposed. In this specific prior art system, the nuclear waste is disposed of in a vertical wellbore in a granite rock layer and a section of the wellbore that is also still in this granite rock disposal repository layer is then thermally melted with a downhole heater to weld the wellbore shut, thereby closing the wellbore by this granite welded rock seal. In this prior art system, a section of the vertical wellbore within the granite disposal repository layer is first modified by moving a portion of the steel well casing (by mechanical means); and then heating the granite rock where the steel well casing has been removed with a downhole heater to melt the granite, which is then cooled to form a seal that is continuous across that particular section of the vertical wellbore system, and which is both limited hori- zontally and vertically. Note, in this prior art system the seal is implemented within granite disposal zone/repository; and as such, the formed seal is also then integral with the granite disposal zone/repository. This prior art method tries to melt the nearby vertical wellbore zone within the waste reposi- tory by downhole heaters and then allowing the melt to crystallize to remedy or "cure" the near-wellbore damage (physical changes) which may have occurred in the drilling process. See e.g., FIG. 1A which shows such a diagram of this prior art concept (that is under development at The University of Sheffield). In a sense, this prior art system tries to make a plug that is part of the native granite disposal zone/repository. Note, this granite rock welding process is also known as a pyro-metamorphic process.

Pyro-metamorphic processes occur naturally. For example, natural underground combustion has resulted in fine grained sedimentary rocks being metamorphosed into natural porcellanite which is a dense almost impermeable porcelain like product.

Pyro-metamorphic processes also exist and/or are used in human-made industrial applications. For example, in indus- try today (circa 2022), there are multiple processes, patents, and published patent applications that have described pyro- metamorphic processes that involve the manufacturing of sintered rock systems. Sintered rock synthesis emulates the natural process of heating a combination of rock and chemi- cal constituents, in the proper proportions and under con- trolled pressures, to make a dense, almost impermeable human-made rock product.

These two prior art systems have drawbacks which may still allow radionuclide migration away from the waste disposal repository over the very long time periods neces- sary for complete and safe disposal of HLW and/or the like dangerous waste materials.

The process of rock welding has some benefits; however, it still can be improved substantially. Better means are needed to provide a greater mitigation of the migration of radioactive waste materials away from the disposal zone/ repository. The technological embodiments of the current patent application include improvements to achieve more effective migration mitigation of waste radionuclides upwards from the disposal zone.

Shortcomings of the current rock welding system include but are not limited to: the inability to modify or control the quality and composition of the seal; the inability to provide sufficient lateral extension of the sealing operation away from the wellbore region such that upward movement or advection is fully prohibited; the requirement to implement the seal in the waste disposal zone/repository; and/or the like.

Recall, in the granite rock welding closure prior art system, the formed seal is implemented within the granite disposal zone/repository; and as such, the formed seal is also then integral with the granite disposal zone/repository. Whereas, in contrast, in this current patent application the formed seal may be implemented within a cap zone that is different and separate from the disposal/repository forma- tion zone. In this patent application, the cap zone(s) may be separate from and located above the disposal/repository formation zone.

Further, based on inherent shortcomings in the prior art of nuclear waste disposal, there exists a critical need for an effective, long lasting, robust, repeatable, economical method for developing and utilizing an acceptable nuclear waste disposal process for nuclear waste products; a process that precludes the need for all the current prior art expensive, time-consuming, and dangerous intermediate operations that are currently being used or contemplated to render the surface nuclear waste into a form that eventually, still has to be buried in deep underground repositories. An approach is needed that minimizes or foregoes these intermediate steps. To solve the above-described problems, the present inven- tion provides systems, methods, and steps to dispose of the nuclear waste currently accumulating on the surface.

The novel approaches taught as part of this patent appli- cation provide systems, methods, and steps wherein the HLW/SNF waste disposal operations may go directly from the existing fuel assembly rod cooling ponds to the under- ground disposal repository in deep formations with minimal additional effort and without the additional need to protect the waste from migration with expensive add-on systems like titanium drip shields to cover and protect the waste from migrating rainwater.

There is a long felt, but unmet, need for systems, methods, steps, means, and/or mechanisms that would allow HLW/ SNF which exists in a variety of difficult to manage physical forms (e.g., liquids, sludges, powders, solids, etc.) to be finally and/or permanently stored and/or disposed of very deep within the Earth and also in substantial quantities for tens of thousands of years.

A need, therefore, exists for new systems, methods, steps, means, and/or mechanisms to safely dispose of radioactive waste in a controlled manner along with depositing these radioactive wastes in a system that is designed to meet the requirements of public acceptance along with regulatory guidelines which include stringent protection of the eco- sphere.

It is to these ends that the present invention has been developed to dispose of the HLW products in deep human- made systems that can be effectively sealed off from the ecosphere by human implemented geological closure means (e.g., pyro-metamorphosis) and at great depths below the earth's surface. It is to these ends that the present invention has been developed.

BRIEF SUMMARY OF THE INVENTION

The present invention relates in general to containment, storage, and/or disposal of radioactive materials (e.g., nuclear waste); and more specifically to the containment, storage, and/or disposal of radioactive materials (e.g., nuclear waste) within deeply located geological formations of predetermined characteristics (such as, but not limited to predetermined rock properties) in which geological repositories may be implemented as deep human-made caverns (referred to as SuperSILOs) and/or as deep horizontal wellbores in disposal rock formations (referred to as Super-LATs). Additionally, embodiments of the present invention focus on the need to manage, prevent, and/or mitigate the migration of (radioactive) waste materials away from the waste disposal repositories/zones by development and implementation of robust and long lasting physical geologic closure seals, within overlain cap zones that are separated from and located above the waste disposal repositories/ zones. These robust and long lasting physical geologic closure seals may be implemented by applying pyro-metamorphosis to modify selected cap zone rock formations above the waste disposal repositories/zones to form continuous mechanical seals in these cap zones to prevent and/or mitigate the migration of dangerous materials from out of the waste disposal repositories/zones. Pyro-metamorphosis may involve the use of high temperatures and relatively low pressures (e.g., in some cases as low as atmospheric pressure) to metamorphose or change cap zone rocks physically, structurally, and chemically, resulting in a continuous geologic closure seal within the given cap zone that separated and above the waste disposal repositories/zones.

To minimize the limitations in the prior art, and to minimize other limitations that will be apparent upon reading and understanding the present specification, various embodiments of the present invention may describe devices, systems, and/or methods that are used to (fluid) seal and/or close a deeply located waste repository such that waste and byproducts thereof (such as, but not limited to, radionucleotides) within the deeply located waste repository (or above the waste repository but below a modified cap-zone) are prevented from migrating upwards past a modified cap-zone over geologically relevant time (such as, but not limited to, at least a thousand years). The waste repository is located within a deep geologic formation. The modified cap-zone is located above the deep geologic formation and below a terrestrial surface of the Earth. The modified cap-zone is a portion of a cap-zone that gets modified by: (1) having at least one radial-hole (laterally/horizontally) made into the cap-zone rock; (2) reaming away portions of the cap-zone rock from around a vertical-wellbore that passes through the cap-zone to form a void-volume; (3) filling the void-volume with crushed rock (or a crushed rock composite with a flux chemical additive); (4) melting the crushed rock within the void-volume and native and intact rock of the cap-zone; and then (5) cooling that formerly melted rock to yield the modified cap-zone. The modified cap-zone may be fluid impermeable and may prevent waste (and/or its byproducts) from getting past this modified cap-zone.

To minimize the limitations in the prior art, and to minimize other limitations that will be apparent upon reading and understanding the present specification, various embodiments of the present invention may describe devices, systems, methods, processes, and/or steps for the long-term protection of the HLW/SNF and/or radioactive waste products/materials, along with other radioactive waste forms, by providing a means to securely protect the surface environment by geologically sealing the deep disposed waste below a geological cap zone which is effective and long-lasting enough to preclude any waste or waste products from migrating away from the disposed waste repository/zone by either advection or other migration means.

In some embodiments, to emplace the waste, wellbore(s) may be drilled vertically from the Earth's terrestrial surface into the given target deep disposal/repository formation; and then a human-made cavern (SuperSILO) may be formed within that given deep disposal/repository formation or a mostly horizontal (lateral) wellbore (SuperLAT) may be formed within that given deep disposal/repository; and then the HLW/SNF/LLW waste may be emplaced within the given human-made cavern and/or within the horizontal wellbore.

Some embodiments may specifically address technical considerations, such as, but not limited to, disposal of HLW/SNF/LLW materials in human-made repositories implemented in deep geological formations. These waste disposal repositories may be, but are not limited to, the deep human-made caverns (SuperSILOs) and/or the deep human-made horizontal wellbores (SuperLATs).

Some embodiments of the present invention may be directed at disposal of a variety of HLW/SNF/LLW forms in naturally occurring deep geological formations; and to the formation/implementation of geological closure seal(s) within cap zone(s). The cap zone(s) and the geological closure seal(s) may both be separated, located, and selected above the deep disposal repository/zone. Thus, the cap zone(s) and the geological closure seal(s) may be overlain with respect to below located deep disposal repository/zone. Portions/sections of the cap zone(s) that bisect the vertical wellbore may be pyro-metamorphosis modified to mechanically seal that section of the vertical wellbore such that no migration of nuclear waste (e.g., in the form of radionuclides and/or other radioactive waste forms) may migrate vertically upwards and away from the waste repository to the ecosphere.

The invention focuses primarily on the utilization, formation, and implementation of modified cap zone(s) which may become as perfect of a mechanical seal as possible to hinder and/or prevent the upwards vertical movement of radionuclide material (and/or other radioactive waste forms) from the below located waste disposal repository. Novel technologies and integrated processes from other industries may be applied to achieve this goal. Specifically, the use of pyro-metamorphosis as a means of achieving the modification of the cap zone rock to satisfy these disposal goals by creating a 100% continuous geological seal across the wellbore sections within the cap zone(s).

In nature, overlain geologic formations known as "cap zones" occur above oil and gas deposits (reservoirs). These naturally occurring cap zones prohibit, prevent, and/or mitigate the high-pressure liquid oil and gaseous hydrocarbons from migrating upwards further from the source rock of the hydrocarbons. These cap zones have effectively trapped these high-pressure hydrocarbon fluids for millions of years, until penetrated by a drill bit to initiate petroleum production. These cap zones are large in areal extent (e.g., very often extend for many square miles areally) and are usually comprise hydraulically closed, tight, very low permeability, generally horizontal, rock formations; such as, but not limited to, shales. A similar confining function may be provided by the modified cap zones in embodiments of the present invention, that are configured to block, prohibit, prevent, mitigate, and/or limit upward migration of radioactive materials (such as, but not limited to, radionucleotides) from the below located waste disposal repository, by providing geologically closed seal(s) within the cap zone(s). The implemented geologically closed seal(s) within the cap zone(s) may mimic the very effective confining cap zone behavior in nature.

Some embodiments of the present invention may utilize sintered rock technology and/or pyro-metamorphosis as applied to geologically sealing vertical wellbores within cap zone(s) that are located separate and above deep nuclear waste disposal repositories/zones.

Some embodiments of the present invention may differ from the prior art by one or more of: (1) use of radial (and lateral/horizontal) holes within the rock formation of the cap zone, where the cap zone intersects a given section of vertical wellbore, wherein these radial holes may facilitate the melt process that results in formation of the geological closure seal, and wherein these radial holes may enlarge a size of the geological closure seal within the cap zone; (2) reaming out (and/or milling out) rock formation material within the cap zone, where the cap zone intersects a given section of vertical wellbore (such this section of the vertical wellbore will have a larger inside diameter than other sections of the vertical wellbore that have not been so enlarged), wherein this reaming/milling out may provide a location for melt initiation; (3) use of chemical additives combined with crushed cap zone rock fragments/material to enhance the pyro-metamorphosis process of this resulting combination material to the unmodified native cap zone rock in the cap zone, where the cap zone intersects a given section of vertical wellbore; (4) use of two or more geologic closure seals within two or more cap zones, wherein all such geologic closure seals and/or cap zone are separated and located above the waste disposal formation; combinations thereof; and/or the like.

In some embodiments, it may be a requirement of at least one embodiment, that the devices, systems, and/or methods are capable of protecting the environment from the deleterious effects of high-level nuclear waste (HLW), spent nuclear fuel (SNF), low-level nuclear waste (LLW), and/or byproducts thereof from upwards migration away from the deeply located geologic waste disposal repository formation.

It is an objective of the present invention to provide underground waste storage in deep closed geological systems, zones, and/or formations.

It is another objective of the present invention to implement deep geological disposal devices, systems, and/or methods for the long-term disposal of HLW/SNF//LLW and/or derivatives/byproducts, such as, but not limited to, spent nuclear fuel (SNF) in capsules, solid LLW products, waste in slurry, powder, and/or aggregate forms.

It is an objective of the present invention to allow the processing and disposing of large volumes (e.g., on the order of thousands of metric tons) of (nuclear and/or radioactive) waste (e.g., HLW and/or LLW); be effective and safe when implemented; be scalable exponentially; and/or provide the endpoint storage repository in the form of horizontal (lateral) wellbore(s) (SuperLAT(s)) and/or in the form of human-made cavern(s) (SuperSILO(s)), such that a variety of different waste forms may be stored/disposed of deeply underground within these waste disposal repository/zone(s).

It is another objective of the present invention to provide underground waste disposal repository storage of sufficient capacity for up to 500,000 pounds (lbs) or more of waste material.

It is another objective of the present invention to utilize and incorporate the presence/existence of sealing rock formations or cap zones, with implemented geologic closure seals therein, as in-situ mechanisms to protect the ecosphere, biosphere, and/or local water tables from the migration of (radioactive) waste materials out of the deeply located waste disposal repository/zone(s) that are located below the sealing rock formations or the cap zones.

It is another objective of the present invention to utilize and incorporate the presence/existence of sealing rock formations or cap zones, with implemented geologic closure seals therein, as in-situ mechanisms to protect the (radioactive) waste materials disposed of in deeply located human-made horizontal wellbores (SuperLATs) or in deeply located human-made caverns (SuperSILOs), there below the sealing rock formations or the cap zones.

It is another objective of the present invention to utilize induced pyro-metamorphic operations to modify the near wellbore damaged zone, where the vertical wellbore passes through the sealing rock formations or the cap zones, in such a manner to "heal" any and all damaged zone elements to form an effective impermeable and continuous geologic seal in the sealing rock formations or the cap zones.

It is another objective of the present invention to select from the available geological zones at least one appropriate overlain cap zone above the deeply location disposal repository zone that is demonstrably capable of functioning as a complete physical migration barrier to the (radioactive) waste material (and derivatives/byproducts thereof) stored in the deeply location disposal repository zone.

It is another objective of the present invention to implement surface and in-wellbore devices, systems, and methods to heat and melt at least some rock within the cap zone.

It is another objective of the present invention to melt rock material within a portion of the vertical wellbore that is passing through the cap zone, as well as, to melt some of the intact rock of that cap zone, and allowing this melt to cool, resolidify, and/or re-crystalize to provide a continuous geologic seal in and around the vertical wellbore section in the cap zone.

It is another objective of the present invention to implement controllable downhole in-wellbore heater devices that are capable of melting the sealing rock materials and/or formation in a reasonably short period of weeks.

It is another objective of the present invention to implement the downhole in-wellbore heater devices at selected, predetermined, desired, and/or optimal locations in the vertical wellbore, where the vertical wellbore passes through one or more overlain cap zones.

It is another objective of the present invention to separate the deeply located disposal repository zone(s) both vertically and physically from the cap zone(s) by using solid (impenetrable) wellbore plugs inserted in the wellbore above the deeply located disposal repository zone(s).

It is another objective of the present invention to prevent, restrict, prohibit, and/or mitigate the migration (movement) of (radioactive) waste materials (and/or derivatives/byproducts thereof) away from the deeply located disposal repository zone(s).

It is another objective of the present invention to prevent, restrict, prohibit, and/or mitigate the migration (movement) of (radioactive) waste materials (and/or derivatives/byproducts thereof) away from the deeply located disposal repository zone(s), by use of implemented continuous geologic closure seals in overlain cap zones, via controlled pyro-metamorphosis, that are located above the deeply located disposal repository zone(s).

It is another objective of the present invention to implement deeply located human-made horizontal (lateral) wellbores (SuperLATs) and/or deeply located human-made caverns (SuperSILOs) within the deeply located disposal repository zone(s) for storage/disposal of the (radioactive) waste.

It is another objective of the present invention to prevent, restrict, prohibit, and/or mitigate the migration (movement) of (radioactive) waste materials (and/or derivatives/byproducts thereof) away from the deeply located disposal repository zone(s) by creating an overlain significant lateral impermeable and continuous geologic "shield" (barrier) extending in two dimensions (x, y) areally above the deeply located disposal repository zone(s), "umbrella-like" to prevent vertical convective flow away upwards and away from the deeply located disposal repository zone(s). Note, the overlain significant lateral impermeable and continuous geologic "shield" (barrier) in the cap zone does also have a z dimension, i.e., does have some height.

It is another objective of the present invention to core section(s) of the cap zone rock, such as, but not limited to, during the vertical wellbore drilling process; and to mechanically process these rock core(s) for later use as backfill material to be melted to (fused to) the intact native rock in the cap zone that forms the side boundary of the wellbore in the cap zone, during the melt process.

It is another objective of the present invention to pulverize, pelletize (crush), smash, ground, grind, breakup, and/or the like the cap zone rock core(s) into smaller rock fragments for later use in the initiation and propagation of the melt process in the vertical wellbore section that passes through the cap zone.

It is another objective of the present invention to fill a selected section of the vertical wellbore internal volume, that is passing through a cap zone with the crushed cap zone rock core(s) material, which crushed material may also collectively surround the downhole in-wellbore heater when the downhole in-wellbore heater is placed into that section of the vertical wellbore. Note, the section the vertical wellbore within the cap zone that will receive the melting operation is not cased, i.e., it is native intact cap zone rock that surrounds the side of that section of the vertical wellbore.

It is another objective of the present invention to implement a plurality of radial (lateral/horizontal) holes extending into the native intact cap zone rock circumferentially around the section of the vertical wellbore that is passing through the cap zone that will receive melting operations, using down-hole "jet-drilling" means, wherein this plurality of radial holes allow the heat-generated liquid melt material to move more easily radially away from the vertical wellbore axis deeper into the cap zone.

It is another objective of the present invention to implement these radial holes to a lateral (horizontal) distance of at least five (5) times the radius of the disposal repository horizontal wellbore (SuperLAT); for example, in a twelve (12) inch radius of the disposal repository horizontal wellbore (SuperLAT) would then entail the radial holes having a lateral (horizontal) distance of about sixty (60) inches long, +/− six (6) inches.

It is another objective of the present invention to implement these radial holes to a lateral (horizontal) distance which is at least the diameter of the SuperSILO human-made cavern; for example, a five (5) foot diameter Super-SILO human-made cavern would entail radial holes having a lateral (horizontal) distance of at least five (5) feet, +/− six (6) inches.

It is another objective of the present invention to ream out, mill out, radially increase or widen, and/or the like, a cylindrical volume from in the vertical wellbore section that is located within the cap zone and into the surrounding native intact rock of the cap zone, that will be experiencing the melting operations, that is at least as high/tall as the height of the down-hole in-well heater device, to at least three (3) times the radius of the vertical wellbore sections that are immediately above and/or below the cap zone.

It is another objective of the present invention to control the qualities, properties, and composition of the continuous geologic seal that is implemented in the cap zone by using chemical additive materials that are added to the to be melted backfill materials, wherein these chemical additives may behave like a flux that may modify physical and/or chemical variations in the modified rock properties of the cap zones during and after the heating and cooling process.

It is another objective of the present invention to utilize a programmable and controllable downhole in-well heater device, that powered from the terrestrial surface, wherein the controller is capable of controllably heating and/or cooling the cap zone rock to reach its melting point for an extended period of several weeks, +/− two (2) days.

It is another objective of the present invention to utilize a programmable and controllable downhole in-well heater device in a manner to allow optimal and/or controlled cooling of the melt to allow recrystallization of the melt to modify and/or change the resultant grain structure, composition, and properties of the melt to mitigate convection/conduction of (radioactive) waste materials away from the deep below disposal repository zone because of reduced fluid transmissibility through the changed rock matrix of the melt in the cap zone.

It is another objective of the present invention to additionally plug the vertical wellbore at a select (predetermined) location above the melt section, after the melt process is completed, by implementing a wellbore cement plug extending a minimum of at least 400 feet, +/− twenty (20) feet placed above the cap zone section with the melt after that section of the cap zone has cooled.

It is yet another objective of the present invention to additionally plug and protect the vertical wellbore from material migration by utilizing bentonite drilling mud to fill the remaining vertical wellbore section above the melted now cooled section and/or above the upper wellbore cement plug, wherein this bentonite drilling mud fill may extend all the way up to the terrestrial surface.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

In some instances, some common items are left off of the drawings for clarity and ease of viewing. For example, in some instances specific devices, surface or downhole apparat-uses may not be shown in a given view but it may be obvious to a person of ordinary skill in the relevant arts (technical fields [e.g., oilfield drilling industries]) from the description, that these items may be present and/or used in the given embodiment.

FIG. 1B is a cross-

11 sectional view of a tool body and apparatus used for creating radial holes into a rock formation surrounding a given section of wellbore.

Figure 1A:
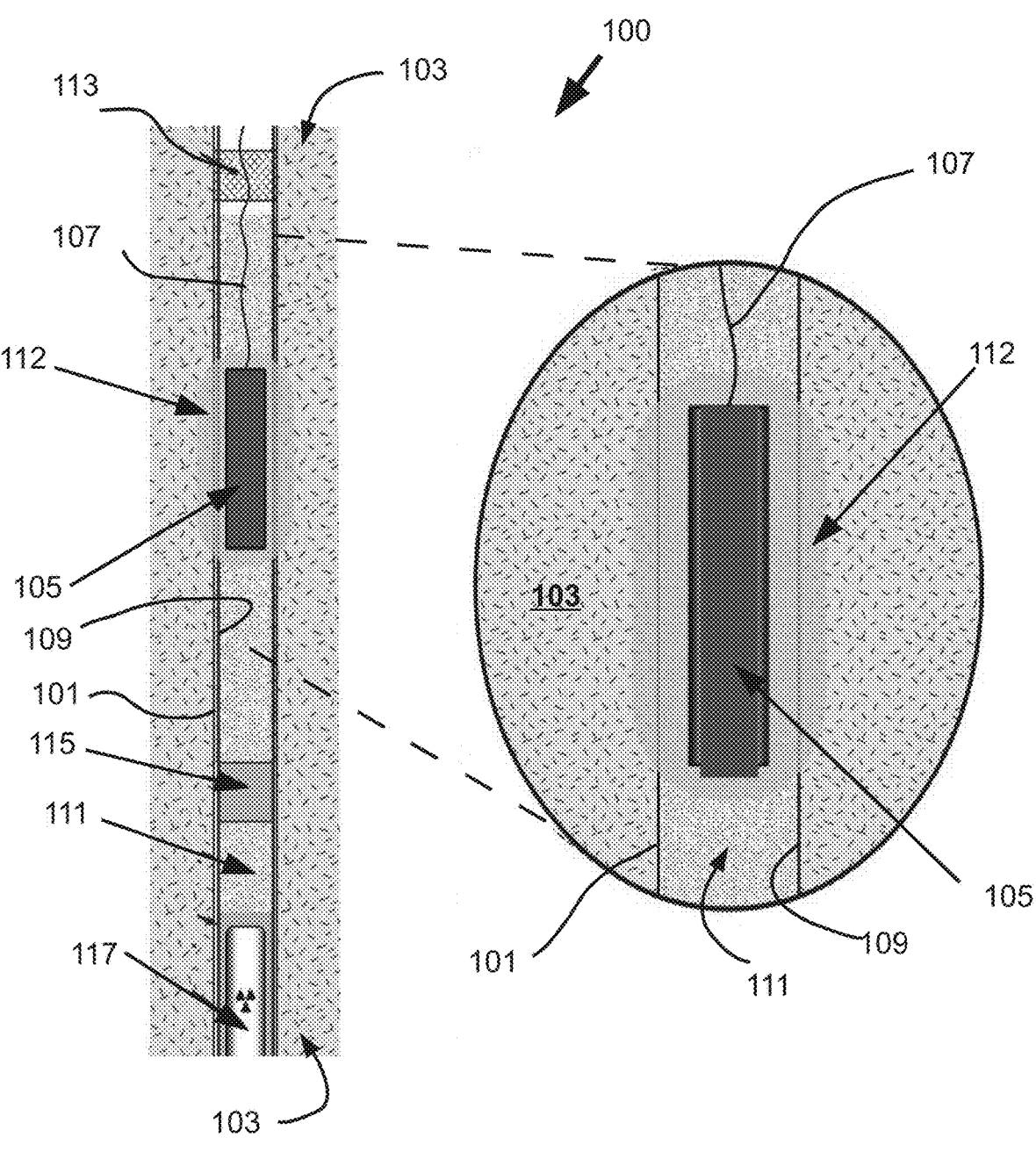
FIG. 1A is prior art that shows a cross section of granite rock melting operations being executed above a nuclear waste capsule that is emplaced within the same granite rock formation.
Figures 1B, 1C:
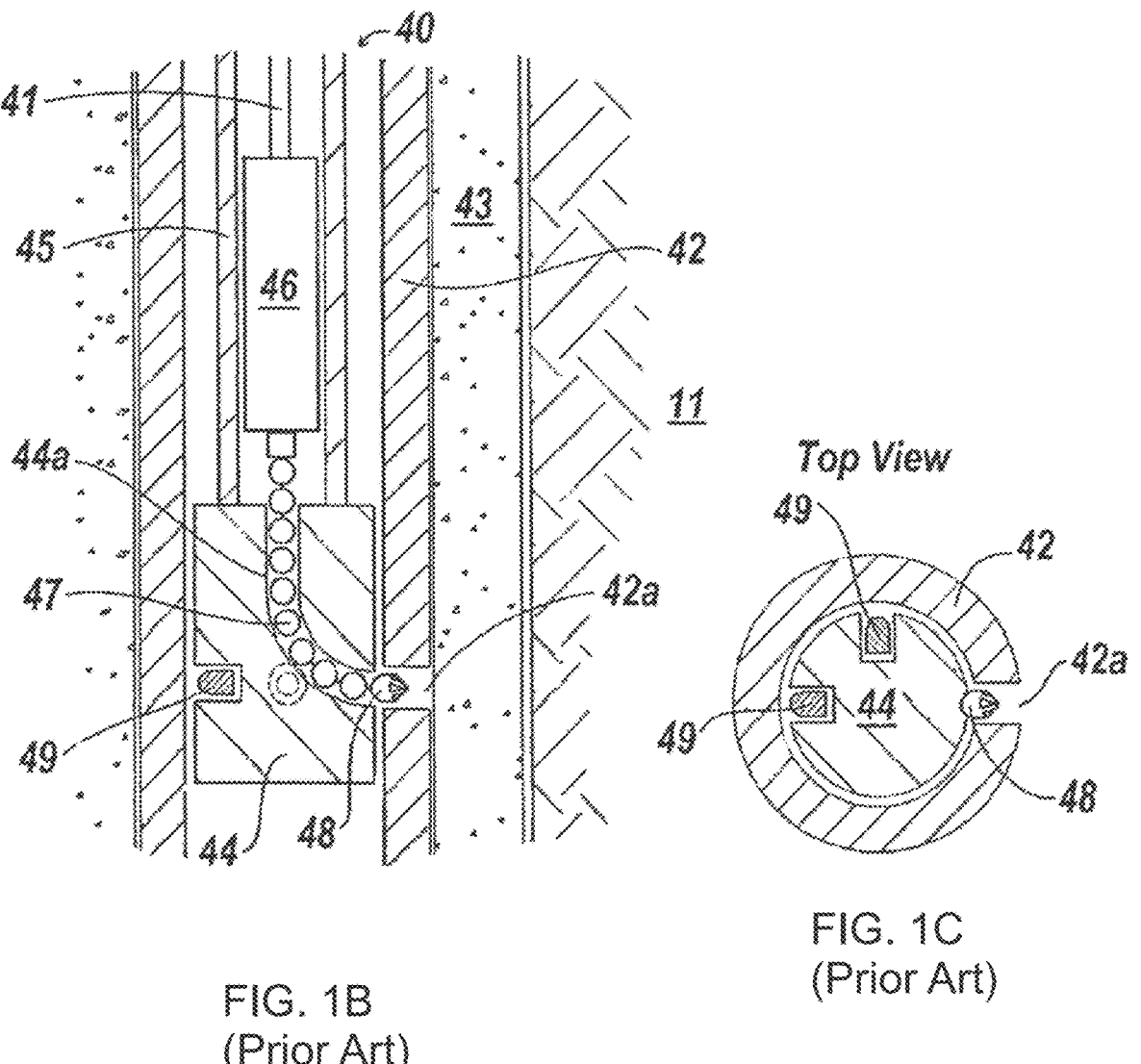
FIG. 1B is prior art, a reproduction of a FIG. 4A from preexisting U.S. Pat. No. 8,196,680.
Figure 4A:
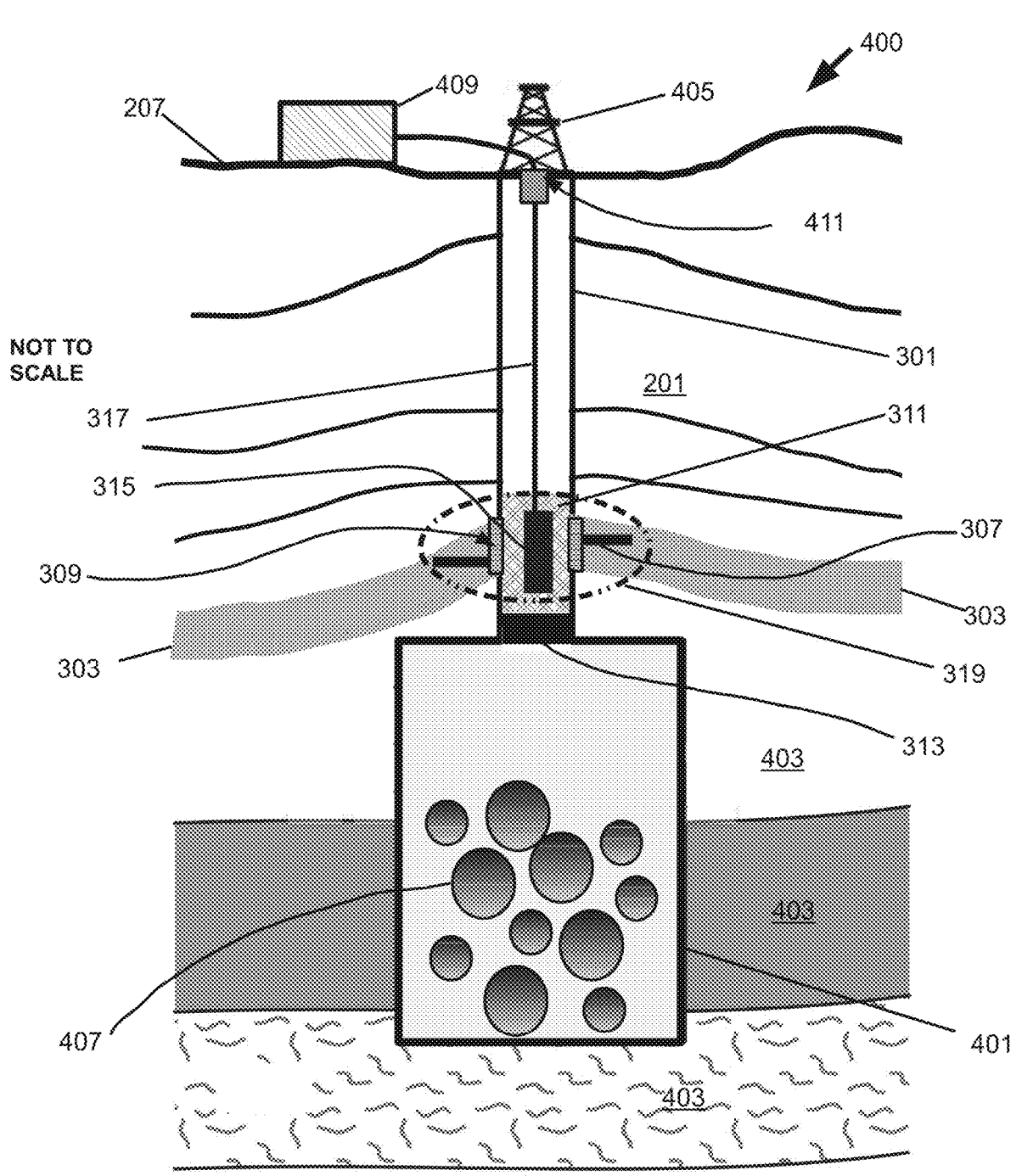
Figure 4B:
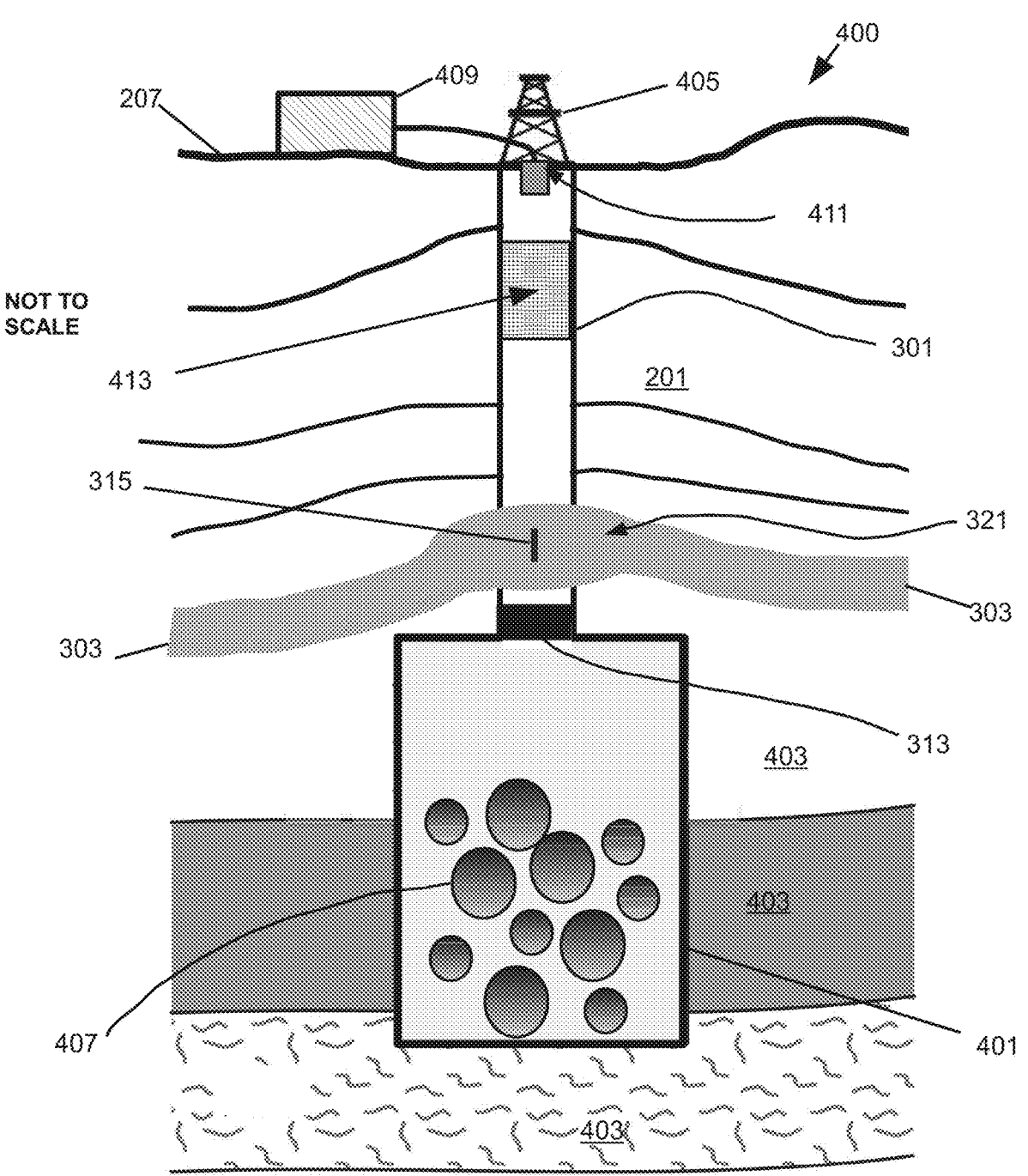

FIG. 1C is prior art, a reproduction of a FIG. 4B from preexisting U.S. Pat. No. 8,196,680; FIG. 1C is a top view of the tool body of FIG. 1B after having cut/started a radial hole.

Figure 1D:
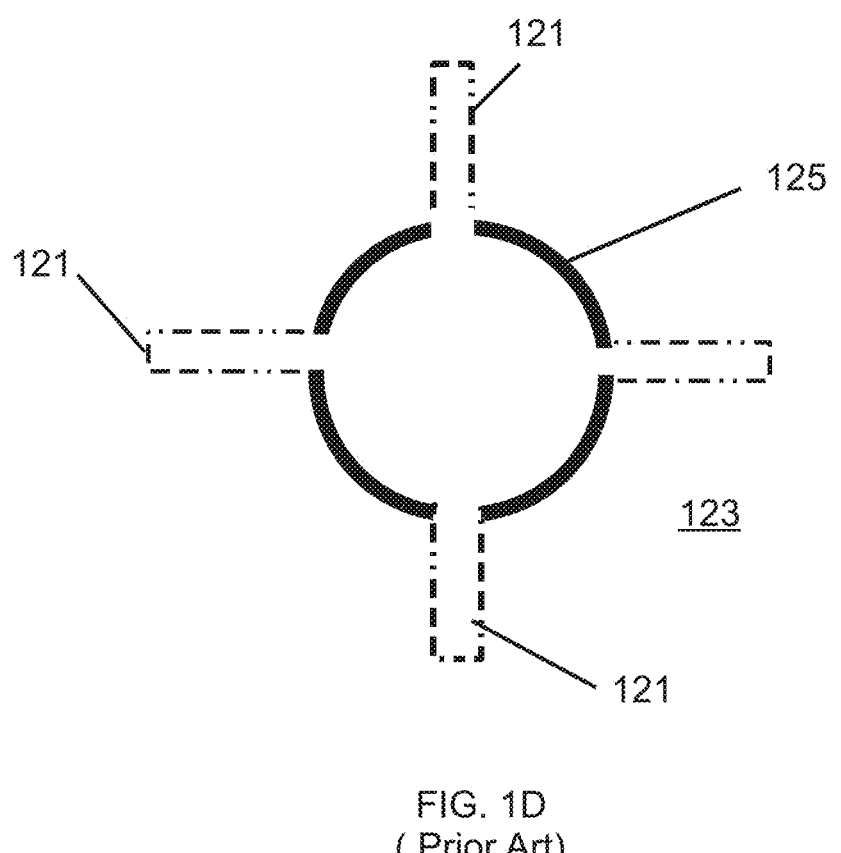

FIG. 1D is prior art that illustrates a top (plan) cross-sectional view of radial holes formed in an oil producing formation from a wellbore to increase production of oil from that given wellbore.

Figure 2A:
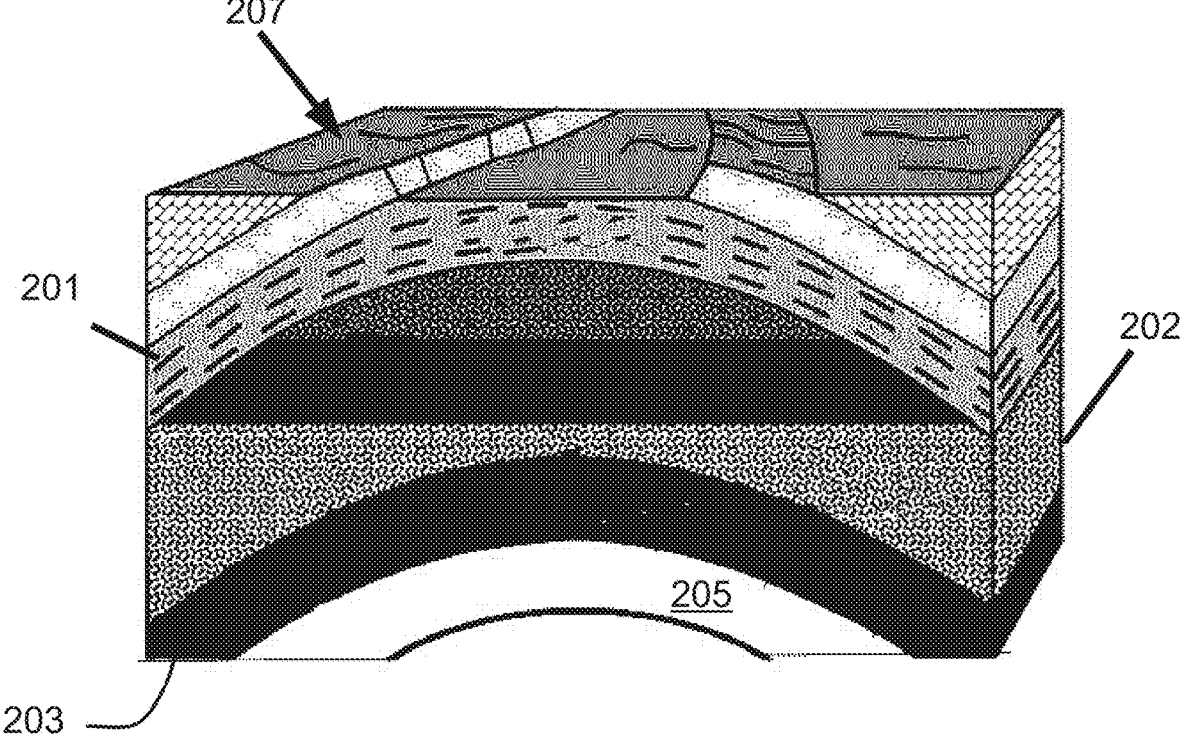

FIG. 2A illustrates a three-dimensional (3D) cross-section of typical and/or common geological zones that exist in many locations in the United States (U.S.), as well as, in many locations throughout the world, wherein at least one of these geological zones may be used as a waste disposal repository formation/zone and another geological zone, a particular overlain zone, may be used as a "cap-zone" (barrier layer) to the below located waste disposal repository formation/zone.

Figure 2B:
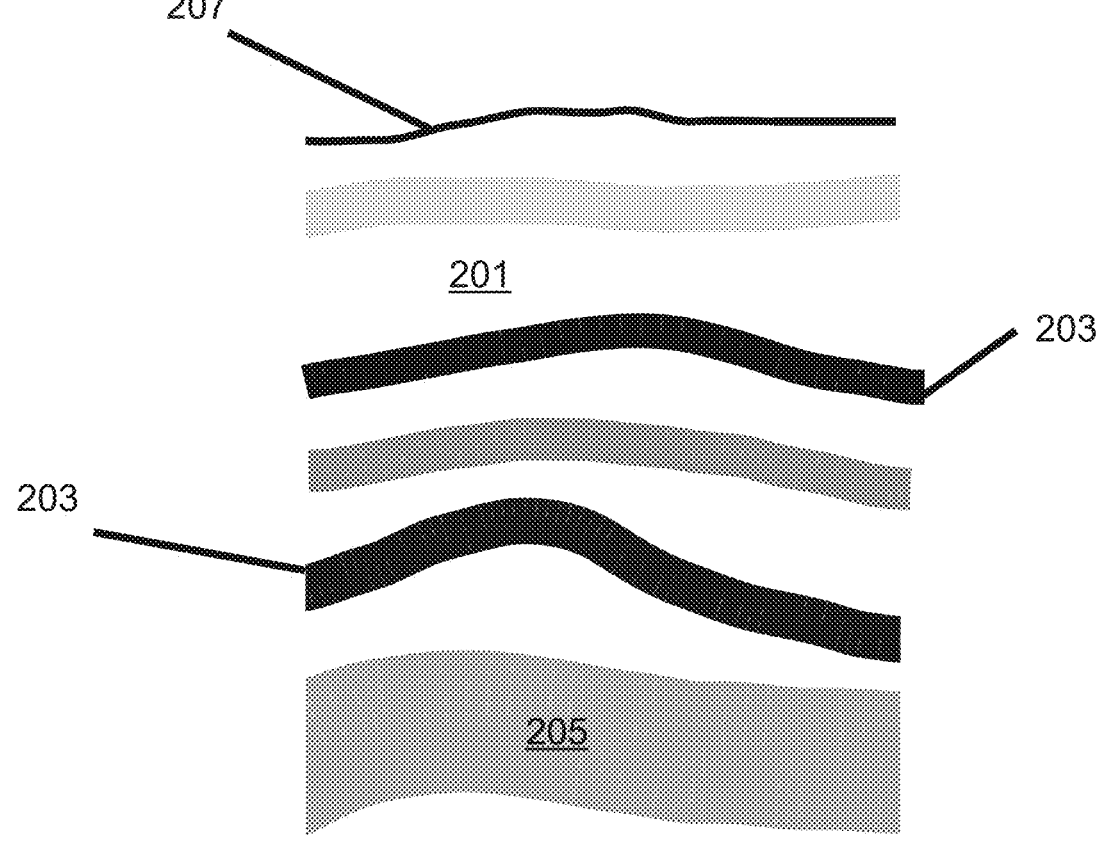

FIG. 2B illustrates a two-dimensional (2D) cross-section of typical and/or common geological zones that exist in many locations in the United States (U.S.), as well as, in many locations throughout the world, wherein at least one of these geological zones may be used as a waste disposal repository formation/zone and another geological zone, a particular overlain zone, may be used as a "cap-zone" (barrier layer) to the below located waste disposal repository formation/zone.

Figure 3A:
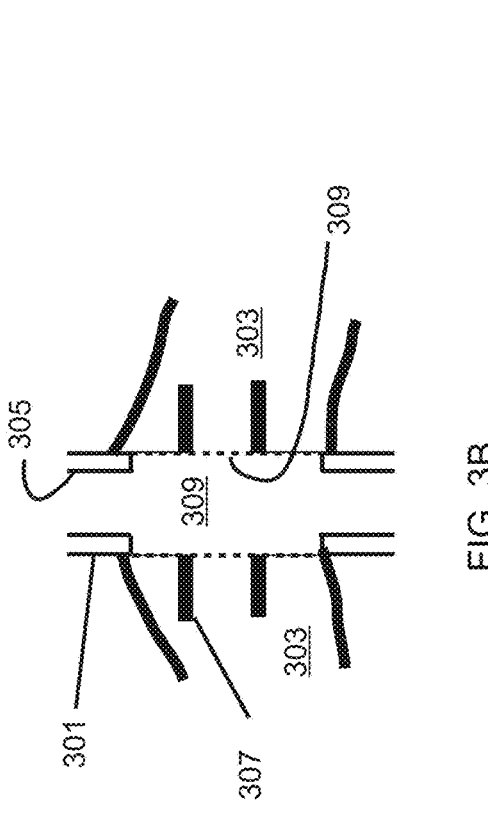

FIG. 3A may depict a vertical cross-section view of a section of a vertical-wellbore, within a cap-zone (i.e., passing through the cap-zone), in which at least one radial-hole has been implemented through a casing of the vertical-wellbore and into the cap-zone rock.

Figure 3B:
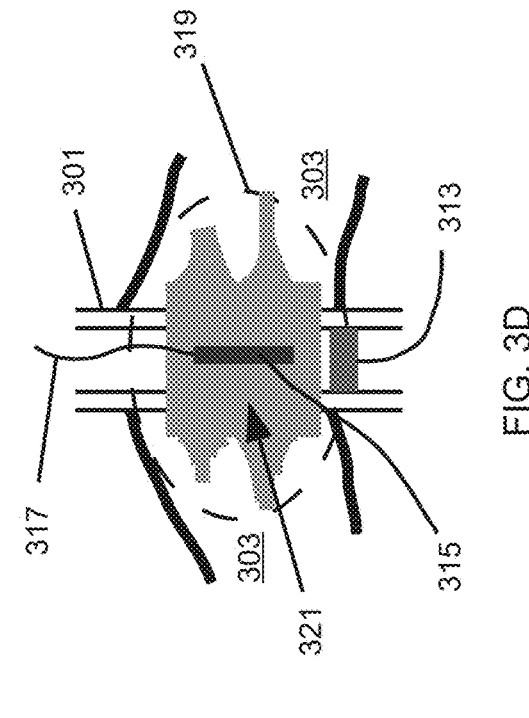

FIG. 3B may depict the same vertical cross-section view as shown in FIG. 3A, but further along in a method/process, wherein at least some of the casing of the vertical-wellbore within the cap-zone has been removed exposing the cap-zone rock face.

Figure 3C:
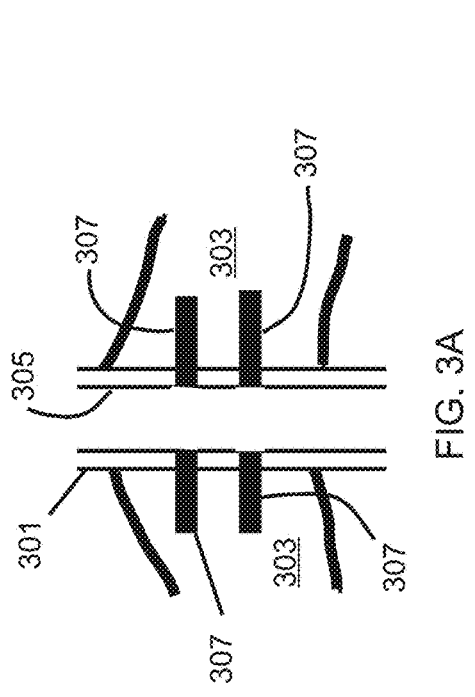

FIG. 3C may depict the same vertical cross-section view as shown in FIG. 3A and in FIG. 3B, but further along in the process/method, wherein where the cap-zone rock face is exposed from the casing removal (FIG. 3B), then a portion of the cap-zone rock face is reamed out to yield a void-volume within the cap-zone; wherein that void-volume is filled with crushed cap-zone rock and a heater for subsequent melting and then cooling operations.

Figure 3D:
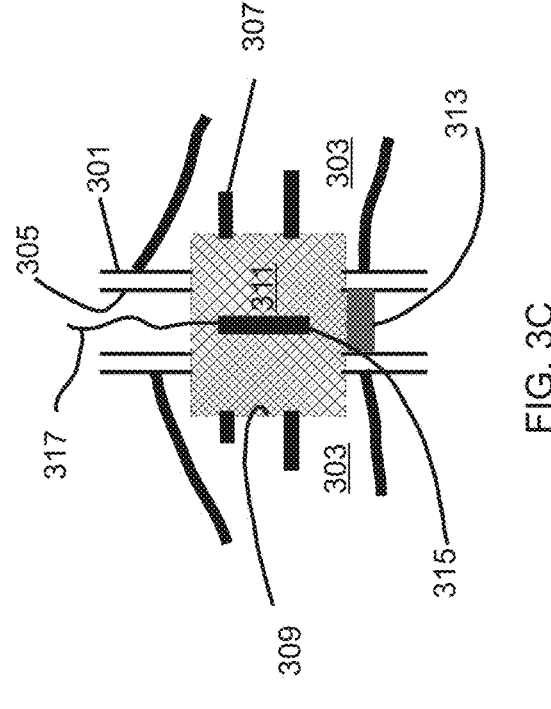

FIG. 3D may depict the same vertical cross-section view as shown in FIG. 3A, FIG. 3B, and in FIG. 3C, but further along in the process/method, wherein all the melt operations have been completed and that cap-zone has been melted, cooled, resolidified, recrystallized, or metamorphosed into a modified cap-zone that is fused to (welded to/annealed to) the native cap-zone rock, such that the modified cap-zone and the native cap-zone together act as a single and continuous barrier against (nuclear and/or radioactive) waste upwards migration.

Figures 3E, 3F:
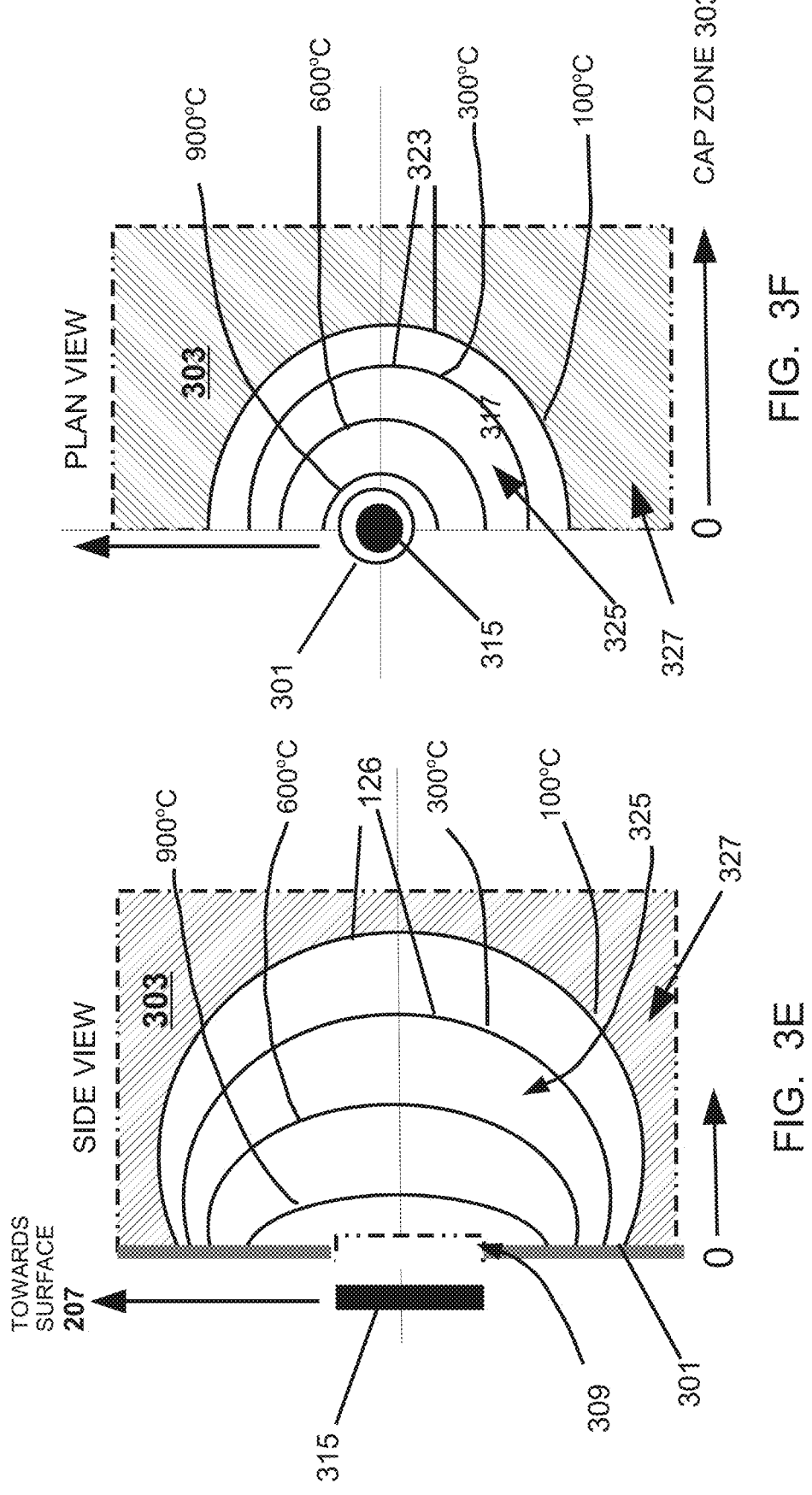

FIG. 3E is a partial schematic cross-section side view illustrating a temperature profile, via isotherms, in a section of a given cap-zone where a given geologic seal is being formed.

FIG. 3F may show the same temperature profile, via isotherms, as in FIG. 3E, except FIG. 3F may be from a different viewing angle, namely, a partial schematic cross-sectional top (plan) view.

Figure 3G:
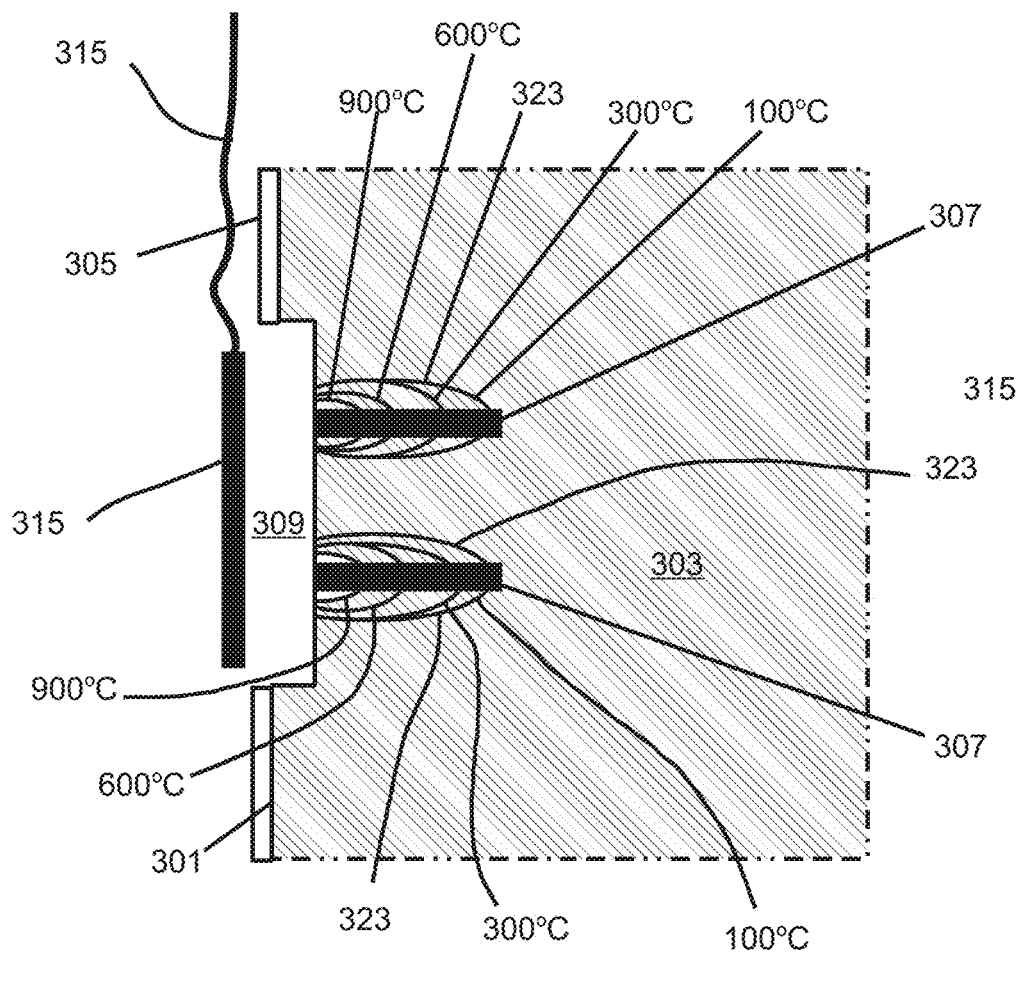

FIG. 3G is a partial schematic cross-section side view illustrating a temperature profile, via isotherms, in a section of a given cap-zone where a given geologic seal is being formed, with a particular focus to heat propagation around radial-holes.

FIG. 4A depicts a (nuclear and/or radioactive) waste repository sealing system for a geologically deeply located waste repository that may comprise at least one human-made cavern (SuperSILO) for receiving the waste, that is entirely located within a deep geologic formation, and with a selected cap-zone above the waste repository to be modified to act as a waste barrier, shown from a schematic cross-sectional side view.

FIG. 4B shows the same (nuclear and/or radioactive) waste repository sealing system as shown in FIG. 4A and from the same schematic cross-sectional side; except, FIG. 4B is shown further out in time from FIG. 4A, where a melt-zone in the modified cap-zone has cooled sufficiently for the rock materials to fuse, resolidify, and/or recrystallize such that a geologic seal and/or modified cap-zone is now integrally fused with its immediately surrounding cap-zone rock matrix; wherein the modified cap-zone together with its immediately surrounding cap-zone rock matrix both act as a single continuous waste barrier to prevent the below located waste from migrating upwards from this barrier.

Figure 5A:
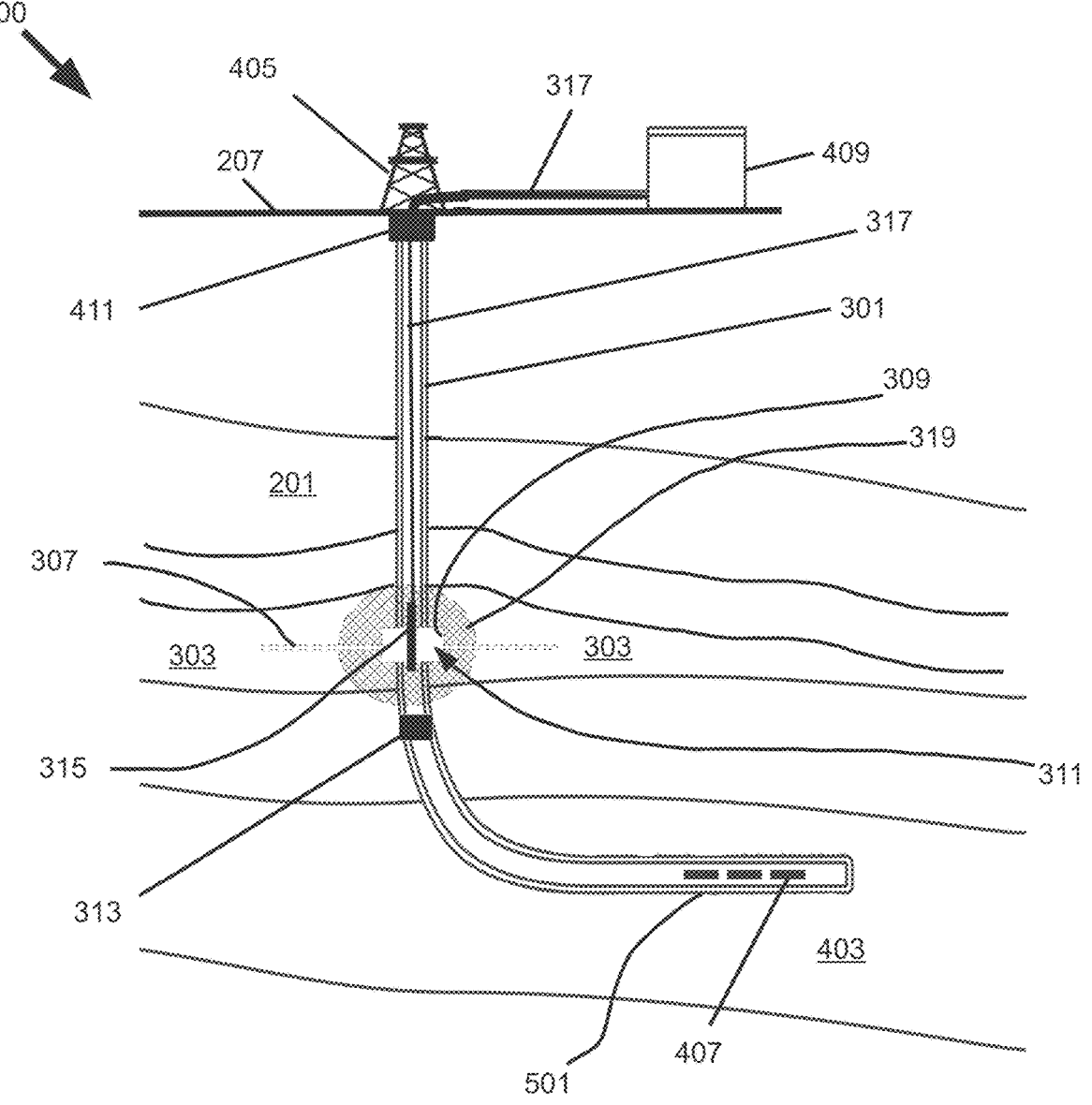

FIG. 5A depicts a (nuclear and/or radioactive) waste repository sealing system for a geologically deeply located waste repository that may comprise at least one human-made horizontal-wellbore (SuperLAT) for receiving the waste, that is entirely located within a deep geologic formation, and with a selected cap-zone above the waste repository to be modified to act as a waste barrier, shown from a schematic cross-sectional side view.

Figure 5B:
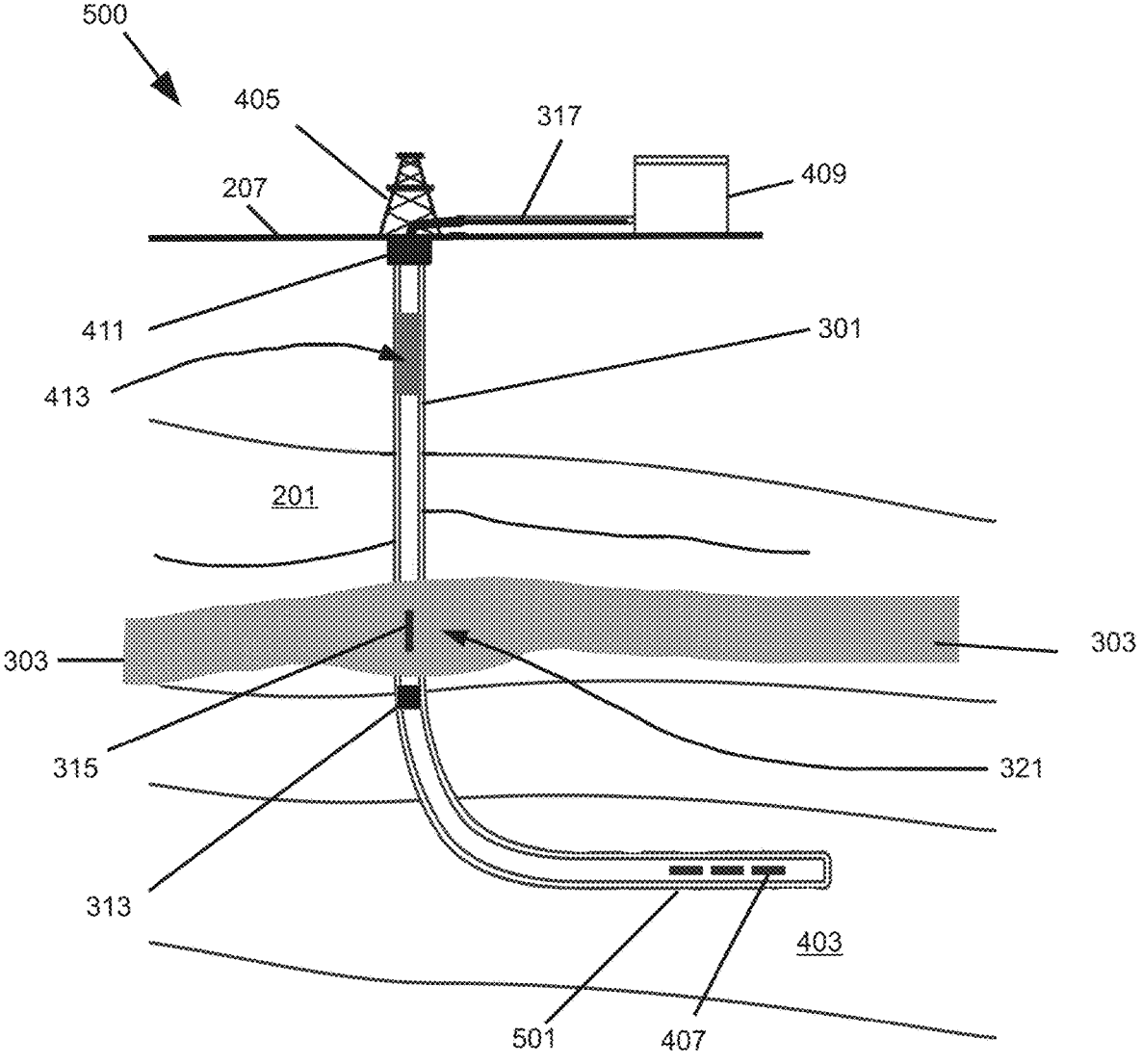

FIG. 5B shows the same (nuclear and/or radioactive) waste repository sealing system as shown in FIG. 5A and from the same schematic cross-sectional side; except, FIG. 5B is shown further out in time from FIG. 5A, where a melt-zone in the modified cap-zone has cooled sufficiently for the rock materials to fuse, resolidify, and/or recrystallize such that a geologic seal and/or modified cap-zone is now integrally fused with its immediately surrounding cap-zone rock matrix; wherein the modified cap-zone together with its immediately surrounding cap-zone rock matrix both act as a single continuous waste barrier to prevent the below located waste from migrating upwards from this barrier.

Figure 6:
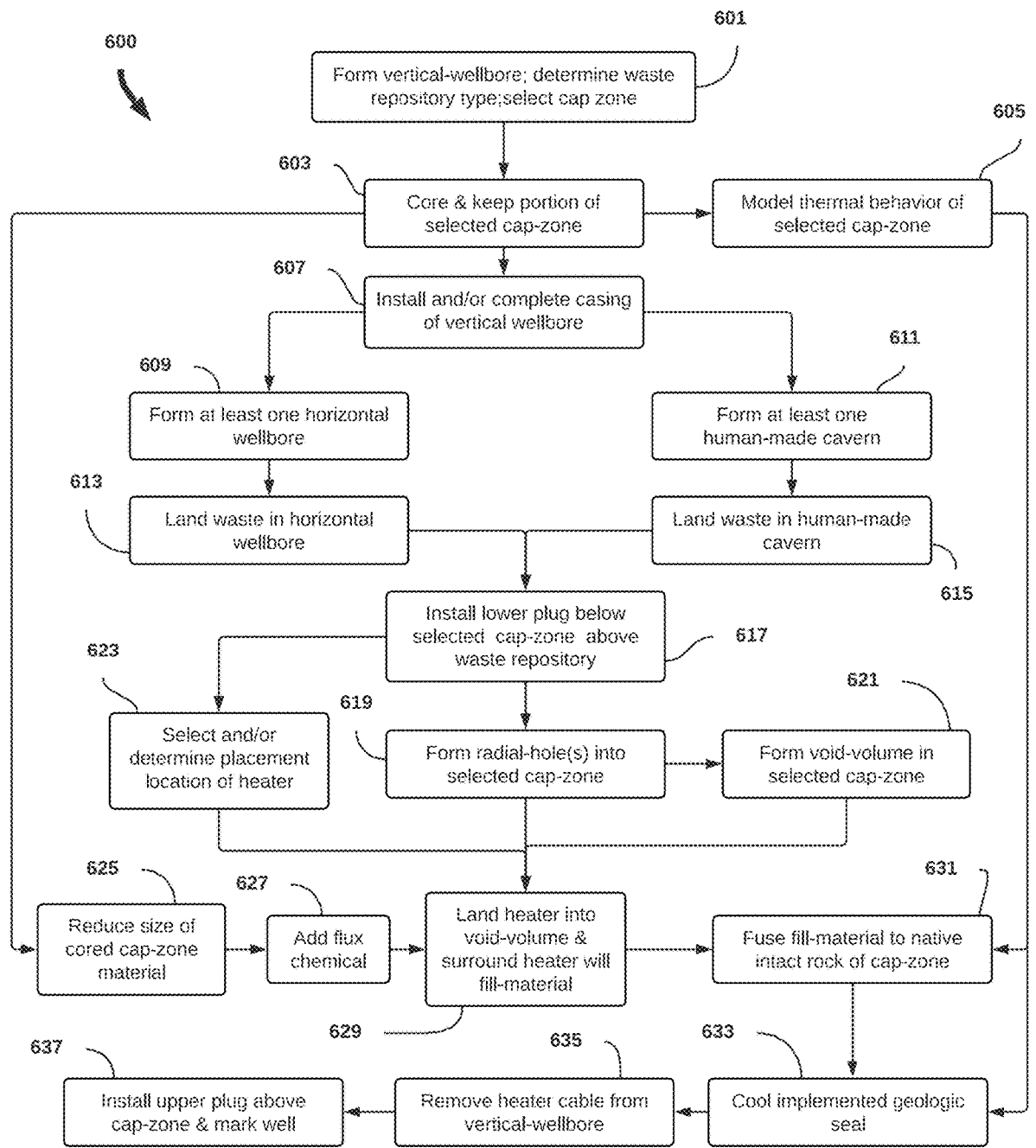

FIG. 6 may depict a flow chart of a method of sealing a geologically deeply located waste repository from upwards migration of waste located within the deep waste repository from migration past a modified cap-zone located above the deep waste repository.

REFERENCE NUMERAL SCHEDULE 11 rock formation 11
40 well 40
41 coil tubing 41
42 casing 42
42a hole 42a
43 reference numeral not in specification of U.S. Pat. No. 8,196,680 43
44 tool body 44
44a guide channel 44a
45 tubing 45
46 downhole motor 46
47 flex shaft 47
48 rotary mechanical cutter 48
49 plunger 49
100 prior art granite rock melting operation 100
101 vertical wellbore 101

103 granite rock waste disposal formation 103
105 downhole heater 105
107 power cable 107
109 steel casing 109
111 backfill material 111
112 melted granite seal (granite melt-zone) 112
113 upper plug 113
115 lower plug 115
117 waste capsule 117
121 radial hole 121
123 oil (and/or gas) producing formation 123
125 wellbore 125
201 (youngest) sedimentary formation 201
202 sedimentary formation 202
203 sedimentary formation 203
205 formation 205
207 terrestrial surface (Earth's surface) 207
301 human-made wellbore 301 (e.g., vertical-wellbore 301)
303 cap-zone 303
305 casing 305
307 radial-hole 307
309 void-volume 309
311 fill-material 311
313 lower-plug 313
315 downhole in-well heater 315
317 cable 317
319 melt-zone 319
321 melted-material (continuous geologic seal) 321
323 isotherm 323
325 heated-zone 325
327 unheated-zone 327
400 (nuclear and/or radioactive) waste repository sealing system 400
401 human-made cavern (SuperSILO) 401
403 deep geologic (rock) formation 403
405 drill-rig 405
407 waste 407
409 power-source 409
411 well-head 411
413 upper-plug 413
500 (nuclear and/or radioactive) waste repository sealing system 500
501 deeply located human-made horizontal-wellbore (SuperLAT) 501
600 method of sealing waste repository 600
601 form vertical-wellbore and/or select waste repository type 601
603 keep core(s) of possible cap-zone(s) and select cap-zone 603
605 model thermal behavior of selected cap-zone 605
607 install and/or complete casing of vertical-wellbore 607
609 form at least one horizontal-wellbore 609
611 form at least one human-made cavern 611
613 land waste within horizontal-wellbore 613
615 land waste within human-made cavern 615
617 install lower-plug below selected cap-zone 617
619 form radial-hole(s) into selected cap-zone 619
621 form void-volume within selected cap-zone 621
623 select and/or determine placement location of heater 623
625 reduce size of cored cap-zone material 625
627 add at least one chemical additive to crushed fill-material 627
629 land heater into void-volume & surround heater with fill-material 629

631 fuse fill-material to native intact rock of cap-zone 631
633 cool implemented geologic seal 633
635 remove cable from vertical-wellbore 635
637 install upper-plug above cap-zone 637

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Note the following U.S. patents (by the same inventor as the present patent application) are incorporated by reference as if fully set forth herein: 5850614, 6238138, 8933289, 10427191, 11289234, 11087896, 11183313, 10807132, 11167330, 11085270, and 11339611. At least some of these U.S. patents may teach at least some aspects of SuperLATs (horizontal-wellbores 501), SuperSILOs (human-made caverns 401), vertical-wellbores 301, and deep geologic formations 403 used for nuclear waste disposal. Note, the reference numerals used herein may be different from those used in this body of U.S. patents. Note, this patent application expands upon that body of prior art by teaching novel systems and/or methods for sealing/closing the nuclear waste repositories from upwards migration of waste beyond a modified cap-zone 303 as taught herein.

FIG. 1A illustrates prior art under development at The University of Sheffield of granite rock melting operations 100 in nuclear waste disposal. This prior art operation 100 had been designed for functioning within a vertical wellbore 101 that is located within a granite rock disposal formation 103. Note, this granite rock formation 103 is also the waste repository disposal zone. Thus, the granite rock melting that is occurring in this prior art is occurring in the waste repository disposal zone and not in an overlain and separated cap zone, not in a sedimentary formation and not in a shale formation. This prior art utilizes a centrally located downhole heater 105 hung from a power cable 107 inside the vertical wellbore 101. In this prior art, before the granite rock melting is commenced, a section of the steel casing 109 at or near the downhole heater 105 is removed; and then a region around the downhole heater 105 is backfilled with backfill material 111. The downhole heater 105 is energized from the terrestrial surface (not shown in FIG. 1A) to generate the heat/thermal energy which can melt the granite rock in the casing-free wellbore region that is immediately surrounding the emplaced downhole heater 105, wherein this melted granite rock then cools into a crystalline medium which behaves as a well bore seal 112 in vertical wellbore 101, within the granite rock disposal formation 103. The prior art of FIG. 1A also shows that above the melted granite seal 112 is an upper plug 113 and below the melted granite seal 112 is a lower plug 115. Also shown below the lower plug 115 is a waste capsule 117.

Continuing discussing FIG. 1A, note, the waste capsule 117, the melted granite seal 112, the lower plug 115, and the upper plug 113 are all located within the same granite rock disposal formation 103. In this prior art, the melted granite seal 112 is not located in an overlain cap zone that is physically different and physically separated from the granite rock disposal formation 103. Also note in this prior art, that the native intact granite rock in the casing-removed section of the vertical wellbore 101 (where the downhole heater 105 will operate) is not reamed out, not milled out, nor widened. Further note in this prior art, that the native intact granite rock 103 in the casing-removed section of the vertical wellbore 101 (where the downhole heater 105 will operate) does not have any radial (lateral/horizontal) holes drilled/extending into that native intact granite rock 103. Further still in this prior art, the backfill material 111 does not have any added chemical additives that may function as a flux or the like. Furthermore, granite rock disposal formation 103 is not a sedimentary formation nor a shale formation.

FIG. 1B and FIG. 1C are prior art and are reproductions of a FIG. 4A and of a FIG. 4B from preexisting U.S. Pat. No. 8,196,680. Note, the reference numerals shown in FIG. 1B and FIG. 1C are the same as those in FIG. 4A and in FIG. 4B of U.S. Pat. No. 8,196,680. FIG. 1B and FIG. 1C illustrate prior art equipment to in situ jet drill radial holes into the wellbore 40 casing 42 and/or into the immediately surrounding rock formation 11 directly from the wellbore 40. A motor 46 attached to a tool body 44 are inserted downhole into well 40. Via motor 46, a rotary mechanical cutter 48 is powered (via interconnecting flex shaft 47); and the rotary mechanical cutter 48 is directed radially outwards from well 40 cutting and drilling into rock formation 11 to form the desired drain hole 42a. Alternative to the rotary mechanical cutter 48 style cutter, high pressure water jet cutting may also be used to form such radial drain holes 42a into the rock formation 11 from well 40. Note, the equipment, tools, devices, systems, methods, and/or processes of such radial drain holes in oil/gas wellbores are routine in oil and gas production operations. The contents, disclosures, and teachings of U.S. Pat. No. 8,196,680 are incorporate by reference herein as if fully set forth herein. The equipment, tools, devices, systems, methods, and/or processes of such radial drain holes in oil/gas wellbores, that are routinely used in oil and gas production operations, and/or the teachings of U.S. Pat. No. 8,196,680 may be utilized in at least some aspects of embodiments of the present invention to form radial (lateral/horizontal) holes within overlain native and intact cap zone rock.

FIG. 1D is prior art that shows a cross-sectional top view of radial holes 121 being extended into the surrounding oil (and/or gas) producing formation 123 from a wellbore 125. Radial holes 121 of FIG. 1D may be formed by the equipment of FIG. 1B and/or FIG. 1C or from similar types of radial jet drilling equipment or the like. Using the equipment of FIG. 1B and/or FIG. 1C or from similar types of radial jet drilling equipment, radial holes 121 are formed into the surrounding oil producing formation 123, wherein the given radial hole 121 starts from an outer portion of a given wellbore 125 and then extends into the surrounding oil producing formation 123. The radial holes 121 may be "jetted" and/or drilled into the surrounding productive rock matrix 123 from the wellbore 125 in a radial and in a circumferential manner to maximize the production of oil (and/or gas) from the geological oil producing formation 123. In oil production operations, the radial holes 121 allow the oil to flow from outer/distal reaches of the natural oil reservoir more easily to the wellbore 125 thereby increasing production by using these radial holes 121. That is, in prior art radial holes 121, the oil moves from the oil producing formation 123 towards the wellbore 125 via the radial holes 121; and thus, in the oil and gas production industry these radial holes 121 are often called radial "drain" holes because the radial holes 121 are "draining" the oil/gas from the natural oil reservoir to the wellbore 125.

FIG. 2A illustrates a three-dimensional (3D) cross-section of typical and/or common geological zones that exist in many locations in the United States (U.S.), as well as, in many locations throughout the world. Note, the geological zones of FIG. 2A coexist naturally. Merely for example, three main geological zones are called out in FIG. 2A, namely, three chronologically (sequentially) deposited layers of sedimentary rock formations 201, 202, and 203, and formation 205. Additionally, as a point of reference the Earth's local terrestrial surface 207 is shown and called out in FIG. 2A. Wellbore generation may be initiated from terrestrial surface 207 and into these geological zones. Sedimentary rock formation 201 is the youngest sedimentary formation in this FIG. 2A example. Sedimentary rock formation 202 is the next oldest. Sedimentary rock formation 203 is the next oldest in this example. And rock formation 205 is the next oldest in this example. Note, formation 205 may be sedimentary or other, such as but not limited to, igneous rock (like granite), a metamorphic rock, a tight shale, portions thereof, combinations thereof, and/or the like. Note, the references of younger, older, oldest and/or the like with respect to sedimentary rock formations 201, 202, 203, and/or 205 are merely relative to those particular rock formations or as between those particular rock formations and not meant to be taken as absolute or in comparison to formations not shown in FIG. 2A. In some embodiments, oldest formation 205 may be used as a (radioactive/nuclear) waste disposal repository formation/zone. In some embodiments, sedimentary formation 203 may be used as a "cap zone." As used herein, cap zone 203 is always located above the waste disposal repository formation/zone 205. Thus, cap zone 203 is overlain with respect to below located waste disposal repository formation/zone 205. However, cap zone 203 may be immediately above waste disposal repository formation/zone 205 or separated from waste disposal repository formation/zone 205 by one or more other layers, formations, and/or geologic zones.

Continuing discussing FIG. 2A, formations 201, 202, and 203 may be considered as sedimentary formations deposited sequentially over geologic time from an aquatic environment. The formation/zone 205 at the bottom of FIG. 2A may be waste disposal repository formation/zone. In reality there may be one or more waste disposal repository formation(s)/zone(s) 205. When there may be two or more waste disposal repository formations/zones 205, these zones 205 may be separated from other by one or more other formations in nature. Formation 201 may have varied vertical heights/thickness and may extend from 500 feet to 10,000 feet in vertical extent. Formation 201 may comprise several interbedded sub-zones of varying heights and types; and each such specific sub-zone of formation 201 may vary from five (5) feet to more than 1,000 feet in vertical thickness. These overlain formations 201 may be shales, limestones, carbonates, siltstones, or any types or combinations of sedimentary or metamorphic rock.

The geological zones of FIG. 2A may encompass a regional areal extent covering several square miles since these sedimentary formations 201, 202, 203, and 205 may have been deposited from/below massive aquatic environments like lakes, or seas in some cases, during geologic time. In some embodiments, formation 202 may show by means of different shading that may for example indicate areas of vertically separated gas, oil, and/or water zones from the top of zone 202 to the bottom of the zone 202. Because of this large areal extension, the use of a competent cap zone 203 may help prevent, restrict, prohibit, and/or mitigate the migration of (radioactive) waste (and/or derivatives/byproducts thereof) flow from waste disposal repository formation/zone 205.

FIG. 2B illustrates a two-dimensional (2D) cross-section of typical and/or common geological zones that exist in many locations in the United States (U.S.), as well as, in many locations throughout the world. Note, the geological zones of FIG. 2B coexist naturally. Merely for example, three main geological zones are called out in FIG. 2B, namely, three chronologically (sequentially) deposited layers of sedimentary rock formations 201, 203, and 205. Additionally, as a point of reference the Earth's local terrestrial surface 207 is shown and called out in FIG. 2B.

FIG. 2B is essentially/largely a 2D cross-sectional version of FIG. 2A, but with some differences. For example, in FIG. 2B, sedimentary rock formation 205 (which may be waste disposal repository formation/zone 205) is shown separated from sedimentary rock formation 203 (which may be cap zone 203) by at least one intervening formation/zone. However, cap zone 203 is still always located above waste disposal repository formation/zone 205. Additionally, in FIG. 2B more than one cap zone 203 is shown. In some embodiments, either or both of these two or more different formations 203 may be utilized as cap zone(s).

The geological zones shown in FIG. 2A, FIG. 2B, and/or in the real world may be determined from a multitude of empirical sources. In general, the geological zones below a given section of terrestrial surface 207 may be identified, determined, ascertained, and/or distinguished by well logging analysis during drilling operations, from pilot wells, from core samples, from surface geology outcrops, from regional well data, from seismic studies, combinations thereof, and/or the like. These analyses are well known in the art. In addition, by the use of "Big Data" technology in which massive geological data bases are combined with AI (artificial intelligence) and/or machine learning analysis, very accurate 3D renditions of the underground geologic zone formations may be derived and utilized in at least some embodiments of the present invention, with respect to provide effective prevention, restriction, prohibition, and/or mitigation of upwards migration of (radioactive) waste (and/or derivatives/byproducts thereof) from a given waste disposal repository formation/zone 205 that houses the waste.

FIG. 3A to FIG. 3D all show the same cross-sectional schematic diagram of a section of vertical-wellbore 301 passing through a given cap-zone 303, but at different stages with respect to the overall process of forming a continuous geologic seal within a given cap-zone 303 for its associated (connected) vertical-wellbore 301. FIG. 3A to FIG. 3D show a series of operations that when completed may result in the formation of a continuous geologic seal within a given cap-zone 303 that completely seals of a vertical-wellbore 301 passing through that section of the given cap-zone 303 and wherein a distal end of that vertical-wellbore 301 is physically connected to a (nuclear and/or radioactive) waste repository. In some embodiments, the (nuclear and/or radioactive) waste repository may be in the form of at least one human-made horizontal-wellbore 501 (SuperLAT); in the form of at least one human-made vertically oriented cavern 401 (SuperSILO); in the form of a vertical-wellbore; in the form of a predetermined waste-repository structure; portions thereof; combinations thereof; and/or the like. And the waste repository is located in a deep geologic formation 403, always below the cap-zone(s) 303. Thus, FIG. 3A to FIG. 3D may show details of the cap-zone 303 that may be applicable to FIG. 4A to FIG. 5B.

FIG. 3A is cross-sectional diagram of a section of vertical-wellbore 301 that is passing through a given cap-zone 303. In some embodiments, vertical-wellbore 301 may run from a terrestrial surface 207 to a given waste repository, wherein the waste repository is located within a deep geologic formation 403. Note, terrestrial surface 207 and deep geologic formation 403 are not shown in FIG. 3A; instead see FIG. 4A to FIG. 5B for terrestrial surface 207 and deep geologic formation 403. In some embodiments, in vertical-wellbore 301's course from terrestrial surface 207 to deep geologic formation 403, vertical-wellbore 301 may pass through one or more cap-zone(s) 303. Cap-zone(s) 303 are always located above deep geologic formation 403. In some embodiments, the above discussion of cap zone 203 and/or sedimentary rock 203 may be applicable to cap-zone(s) 303. In some embodiments, at least some of vertical-wellbore 301 may be cased with casing 305. In some embodiments, casing 305 may line exterior diameter portions of vertical-wellbore 301, to protect vertical-wellbore 301 from native geologic formations that vertical-wellbore 301 passes through; and/or to isolate materials moving through the interior of vertical-wellbore 301 from those surrounding native geologic formations. In some embodiments, casing 305 may be of metal (e.g., steel) sections of pipe, of annular/pipe sections of concrete, combinations thereof, and/or the like.

In FIG. 3A, when vertical-wellbore 301 is being drilled out and formed and the drilling equipment is passing through a given cap-zone 303, that extracted material 311 (fill-material 311) from that given cap-zone 303 may be used later on, see e.g., FIG. 3C.

In FIG. 3A, in a section of vertical-wellbore 301 that passes through a given and/or a predetermined cap-zone 303, at least one radial-hole 307 may be formed that extends from vertical-wellbore 301 and into that given cap-zone 303. In some embodiments, two or more radial-holes 307 may be formed from vertical-wellbore 301 and into that given cap-zone 303. In some embodiments, the two or more radial-holes 307 may be at different heights in that section of cap-zone 303 and/or at the same height/level in that section of cap-zone 303. In some embodiments, when there are two or more radial-holes 307 at a same level in that given cap-zone 303, then those two or more radial-holes 307 may be equally spaced apart.

In some embodiments, at least one radial-hole 307 runs in a direction that is at least substantially (mostly) orthogonal to a direction that the at least one wellbore 301 runs in (wellbore 301 runs in a substantially vertical direction); i.e., the at least one radial-hole 307 run in an at least substantially horizontal and/or lateral direction into rock of cap-zone 303. In some embodiments, radial-hole(s) 307 may extend a lateral (horizontal) distance into the cap-zone 303 of at least five (5) times the radius of the disposal repository horizontal-wellbore 501 (SuperLAT). For example, and without limiting the scope of the present invention, in a twelve (12) inch radius of the disposal repository horizontal-wellbore 501 (SuperLAT), then the radial-hole(s) 307 may have a lateral (horizontal) extended distance of about sixty (60) inches long, +/– six (6) inches into that cap-zone 303.

In some embodiments, radial-hole(s) 307 may extend a lateral (horizontal) distance into that cap-zone 303 that is at least the same as the diameter of the SuperSILO human-made cavern 401. For example, and without limiting the scope of the present invention, a five (5) foot diameter SuperSILO human-made cavern 401 may have radial-hole(s) 307 having a lateral (horizontal) distance of at least five (5) feet extending into that given cap-zone 303.

Note, radial-hole(s) 307 are similar to radial hole(s) 121 (of FIG. 1D) in that radial-hole(s) 307 may be formed using the same or similar equipment, such as, but not limited to, downhole in-well lateral jet drilling equipment, the equipment shown in FIGS. 1B and 1n FIG. 1C, and/or the like. However, radial-hole(s) 307 differs from prior art radial hole(s) 121 in a number of ways. For example, radial-hole(s) 307 are not "drain holes," i.e., radial-hole(s) 307 are not being used to drain oil out of a natural oil reservoir and into the wellbore. Additionally, radial-hole(s) 307 are not formed in an oil producing formation but rather in a non-oil producing cap-zone 303. And further, during the melt process the melt creeps into the radial-hole(s) 307 from the direction of vertical-wellbore 301; and so, after the melt cooldown the formed radial-hole(s) 307 are at least partially filled with solidified and re-crystalized rock matrix material. Thus, radial-hole(s) 307 are configured for receiving, movement, and fusing of melt as opposed to being configured for oil transport; and radial-hole(s) 307 are configured for material movement from the direction of vertical-wellbore 301 and into cap-zone 303; rather, than movement of oil from the oil producing formation towards the wellbore.

Note, in some embodiments, radial-hole(s) 307 may be formed while casing 305 is still in place and/or intact within that given section of vertical-wellbore 301; i.e., the equipment used to form the radial-hole(s) 307 may also be readily capable of drilling, cutting, and/or jetting through casing 305.

FIG. 3B shows the same schematic cross-sectional view as FIG. 3A, except now in FIG. 3B casing 305 is removed from the section of vertical-wellbore 301 that is passing through the given cap-zone 303. Downhole in-well reaming and/or milling equipment may be used to remove this portion of casing 305 from vertical-wellbore 301. Reaming may be done to smooth out or remove "dog-legs" in a given wellbore. Also, reaming may be done to enlarge a wellbore to allow more than one production tubing string to be "twinned" therein, used in the enlarged wellbore. In some cases, in lateral (horizontal) drilling from an existing vertical wellbore, a section of the wellbore may be milled out to form a "window" and a whipstock inserted in the wellbore at the milled out location, to allow the lateral drilling to "kick off" from this new milled-out window. This wellbore/casing reaming and/or milling equipment is preexisting and known in the oil/gas well drilling industry and are incorporated by reference herein. Once casing 305 is removed from this section of vertical-wellbore 301, there is a volume of void space, designated void-volume 309 in this section of vertical-wellbore 301 that is passing through this cap-zone 303. In some embodiments, this milled out region of void-volume 309 defines an empty cylindrical region in that given cap-zone 303 which is a void space at this stage in the overall process. In some embodiments, void-volume 309 allows direct communication between the vertical-wellbore 301 and the rock of that given cap-zone 303. Once void-volume 309 is formed, the pre-formed radial-hole(s) 307 may still extend radially and laterally (horizontally) away from vertical-wellbore 301 and into that given cap-zone 303. In some embodiments, these radial-hole(s) 307 may begin at an inner proximal edge of the open/milled zone void-volume 309 and may provide additional melt fluid flow channels for progressive rock melt movement away from the central vertical-wellbore 301 area during the active melt operations. In some embodiments, void-volume 309 may be later filled with fill-material 311, along with other selected chemical material additives to enhance the melt process as shown, disclosed, described, and taught below. In some embodiments, a vertical height of void-volume 309 may be at least as large as a vertical height of the downhole in-well heater 315 and extend both above and below the downhole in-well heater 315 (when emplaced) by at least two (2) feet, +/− six (6) inches. In one embodiment, this milled out section of void-volume 309 may be a height of twice the downhole in-well heater 315 height and/or generally limited in vertical height of about twenty (20) feet, +/− five (5) feet. It should be noted that the intent of some embodiments is to not completely remove all of casing 305 from that section of vertical-wellbore 301 that is passing through that given cap-zone 303; i.e., at both the top and the bottom of the cap-zone 303 there may be some casing 305 remaining (because such removal would be unnecessary and thus wasteful and inefficient); and/or for a thick cap-zone 303 is (much) larger than the vertical height of the downhole in-well heater 315, there is no need to remove all of the casing 305 in that cap-zone 303. Often some casing 305 may be left intact within vertical-wellbore 301 that is passing through a selected cap-zone 303. It is generally beneficial to have casing covering a section of wellbore where two different rock types meet, as such casing guarantees that there is a known competent bond between dissimilar rock types at the wellbore. For at least this reason some casing 305 and its attached cement annulus material is left covering the junction in some embodiments. However, only in the case of a very narrow vertical cap-zone 303, such as, but not limited to, five (5) feet or less, may it be necessary to remove all of casing 305 facing that cap-zone 303. In some geological cases, cap-zone(s) 303 which form barriers or confining zones for oil/gas accumulations, may predominantly be shale barriers; and as such, may vary considerably in size and thickness. For example, in Central Oklahoma the Woodford Shale formation may be less than thirty (30) feet thick, while the Cisco shale formation in western Texas may be more than 400 feet thick. It is not recommended nor is it necessary to use the full extent of these larger cap-zone(s) 303 for melt and sealing purposes and shown, disclosed, described, and taught herein.

FIG. 3C shows the same schematic cross-sectional view as in FIG. 3A and in FIG. 3B. However, in FIG. 3C, a number of additional operations may be occurring. In some embodiments, once at least some of casing 305 has been removed from a section of vertical-wellbore 301 that is passing through that given cap-zone 303 (e.g., as shown in FIG. 3B, then void-volume 309 may be further enlarged in the horizontal (lateral) directions in FIG. 3C. In some embodiments, enlarged void-volume 309 may have a radius that is at least three (3) times the radius of the vertical-wellbore 301 sections that are immediately above and/or below this given cap-zone 303. The same equipment used to remove casing 305 to form void-volume 309 in FIG. 3B may be used to enlarge void-volume 309 in FIG. 3C.

Continuing discussing FIG. 3C, in some embodiments, prior to adding in fill-material 311 to fill void-volume 309 for later melt operations, a lower-plug 313 in emplaced within vertical-wellbore 301 below void-volume 309. Note, depending upon the thickness of selected cap-zone 303, lower-plug 313 may be placed within vertical-wellbore 301 below the selected cap-zone 303 or within the selected cap-zone 303, but always below void-volume 309. In some embodiments, lower-plug 313 is not emplaced until it is desired to stop filling the below located waste repository with waste (e.g., the waste repository may be sufficiently full with waste). In some embodiments, lower-plug 313 may be packer device (as that term is used in the oil/gas well drilling operations). In some embodiments, lower-plug 313 may be comprised of a steel device, durable HTHP (high temperature and high pressure) elastomers, cement, drilling mud, bentonite backfill, portions thereof, combinations thereof, and/or the like. In some embodiments, emplaced/installed lower-plug 313 may seal and/or close off vertical-wellbore 301; however, lower-plug 313 may be insufficient to prevent, stop, prohibit, restrict, and/or mitigate upwards migration of (radioactive) waste (and/or derivatives/byproducts thereof) out of the below located waste repository over timeframes that disposal in that waste repository may be ongoing (which may be over thousands of years). Rather, lower-plug 313 may prevent fill-material 311, later introduced into vertical-wellbore 301, from dropping (falling) into the below located waste repository. In some embodiments, lower-plug 313 may be installed at any time after the below connected waste repository is sufficiently filled. In some embodiments, lower-plug 313 may be installed before vertical-wellbore 301 casing 305 milling/reaming operations begin. In some embodiments, lower-plug 313 might not be located within deep geological formation 403.

Continuing discussing FIG. 3C, in some embodiments, once radial-hole(s) 307 are formed in cap-zone 305, once void-volume 309 is formed (and/or enlarged), and once lower-plug 313 has been emplaced below void-volume 309 within vertical-wellbore 301, then fill-material 311 and the downhole in-well heater 315 may be emplaced within void-volume 309 and void-volume 309 may be filled (backfilled) with fill-material 311. In some embodiments, fill-material 311 may comprise extracted rock from cap-zone 303. In some embodiments, fill-material 311 may be obtained from coring of cap-zone 303 and/or from when vertical-wellbore 301 is being formed and passes through cap-zone 303. In some embodiments, prior to fill-material 311 being used to fill void-volume 309, fill-material 311 may be further processed to make the pieces of fill-material 311 smaller. In some embodiments, prior to fill-material 311 being used to fill void-volume 309, fill-material 311 may be crushed, broken, smashed, ground, pulverized, pelletized, portions thereof, combinations thereof, and/or the like. Note, fill-material 311 may also be referred to as crushed rock 311. In some embodiments, crushed rock 311 may be obtained from at least one core sample taken from the at least one cap-zone 303.

Continuing discussing FIG. 3C, in some embodiments, prior to fill-material 311 that has been crushed, broken, smashed, ground, pulverized, pelletized, portions thereof, combinations thereof, and/or the like being used to fill void-volume 309, one or more chemical additives may be added/included. In some embodiments, fill-material 311, in addition to comprising rock from cap-zone 303, may comprise one or more chemical additives. In some embodiments, these chemical additives may behave operationally as a flux. In some embodiments, these chemical additives may aid in the melt process by promoting fluidity, by making the melting process more efficient, and/or in some cases lowering the rock material melt temperature. In some embodiments, the chemical additive may comprise at least one of: calcium carbonate ($CaCO_3$), magnesium oxide (MgO), iron oxide ($Fe_2O_3$), alumina, silica, borax, portions thereof, combinations thereof, and/or the like. In some embodiments, an appropriate chemical additive may be determined from small scale laboratory experimentation. In some embodiments, a series of laboratory melt tests may be initiated to optimize the gravimetric combinations of these additive chemicals in/with fill-material 311. In some embodiments, the chemical additive may be added as a percentage (e.g., by mass or weight) of the total crushed rock material mixture;

and may be in the range of 10% to 30% for calcium carbonate, 5% to 10% for magnesium oxide, and/or 2% to 5% for iron oxide.

Continuing discussing FIG. 3C, in some embodiments, the chemical additive(s) may be added to and/or mixed with the crushed cap-zone 303 rock material to form the fill-material 311 while on terrestrial surface 207. In some embodiments, this combined rock and chemical additive(s) mixture of fill-material 311 and the downhole in-well heater 315 are inserted into vertical-wellbore 301 and landed at a select cap-zone 303 location, above lower-plug 313, within void-volume 309. Now, around the downhole in-well heater 315 and void-volume 309 are completely filled with fill-material 311. The downhole in-well heater 315 is completely surrounded by fill-material 311 in void-volume 309. Void-volume 309 is now ready for the melting operation(s) from downhole in-well heater 315. In some embodiments, a cable 317 is operationally connected to 315. In some embodiments, cable 317 may be used to move down-hole in-well heater 315 within vertical-wellbore 301; and/or cable 317 may be used to provide power to downhole in-well heater 315. In some embodiments, cable 317 may run from downhole in-well heater 315 to terrestrial surface 207. In some embodiments, once radial-hole(s) 307 are formed in cap-zone 305; once void-volume 309 is formed (and/or enlarged); once lower-plug 313 has been emplaced below void-volume 309 within vertical-wellbore 301, once fill-material 311 and the downhole in-well heater 315 have been emplaced within void-volume 309; and once void-volume 309 has been filled (backfilled) with fill-material 311, then melting operations may commence by the downhole in-well heater 315 melting fill-material 311 into a liquid/fluid; wherein at least some of liquid/melted fill-material 311 may flow into the radial-hole(s) 307.

Note, what may be occurring and/or shown in FIG. 3C (or before as in FIG. 3A and FIG. 3B) may be applicable to FIG. 4A and/or to FIG. 5A; wherein FIG. 4A and FIG. 5A may show the entirety of the given waste repository closure system (400 and/or 500) from terrestrial surface 207, through a selected cap-zone 303, and into a given waste repository (401 and/or 501) formed within a deep geologic formation 403.

FIG. 3D shows the same schematic cross-sectional view as in FIG. 3A, in FIG. 3B, and in FIG. 3C. FIG. 3D may be used to show melt operations in progress, melt operations near completion, and/or melt operations having completed/concluded.

With respect to ongoing active melt operations, downhole in-well heater 315 may be configured to output sufficient heat capable of melting fill-material 311 and of melting native intact cap-zone 303 material within a melt-zone 319. As emplaced downhole in-well heater 315 continues to heat, melt-zone 319 may expand further into cap-zone 303 from downhole in-well heater 315. As emplaced downhole in-well heater 315 continues to heat, melted-material 321 forms. In some embodiments, melted-material 321 may comprise fill-material 311 that has been melted and/or some portion of cap-zone 303 rock that has been melted. As emplaced downhole in-well heater 315 continues to heat, melted-material 321 may work its way laterally faster through the radial-hole(s) 307 or more slowly by normal conduction through the interface of fill-material 311 (in melted state) and native intact cap-zone 303 rock (which has melted or is beginning to melt). In some embodiments, heating by emplaced downhole in-well heater 315 may heat from one (1) to three (3) weeks. In some embodiments, heating by emplaced downhole in-well heater 315 may heat for a month, three or less weeks, thirty days or less, and/or the like. In some embodiments, expansion of this melt zone 319 may be accelerated by the existence of the radial-holes 307. In some embodiments, inclusion of radial-hole(s) 307 may reduce the time emplaced downhole in-well heater 315 generates melting heat.

Continuing discussing FIG. 3D, in some embodiments, emplaced downhole in-well heater 315 may be controlled and/or operated from the terrestrial surface 207 and via connecting cable 317. In some embodiments, operation of emplaced downhole in-well heater 315 may follow (track) a computed temperature profile of melt-zone 319 during the melting and/or cooling process as predicated by predetermined computer simulations for the given rock/heater system. There are several existing computer programs already developed for melting, annealing, fusing, and/or cooling processes for rocks that may be routinely utilized to model the behavior of cap-zone 303 rock systems, along with the chemical flux additive(s). In some embodiments, emplaced downhole in-well heater 315 temperature/heating (remote and/or programmed) control may allow the melt and the annealing, fusing, resolidifying, and/or re-crystallization processes to follow an expected temperature response over a selected time period needed to maintain a non-fractured and/or a non-fissured cooled melt product (e.g., cooled continuous geologic seal 321) which would allow the desired maximum sealing of the given cap-zone 303 so as to prevent, block, prohibit, restrict, and/or mitigate upwards movement of (radioactive) waste (and/or derivatives/by-products thereof) from the below located waste repository.

Continuing discussing FIG. 3D, once melted-material 321 has cooled down sufficiently for re-solidification and/or re-crystallization to occur within melted-material 321, then melted-material 321 may be characterized as continuous geologic seal 321 located within that given cap-zone 303. Note, cooled re-solidified and/or re-crystallized continuous geologic seal 321 and its immediately adjoining cap-zone 303 that continuous geologic seal 321 has fused to, behave as a single monolithic/integral structure, such that seal 321 is geologically continuous with its immediately adjoining cap-zone 303; however, geologic seal 321 may technically at the microscopic scale be heterogenous as compared to immediately surrounding cap-zone 303 because of the presence of the chemical flux additives within geologic seal 321. Further, note that a diameter of geologic seal 321 is larger than un-cased diameter of vertical-wellbore 301, because of the larger diameter of enlarged void-volume 309 and/or because of radial-hole(s) 307 that extend laterally (horizontally) into cap-zone 303 rock. Additionally, note the exterior 3D shape of geologic seal 321 is not a cylinder nor an ovoid. In some embodiments, the exterior 3D shape of geologic seal 321 may be non-uniform and not a standard 3D shape.

Embodiments of the present invention recognize an effect of cooling rate on the integrity of the resulting fused/annealed cap-zone 303 to geologic seal 321 as the molten rocks cool. FIG. 3C and/or FIG. 3D may depict aspects of the melting rock operations according to at least some embodiments of the present invention. It is recognized, if melted-material 321 is controllably cooled slowly, the thermal stress may be sufficiently relieved by viscous deformation of the still-viscous material to yield non-fractured and/or a non-fissured cooled melt product (e.g., cooled continuous geologic seal 321 fused/annealed to adjoining cap-zone 303). Cooling rates that result in a solid structure with no substantial locked-in strains for various materials are well known in the technological literature and may be applied to various embodiments of the present invention. In some embodiments, this cooling process may extend from several days to several weeks. In some embodiments, at the end of the cooling process, the emplaced downhole in-well heater 315 may be jettisoned and left in the recrystallized cooled continuous geologic seal 321; and the cable 317 (or a portion thereof) may be retracted to the terrestrial surface 207 after using a quick-disconnect device from the emplaced downhole in-well heater 315. Note, in some embodiments, emplaced downhole in-well heater 315 may be disposable and left emplaced within the cooled geologic seal 321.

Note, what may be occurring and/or shown in FIG. 3D (or after FIG. 3D) may be applicable to FIG. 4B and/or to FIG. 5B; wherein FIG. 4B and FIG. 5B may show the entirety of the given waste repository closure system (400 and/or 500) from terrestrial surface 207, through a selected cap-zone 303, and into a given waste repository (401 and/or 501) formed within a deep geologic formation 403.

FIG. 3E is a partial schematic cross-section side view illustrating a temperature profile, via isotherms 323, in a section of a given cap-zone 303 where a given geologic seal 321 is being formed. In FIG. 3E portions of downhole in-well heater 315, (reamed and/or milled) void-volume 309, and of vertical-wellbore 301 are shown. Note, for simplicity radial-hole(s) 307 are omitted in FIG. 3E and not accounted for in FIG. 3E (accounting for the radial-hole(s) 307 would change the shape/patterns of the isotherms 323 shown in FIG. 3E). In FIG. 3E, heat is emanating from downhole in-well heater 315 and via conduction is flowing into rock of cap-zone 303. A coolest isotherm 323 that is furthest away from downhole in-well heater 315, may delineate a heated-zone 325 and an unheated-zone 327. In this representative illustration, extending away from and closest to downhole in-well heater 315, within this cap-zone 303, may be hottest isotherms 323. The further away from downhole in-well heater 315, within this cap-zone 303, the isotherms may be cooler (may diminish). The temperatures shown in FIG. 3E attached for each isotherm 323 are in degrees Celsius and are merely for illustrative purposes (to show the overall temperature profile); i.e., actual temperatures may be both hotter and cooler (depending upon where in the melting or cooling process such a temperature snapshot may be taken). For example, and without limiting the scope of the present invention, the hottest isotherm 323 (closest to downhole in-well heater 315) is shown in FIG. 3E at 900 degrees Celsius; whereas, the coolest isotherm 323 (furthest from downhole in-well heater 315) is shown in FIG. 3E at 100 degrees Celsius. The vertical arrow shown on the left-side of FIG. 3E shows the direction vertically upwards to terrestrial surface 207 while the horizontal arrow on the bottom of FIG. 3E depicts the direction into the rock matrix of this cap-zone 303 and away from downhole in-well heater 315. In some embodiments, the information shown in FIG. 3E may be computed, determined, modeled, and/or the like with the use of 3D thermal numerical simulators which are generally available in the industry and well known in the prior art.

FIG. 3F may show the same temperature profile, via isotherms 323, as in FIG. 3E, except FIG. 3F may be from a different viewing angle, namely, a partial schematic cross-sectional top (plan) view. In FIG. 3F portions of downhole in-well heater 315, (reamed and/or milled) void-volume 309, and of vertical-wellbore 301 are shown. Note, for simplicity radial-hole(s) 307 are omitted in FIG. 3F and not accounted for in FIG. 3F (accounting for the radial-hole(s) 307 would change the shape/patterns of the isotherms 323 shown in FIG. 3F). In FIG. 3F, heat is emanating from downhole in-well heater 315 and via conduction is flowing into rock of cap-zone 303. A coolest isotherm 323 that is furthest away from downhole in-well heater 315, may delineate a heated-zone 325 and an unheated-zone 327. In this representative illustration, extending away from and closest to downhole in-well heater 315, within this cap-zone 303, may be hottest isotherms 323. The further away from downhole in-well heater 315, within this cap-zone 303, the isotherms may be cooler (may diminish). The temperatures shown in FIG. 3F attached for each isotherm 323 are in degrees Celsius and are merely for illustrative purposes (to show the overall temperature profile); i.e., actual temperatures may be both hotter and cooler (depending upon where in the melting or cooling process such a temperature snapshot may be taken).

The vertical arrow shown on the left-side of FIG. 3F and the horizontal arrow on the bottom of FIG. 3F both indicate directions into the rock matrix of this cap-zone 303 and away from downhole in-well heater 315. In some embodiments, the information shown in FIG. 3F may be computed, determined, modeled, and/or the like with the use of 3D thermal numerical simulators which are generally available in the industry and well known in the prior art.

FIG. 3G is a partial schematic cross-section side view illustrating a temperature profile, via isotherms 323, in a section of a given cap-zone 303 where a given geologic seal 321 is being formed. FIG. 3G is similar to FIG. 3E, except in FIG. 3G a focus of the depicted heat propagation is with respect to melted fill-material 311 flowing into the radial-hole(s) 307 that are (horizontally/laterally) drilled into the selected cap-zone 303; whereas, FIG. 3E and FIG. 3F do not directly show the heat propagation from the radial-hole(s) 307. However, as heating/melting continues the isotherms 323/temperature profile of FIG. 3G may begin to look more like the isotherms 323/temperature profile of FIG. 3E and FIG. 3F, e.g., as the native intact rock of selected cap-zone 303 melts.

FIG. 4A depicts a (nuclear and/or radioactive) waste repository sealing system 400 for a waste repository that may comprise at least one human-made cavern 401 (Super-SILO) that is entirely located within a deep geologic formation 403, from a schematic cross-sectional side view. During formation of human-made cavern 401, human-made cavern 401 may be in direct communication with terrestrial surface 207 via at least one interconnecting vertical-wellbore 301. To create human-made cavern 401, vertical-wellbore 301 is first formed from terrestrial surface 207 and into deep geologic formation 403, using a drill-rig 405 located on terrestrial surface 207. Once vertical-wellbore 301 has reached deep geologic formation 403, then under-reaming operations may be carried out to form human-made cavern 401 entirely within deep geologic formation 403.

Note, deeply located human-made caverns 401 (SuperSILOs) are also described in U.S. patents 10,807,132 and 11,085,270. See U.S. patents 10,807,132 and 11,085,270 with respect to details pertaining to such human-made caverns, its associated vertical-wellbore, and its deep geologic formation where the human-made caverns are formed within. U.S. patents 10,807,132 and 11,085,270 are incorporated by reference as if fully set forth herein. Further note, the deeply located human-made caverns (SuperSILOs) shown and described in U.S. patents 10,807,132 and 11,085,270 utilize different reference numeral schedules as compared against the reference numeral schedule in this present patent application.

Once, human-made cavern 401 is formed, then waste 407 may be landed into human-made cavern 401 from terrestrial surface 207, via/through vertical-wellbore 301. In some embodiments, waste 407 may be nuclear waste, HLW waste, SNF waste, LLW waste, radioactive waste, radionuclide waste, hazardous waste, dangerous waste, derivatives thereof, byproducts thereof, portions thereof, combinations thereof, and/or the like.

Continuing discussing FIG. 4A, with respect to waste repository sealing system 400, in some embodiments, vertical-wellbore 301 must pass through at least one cap-zone 303 that is located above deep geologic formation 403. In terms of timing with respect to the melting or cooling process, FIG. 4A is shown at a point in time that matches the timing shown in FIG. 3C, i.e., when: (1) vertical-wellbore 301 has been formed (and passing through at least one overlain selected cap-zone 303; (2) rock material (fill-material 311) taken from that selected cap-zone 303 is saved for backfill later use (and crushed or crushed later before the backfill); (3) human-made cavern 401 has been formed within deep geologic formation 403; (4) human-made cavern 401 has been filled with at least some waste 407; (5) one or more radial-hole(s) 307 have been formed into the at least one selected cap-zone 303; (6) at least some casing 305 has been removed from vertical-wellbore 301 within that at least one selected cap-zone 303 to form void-volume 309; (7) (optionally) void-volume 309 may be further extended (expanded) into that selected cap-zone 303; (8) lower-plug 313 is installed within vertical-wellbore 301 below the selected cap-zone 303 with the radial-hole(s) 307 and/or with (extended) void-volume 309 but above human-made cavern 401 (note this step may have been executed after human-made cavern 401 had its waste 407 landed therein); (9) fill-material 311 is crushed and at least one chemical-additive is added to the crushed fill-material 311 (note, this step may be executed after the fill-material 311 is first obtained from cored cap-zone 303, but before backfilling the fill-material 311 into void-volume 309); (10) downhole in-well heater 315 and fill-material 311 are landed within vertical-wellbore 301, within void-volume 309, at the selected cap-zone 303 with the radial-hole(s) 307 and/or with (extended) void-volume 309; (11) within vertical-wellbore 301, at the selected cap-zone 303 with the radial-hole(s) 307 and/or with (extended), void-volume 309 is further/completely filled with fill-material 311 so that downhole in-well heater 315 is entirely covered by fill-material 311; and (12) (optionally) downhole in-well heater 315 is activated to commence heating of fill-material 311 along with interfacing rock of that cap-zone 303, with a goal of melting and fusing these interfacing rock materials together. In terms of timing with respect to the melting or cooling process, FIG. 4A is shown at a point in time that is before the timing shown in FIG. 3D.

In FIG. 4A, cable 317 may run from downhole in-well heater 315 to a power-source 409 located on terrestrial surface 207 near a well-head 411 for vertical-wellbore 301. In some embodiments, cable 317 may be a plurality of cables, wires, conduits, lines, and/or the like. In some embodiments, some cables, wires, conduits, lines, and/or the like of cable 317 may be configured for structural loads, others for communicating powers, and others for communicating commands, instructions, information, signals, data, and/or the like. In some embodiments, power-source 409 may be configured to provide power to downhole in-well heater 315, via interconnecting cable 317. In some embodiments, the power from power-source 409 and/or communicated via cable 317 may be electrical, hydraulic, compressed gas/fluid, mechanical, portion thereof, combinations thereof, and/or the like. In some embodiments, cable 317 may also be configured to provide a means of providing downhole in-well heater 315 with control and/or instructions communications/signals and/or to receive from downhole in-well heater 315 status information and/or feedback of downhole in-well heater 315.

FIG. 4A may depict a system for storing and/or disposing of nuclear/radioactive waste materials 407, within at least one human-made cavern 401, wherein the at least one human-made cavern 401 is located within a given deep rock (geologic) formation 403. In some embodiments, a given human-made cavern 401 is always within a given deeply located rock/geologic formation 403 and is never shallowly located below terrestrial surface 207 (i.e., human-made cavern 401 is always deeply located below terrestrial surface 207). FIG. 4A may not be to scale. In some embodiments, the waste-materials 407 stored within internal volume of a given human-made cavern 401 may be combinations of LLW materials.

Continuing discussing FIG. 4A, in some embodiments, a substantially vertical wellbore 301 may be drilled from the Earth's surface 207 to deeply located rock formation 403 using a drill-rig 405 located at a drill site (e.g., at well-head 411) on the Earth's surface 207. In some embodiments, a distal portion of that substantially vertical-wellbore 301 (e.g., distal from Earth's surface 207) may be under-reamed into deeply located rock formation 403 to form the given human-made cavern 401 (SuperSILO). In some embodiments, in practice vertical wellbore 301 and/or human-made cavern 401 may be drilled and/or under-reamed using air and/or foam as the drilling fluid. Air drilling and/or foam drilling are well-established in the oil field drilling industries, and they may be implemented relatively rapidly to drill a given vertical-wellbore 301 and/or to under-ream to form a given human-made cavern 401. In some embodiments, "vertical" in this context may be at least substantially (mostly) parallel with a direction of a local gravitational vector at that well site (e.g., at well-head 411) on the Earth's surface 207. In some embodiments, vertical-wellbore 301 may communicatively link human-made cavern 401 to the Earth's surface 207 at the drill site and/or to drill-rig 405 (at least until vertical-wellbore 301 is sealed with geologic seal 321 in and continuous with a given cap-zone 303). In some embodiments, an internal volume of the human-made cavern 401 is the volumetric space in which the waste materials 407 are stored (emplaced).

Continuing discussing FIG. 4A, in some embodiments, vertical-wellbore 301 may provide a safe and effective pathway for loading the waste materials 407 into the given human-made cavern 401 from the Earth's surface 207. In some embodiments, vertical-wellbore 301 may be fixed, static, and/or non-variable, with respect to diameter, width, and/or length of vertical-wellbore 301. In some embodiments, a given diameter of vertical-wellbore 301 may be selected from a range of fifteen (15) inches to thirty-six (36) inches, plus or minus three (3) inches. Such diameter sizes for vertical-wellbore 301 may permit ease of transit of a variety of waste materials 407. In some embodiments, there may be at least one dedicated vertical wellbore 301 per a given human-made cavern 401.

Continuing discussing FIG. 4A, in some embodiments, deeply located rock (geologic) formation 403 may be a deeply located geological rock formation. In some embodiments, formation 403 may be an igneous rock (like granite), a metamorphic rock, a tight shale, portions thereof, combinations thereof, and/or the like. In some embodiments, deep geologic formation 403 may be located at a minimum depth from 2,000 feet to 12,000 feet, plus or minus 1,000 feet, from the Earth's surface 207 (and then may extend further below the Earth's surface 207 from that minimum top depth). In some embodiments, vertical depth from Earth's surface 207 to a top of human-made cavern 401 may be a depth from 2,000 feet to 12,000 feet, plus or minus 1,000 feet. In some embodiments, a given human-made cavern 401 may be located (entirely) within a given formation deep geologic formation 403. In some embodiments, vertical-wellbore 301 may have a fixed, static, and/or non-variable length from the Earth's surface 207 to deep geologic formation 403 and/or to human-made cavern 401.

Continuing discussing FIG. 4A, in some embodiments, a given human-made cavern 401 may have a fixed, static, and/or non-variable (vertical) height (extending downwards into deep geologic formation 403). In some embodiments, a given human-made cavern 401 may have a fixed, static, and/or non-variable (vertical) predetermined (vertical) height (extending downwards into deep geologic formation 403). In some embodiments, a given human-made cavern 401 may have a fixed, static, and/or non-variable (vertical) (vertical) height (extending downwards into deep geologic formation 403) selected from a range of 2,000 feet to 10,000 feet, plus or minus 500 feet. In some embodiments, a (vertical) height (extending downwards into deep geologic formation 403) of human-made cavern 401 may be other predetermined heights (lengths).

Continuing discussing FIG. 4A, in some embodiments, drill-rig 405 (at the drill site [e.g., well-head 411] on the Earth's surface 207) may be used to: operate drilling equipment to form vertical-wellbore 301; to operate under-reaming equipment to form a human-made cavern 401; to facilitate loading (or unloading) of the waste materials 407 into (or out of) the given human-made cavern 401 through vertical-wellbore 301; portions thereof; combinations thereof; and/or the like. In some embodiments, drill-rig 405 may be of a type and/or a size commonly used in oilfield wellbore drilling operations. More than one type/size of drill-rig 405 may be used.

Continuing discussing FIG. 4A, in some embodiments, a top of a given human-made cavern 401 (SuperSILO) may normally be below a top of a given deeply located rock/geologic formation 403 where the given human-made cavern 401 may be implemented within. For example, and without limiting the scope of the present invention, the top of the given deeply located rock/geologic formation 403 may be up to 12,000 feet below the surface 207. In some cases, it may be possible that given human-made cavern 401 may be fully surrounded by the same/homogenous type rock (the given deeply located rock/geologic formation 403) which meets the prerequisite requirements/desires for good disposal and allows a surface or wall material continuity for that given human-made cavern 401.

Continuing discussing FIG. 4A, in some embodiments, the (nuclear/radioactive) waste disposal system may comprise surface storage operations facilities. In some embodiments, surface storage operations facility may be located on or proximate to the Earth's surface 207. In some embodiments, surface storage operations facilities may be located near, adjacent, proximate, and/or the like to the drill site (e.g., well-head 411) and/or to drill-rig 405. In some embodiments, surface storage operations facilities may house and/or store: equipment for drilling out vertical-wellbore 301; equipment for under-reaming human-made cavern 401; equipment for loading (or unloading) waste materials 407 into (or out of) human-made cavern 401; loading equipment; waste materials 407; portions thereof; combinations thereof; and/or the like.

Continuing discussing FIG. 4A, in some embodiments, a given human-made cavern 401 may comprise stored waste materials 407 which may be loaded from the Earth's surface 207 drill site location (e.g., well-head 411) by mechanical and/or by gravitational means operated and/or controlled via drilling-rig 405 which may facilitate loading of the waste materials 407, in selected batches, via the substantially vertical-wellbore 301 into the given human-made cavern 401. In some embodiments, waste materials 407 stored within a given human-made cavern 401 may be a variety of nuclear and/or radioactive waste materials. In some embodiments, it is contemplated that in a single human-made cavern 401 there may be hundreds of thousands of pounds of waste materials 407 in that given single human-made cavern 401.

Continuing discussing FIG. 4A, in some embodiments, a given vertical-wellbore 301 may be sealed off (closed off) with one or more wellbore plug(s) 313 and/or plug(s) 413. In some embodiments, wellbore plug(s) 313 and/or 413 may be used to seal off (close off) vertical-wellbore(s) 301. In some embodiments, one or more wellbore plug(s) 313 may be deposited within the at least one vertical-wellbore 301, with an intention to permanently and/or completely closing off and/or sealing off that the at least one vertical-wellbore 301 from surface 207. In some embodiments, plug 313 may be at least one lower-plug 313. In some embodiments, plug 413 may be at least one upper-plug 413 (shown in FIG. 4B). In some embodiments, lower-plug 313 may be located within vertical-wellbore 301, above deep human-made cavern 401 and below a given select cap-zone 303 that is intended to receive geologic seal 321 formed continuous therein. See e.g., the above discussion of FIG. 3C and lower-plug 313.

Continuing discussing FIG. 4A, in some embodiments, a selected and/or a given cap-zone 303 may comprise a continuous areal geological layer of variable thickness that has the property to prevent the migration of fluid or other material from the deeply below located waste repository zone (deep geologic formation 403 with at least one human-made cavern 401). In some embodiments, a given cap-zone 303 may have been selected during the vertical-wellbore 301 drilling process based on the analysis of the well logging data which may have indicated that the selected cap-zone 303 may be an adequate fluid migratory seal or blockage. In some embodiments, a single such determined competent cap-zone 303 is adequate for sealing the disposed waste material 407 from upwards migration past that given cap-zone 303 that is located above deep geologic formation 403. In actual practice, several such determined competent cap-zones 303 may be available above a given deep geologic formation 403; especially when multiple sedimentary rock formations have been deposited sequentially over geological time in a given geological basin. In some embodiments, a cap-zone 303 may be selected based on the petrophysical analysis routinely done in drilling operations. In some embodiments, a selected cap-zone 303 (for continuous geologic seal 321 implementation therein) may have: adequate thickness (which is noted in the below next paragraph), lowest vertical permeability (as compared to other possible cap-zones 303 at that location), and largest areal (x,y) (as compared to other possible cap-zones 303 at that location) extent to encompass the waste repository 401 located deeply below.

Continuing discussing FIG. 4A, in some embodiments, a selected cap-zone 303 may comprise at least one geological layer that has the ability to prevent the upwards migration of fluids or other materials from the waste repository zone 401 located deeply below in deep geologic formation 403 and past that selected cap-zone 303. In some embodiments, a selected cap-zone 303 may be located between 1,000 feet and 10,000 feet below the terrestrial surface 207. In some embodiments, a selected cap-zone 303 vertical thickness may be between ten (10) feet to 100 feet thick, +/− five (5) feet. In some embodiments, the adequate vertical thickness for cap-zone 303 may be at least ten (10) feet; and/or the adequate vertical thickness for cap-zone 303 may be at least two (2) feet taller than downhole in-well heater 315. Tight or relatively impermeable sedimentary rock formations like shales or the like may be selected as a given cap-zone 303 for subsequent implementation of the melted and cooled continuous geologic seal 321 located within that selected cap-zone 303. These shale zones have permeability values that are many thousand times less than common sandstone or other rock formations normally encountered in oil and gas exploration and development. For example, and without limiting the scope of the present invention, most deep shales exhibit between 0.001 mD and 0.0001 mD (millidarcy) permeability values. In some embodiments, a shale permeability of at least 0.001 mD may be sufficient for use as a selected cap-zone 303. In some embodiments, a shale permeability of at least 0.0001 mD may be sufficient for use as a selected cap-zone 303.

In some embodiments, at least one (selected) cap-zone 303 may be at least one sedimentary rock formation with a maximum permeability of 0.01 mD.

In some embodiments, of formation continuous geologic seal 321 with is surrounding selected cap-zone 303, via melting and cooling of the pyro-metamorphic processes illustrated herein, the cooled (resolidified and/or re-crystalized) metamorphosed products may resemble those of the industrial sintered-rock processes; and in these industrial sintered-rock processes, the final resultant of the melt are products that are essentially impermeable with reported porosities less than 0.09%.

It should be stressed herein that in this patent application, a given shale formation that is selected for use as a given cap-zone 303, is not being used to store or dispose of (nuclear and/or radioactive) waste therein, as some nuclear waste disposal researchers have suggested. Rather, and in contrast, the tight shale formations discussed herein, is being selected to provide and function as a cap-zone 303 barrier to prevent upwards migration of the waste 407 from the repository system 401 getting past the selected cap-zone 303. Additionally, the given shale formation that is selected for use as a given cap-zone 303, is not being used herein to extract oil, gas, and/or other materials out of.

Continuing discussing FIG. 4A, in some embodiments, physical and mechanical modifications may be made in the interface between the vertical-wellbore 301 and the selected cap-zone 303 that the vertical-wellbore 301 passes through. These modifications may make the selected cap-zone 303 closure (melting and cooling) operations easier, more efficient, stronger, and/or the like. See e.g., the above discussion of FIG. 3A and its radial-hole(s) 307. In some embodiments, two or more radial-holes 307 may be jet drilled (or the like), using surface drill systems, into the selected cap-zone 303 rock by routine jet drilling operations and from the interface with the vertical-wellbore 301. In some embodiments, these radial-holes 307 may provide conduits for melted fill-material 311 to flow into during the melting operations. In some embodiments, these radial-holes 307 flow channels may provide the hot melt 311 distribution and enhanced high temperature conduction needed to make the overall rock melting process more efficient and/or resulting in a continuous geologic seal 321 that is more thoroughly integrated into its immediately surrounding cap-zone 303 rock matrix. In some embodiments, radial-hole(s) 307 may be from two (2) to three (3) inches in diameter, +/− one (1) inch. In some embodiments, radial-hole(s) 307 may extend five (5) feet, +/− one-half (0.5) feet, laterally (horizontally) into the selected cap-zone 303 from vertical-wellbore 301. In some embodiments, the downhole in-well jet drilling equipment may be removed from the vertical-wellbore 301 once the radial-hole(s) 307 have been formed within the selected cap-zone 303.

Furthermore, in some embodiments, the two or more radial-holes 307 may be equidistant circumferentially disposed around the vertical-wellbore 301, within the selected cap-zone 303, at selected vertical locations. In some embodiments, the two or more radial-holes 307 may be (equidistant) circumferentially disposed around the vertical-wellbore 301, within the selected cap-zone 303, at selected vertical locations; which in some embodiments, may be similar to the arrangement shown in FIG. 1D for oil conveying radial holes 121. In some embodiments, radial-hole(s) 307 may allow melted cap zone fluid 311 to more easily move away from the vertical-wellbore 301 zone further into the rock matrix of the selected cap-zone 303. By moving further into the rock matrix of the selected cap-zone 303, the melted cap zone material 311 may aid in increasing the overall melt-zone 319 (heated-zone 325) volume; and may contribute to a faster heating of the rock matrix of the selected cap-zone 303 adjacent to the vertical-wellbore 301. This increased and wider melt-zone 319 (heated-zone 325) volume in the selected cap-zone 303 may provide a more effective fluid and migratory seal when the melt zone material 321 finally cools and recrystallizes (see e.g., FIG. 3D).

Continuing discussing FIG. 4A, in some embodiments, after the jet drilling operations within the vertical-wellbore 301 have formed the radial-hole(s) 307, then at least some portions of the (steel) casing 305, within that selected cap-zone 303 and towards the rock matrix of that selected cap-zone 303, may be milled out (reamed out), removing those portions of casing 305, to provide a direct contact between at least some of the vertical-wellbore 301 and that selected cap-zone 303 rock. See e.g., FIG. 3B. This now open hole section of void-volume 309 may allow the crushed fill-material 311 which is placed in the vertical-wellbore 301 later, to be in direct physical contact with the selected cap-zone 303 rock. In some embodiments, operationally, it may be beneficial and/or desirable to perform the mill out (ream out) processes that result in void-volume 309, after the radial (and lateral) jet drilling operations that form the radial-hole(s) 307, because the presence of the wellbore casing 305 provides mechanical support for the jet drilling equipment and/or for better/more efficient radial (and lateral) jetting operations.

Continuing discussing FIG. 4A, in some embodiments, the interface at the vertical-wellbore 301 and the native intact cap-zone 303 rock is void-volume 309. In some embodiments, a vertical height of void-volume 309 may be as large or slightly larger than a vertical height of the downhole in-well heater 315. In some embodiments, void-volume 309 may need only to be as large as the milled-out (reamed out) section of vertical-wellbore 301 casing 305 discussed above. The reaming operation, to form void-volume 309, may provide an enlarged cylindrical space/volume which may be later filled by crushed cap rock material 311. In some embodiments, void-volume 309 may enlarge the vertical-wellbore 301 to 1.5 times the original vertical-wellbore 301 diameter size. In some embodiments, void-volume 309 may diameter may be between two (2) and three (3) times a diameter of vertical-wellbore 301. In some embodiments, the crushed rock material 311 may later fill this reamed out void-volume 309 (along with downhole in-well heater 315).

Continuing discussing FIG. 4A, in some embodiments, the downhole in-well heater 315 may be lowered into vertical-wellbore 301 to be located within void-volume 309 of the selected cap-zone 303. In some embodiments, the downhole in-well heater 315 may be axially centrally located within void-volume 309 of the selected cap-zone 303. In some embodiments, a particular placement location (e.g., height/vertical position) of the downhole in-well heater 315 within void-volume 309 of the selected cap-zone 303, may be determined by finite element computer simulation modelling and temperature profile (isotherms) analysis of the selected cap-zone 303 during heating, melting, and cooling operations as discussed earlier in FIG. 3D to FIG. 3F. In some embodiments, an optimal downhole in-well heater 315 position selection within void-volume 309 of the selected cap-zone 303 (e.g., from the finite element computer simulation modelling and temperature profile [isotherms] analysis), may make the overall heating, melting, and/or cooling operation(s) more efficient and provide a resulting cap-zone 303 system which when cooled, provides the resulting cap-zone 303 system that may block waste 407 from moving past that resulting cap-zone 303 system.

Continuing discussing FIG. 4A, in some embodiments, the downhole in-well heater 315 may be lowered into the wellbore 301 via its attached cable 317. In some embodiments, cable 317 may be connected to the power supply 409 on the terrestrial surface 207 (and to the downhole in-well heater 315). In some embodiments, the downhole in-well heater 315 may have a sinker weight to keep cable 317 in tension. In some embodiments, cable 317 may have a rapid disconnect or break-away device which allows the downhole in-well heater 315 to be jettisoned after the heat/melt operations are terminated. In some embodiments, the downhole in-well heater 315 may permanently remain inside the cooled melt (e.g., as shown in FIG. 4B and/or in FIG. 3D).

Continuing discussing FIG. 4A, in some embodiments, the melt-zone 319 may develop during the heating process and extend areally and vertically to form a continuum of melted material 311/321. It is contemplated that this melt-zone 319 may re-crystallize and completely seal the below deeply located human-made cavern 401 from above the selected cap-zone 303 by forming a continuous solid rock zone that now is distributed across the selected cap-zone 303 section completely. Furthermore, by controllably cooling the melt-zone 319, for example, by monitoring the downhole in-well heater 315 behavior, recrystallization of the melt-zone 319 may occur in a manner which may provide a resulting solid rock matrix that is extremely impermeable to fluids; and thus, a near perfect geologic seal at the selected cap-zone 303 between terrestrial surface 207 and human-made cavern 401/deep geologic formation 403.

FIG. 4B shows the same (nuclear and/or radioactive) waste repository sealing system 400 for the waste repository that may comprise at least one human-made cavern 401 (SuperSILO) that is entirely located within a deep geologic formation 403, from the same schematic cross-sectional side view of FIG. 4A; except, FIG. 4B is shown further out in time from FIG. 4A, where melt-zone 319 has cooled sufficiently for the rock materials to fuse, resolidify, and/or recrystallize such that the geologic seal 321 is now integrally fused with its immediately surrounding cap-zone 303 rock matrix. In terms of timing with respect to the melting or cooling process, FIG. 4B is shown at a point in time that is the same or after the timing shown in FIG. 3D. FIG. 4B may not be to scale.

FIG. 4B may illustrate when the rock melting/cooling processes have been completed and sufficiently cooled. In some embodiments, once the rock melting/cooling processes have been completed and sufficiently cooled, then downhole in-well heater 315 may be disconnected from its cable 317; and cable 317 may be removed from vertical-wellbore 301 above the used/implemented cap-zone 303. In some embodiments, once the rock melting/cooling processes have been completed and sufficiently cooled, then downhole in-well heater 315 may remain within cooled, solid, and crystallized geologic seal 321. Note, downhole in-well heater 315 is only shown in FIG. 4B to illustrate the permanent retention of downhole in-well heater 315 within cooled, solid, and crystallized geologic seal 321; however, in reality, downhole in-well heater 315 may be entirely surrounded by cooled, solid, and crystallized geologic seal 321 material. In some embodiments, the used/implemented cap-zone 303 region may now comprise a continuous rock layer, region, and/or section of melted, cooled, resolidified, and recrystallized rock material of both fill-material 311 and of native intact cap-zone 303 rock material that was melted and fused to the fill-material 311. In some embodiments, vertical-wellbore 301 may be interrupted by this used/implemented cap-zone 303 region. In some embodiments, this used/implemented cap-zone 303 region may prevent, block, prohibit, restrict, and/or mitigate upwards movement of waste 407 from human-made cavern 401 (within deep geologic formation 403) getting past this fluid impermeable region of used/implemented cap-zone 303.

Continuing discussing FIG. 4B, in some embodiments, the given vertical wellbore 301 may be additionally sealed off (closed off) above the modified cap-zone 303 region by implementation of at least one upper-plug 413 (e.g., as discussed below in FIG. 6 and/or step 637). In some embodiments, structurally, from a material of construction perspective, and/or as to how implemented, upper-plug 413 may be the same or substantially the same as lower-plug 313; except that, upper-plug 413 may be located above a given cap-zone 303 and lower-plug 313 may be located below that cap-zone 303. Additionally, upper-plug 413 may be implemented at different times from implementing lower-plug 313. In some embodiments, upper-plug 413 may be emplaced within vertical-wellbore 301 after downhole in-well heater 315 has melted backfilled fill-material 311 to at least some of immediately adjacent cap-zone 303 rock material. In some embodiments, upper-plug 413 may be emplaced within vertical-wellbore 301 after the timing of FIG. 4A has completed and at least begun to cool. In some embodiments, upper-plug 413 may be emplaced within vertical-wellbore 301 after the timing of FIG. 3D has commenced or completed. In some embodiments, upper-plug 413 may be emplaced within vertical-wellbore 301 after cable 317 has been removed from vertical-wellbore 301. In some embodiments, upper-plug 413 may be packer device (as that term is used in the oil/gas well drilling operations). In some embodiments, upper-plug 413 may be comprised of a steel device, durable HTHP (high temperature and high pressure) elastomers, cement, drilling mud, bentonite backfill, portions thereof, combinations thereof, and/or the like. In some embodiments, upper-plug 413 is never located within deep geological formation 403.

FIG. 5A shows a (nuclear and/or radioactive) waste repository sealing system 500 for a waste repository that may comprise at least one human-made (at least substantially) horizontal (lateral) running/oriented wellbore 501 (SuperLAT) that is entirely located within a deep geologic formation 403, from a schematic cross-sectional side view. Waste repository sealing system 500 of FIG. 5A and of FIG. 5B is similar to waste repository sealing system 400 of FIG. 4A and of FIG. 4B, except that the waste repository is implemented in a different format. In waste repository sealing system 400 the waste repository is in the format of at least one human-made cavern 401 located (entirely) within a deep geologic formation 403 (as discussed above); whereas, in waste repository sealing system 500 the waste repository is in the format of at least one horizontal-wellbore 501 located (entirely) within a deep geologic formation 403. Otherwise, waste repository sealing system 500 and waste repository sealing system 400 may be at least substantially similar. For example, and without limiting the scope of the present invention, both waste repository sealing system 500 and waste repository sealing system 400 may comprise at least one (one or more): vertical-wellbore 301 that distally (away from terrestrial surface 207) terminates in the given waste repository (horizontal-wellbore 501 or human-made cavern 401); the waste repository (horizontal-wellbore 501 or human-made cavern 401) may be entirely located within deep geologic formation 403; drill-rig 405; waste 407 (although waste 407 in horizontal-wellbore 501 may be encapsulated); power-source 409 (which may be used during heating, melting, and/or cooling processes); well-head 411 (located at the top of vertical-wellbore 301); a selected cap-zone 303 region (disposed between terrestrial surface 207 and deep geologic formation 403); a portion of the vertical-wellbore 301 that passes through that selected cap-zone 303 or the portion of the vertical-wellbore 301 is intercepted (bisected) by that selected cap-zone 303; radial-hole(s) 307 within that selected cap-zone 303; (extended) void-volume 309 within that selected cap-zone 303; an emplaced lower-plug 313; the void-volume 309 filled with fill-material 311 and with at least one downhole in-well heater 315; (optionally) upper-plug 413; portions thereof; combinations thereof; and/or the like.

Continuing discussing FIG. 5A, during formation of human-made horizontal-wellbore 501, human-made horizontal-wellbore 501 may be in direct communication with terrestrial surface 207 via at least one interconnecting vertical-wellbore 301. To create human-made horizontal-wellbore 501, vertical-wellbore 301 is first formed from terrestrial surface 207 and into deep geologic formation 403, using a drill-rig 405 located on terrestrial surface 207. Once vertical-wellbore 301 has reached deep geologic formation 403, then the distal end portion of vertical-wellbore 301 (disposed away from terrestrial surface 207) may be turned from the at least substantially vertical direction into the at least substantially horizontal (lateral) direction with further drilling operations then carried out to form at least one human-made horizontal-wellbore 501 entirely within deep geologic formation 403. Thus, the distal end of vertical-wellbore 301 integrally and physically connects to the beginning of deeply located human-made horizontal-wellbore 501 (SuperLAT). In some embodiments, the distal portion of vertical-wellbore 301 is operatively in direct physical communication with the beginning of deeply located human-made horizontal-wellbore 501.

Note, deeply located human-made horizontal-wellbores 501 (SuperLATs) are also described in U.S. patents 10,427, 191 and 11,289,234. See U.S. patents 10,427,191 and 11,289,234 with respect to details around such human-made horizontal-wellbores, its associated vertical-wellbore, and its deep geologic repository formation. U.S. patents 10,427,

US 12,603,189 B2

35

191 and 11,289,234 are incorporated by reference as if fully set forth herein. Further note, the deeply located human-made horizontal-wellbores 501 (SuperLATs) shown and described in U.S. patents 10,427,191 and 11,289,234 utilize different reference numeral schedules as compared against the reference numeral schedule in this present patent application.

Once, human-made horizontal-wellbore 501 is formed (entirely within deep geologic formation 403), then waste 407 may be landed into that human-made horizontal-wellbore 501 from terrestrial surface 207, via/through vertical-wellbore 301 (and with or without assistance from drill-rig 405).

Continuing discussing FIG. 5A, with respect to waste repository sealing system 500, in some embodiments, vertical-wellbore 301 must pass through at least one selected cap-zone 303 that is located above deep geologic formation 403. In terms of timing with respect to the melting or cooling process, FIG. 5A is shown at a point in time that matches the timing shown in FIG. 3C, i.e., when: (1) vertical-wellbore 301 has been formed (and passing through at least one overlain selected cap-zone 303; (2) rock material (fill-material 311) taken from that selected cap-zone 303 is saved for backfill later use (and crushed or crushed later before the backfill); (3) human-made horizontal-wellbore 501 has been formed within deep geologic formation 403; (4) human-made horizontal-wellbore 501 has been filled with at least some waste 407 (waste 407 within human-made horizontal-wellbore 501 may be encapsulated); (5) one or more radial-hole(s) 307 have been formed into the selected cap-zone 303; (6) at least some casing 305 has been removed from vertical-wellbore 301 within that selected cap-zone 303 to form void-volume 309; (7) (optionally) void-volume 309 may be further extended (expanded) into that selected cap-zone 303; (8) lower-plug 313 is installed within vertical-wellbore 301 below that selected cap-zone 303 with the radial-hole(s) 307 and/or with (extended) void-volume 309 but above human-made horizontal-wellbore 501 (note this step may have been executed after human-made horizontal-wellbore 501 had its waste 407 landed therein); (9) fill-material 311 is crushed and at least one chemical-additive is added to the crushed fill-material 311 (note, this step may be executed after the fill-material 311 is first obtained from cored cap-zone 303, but before backfilling the fill-material 311 into void-volume 309); (10) downhole in-well heater 315 and fill-material 311 are landed within vertical-wellbore 301, within void-volume 309, at the selected cap-zone 303 with the radial-hole(s) 307 and/or with (extended) void-volume 309; (11) within vertical-wellbore 301, at the selected cap-zone 303 with the radial-hole(s) 307 and/or with (extended) void-volume 309 is further/completely filled with fill-material 311 so that downhole in-well heater 315 is entirely covered by fill-material 311; and (12) (optionally) downhole in-well heater 315 is activated to commence heating of fill-material 311 along with interfacing rock of that cap-zone 303, with a goal of melting and fusing these interfacing rock materials together. In terms of timing with respect to the melting or cooling process, FIG. 5A is shown at a point in time that is before the timing shown in FIG. 3D.

In FIG. 5A, cable 317 may run from attached downhole in-well heater 315 to an attached power-source 409 located on terrestrial surface 207 near a well-head 411 for vertical-wellbore 301. In some embodiments, power-source 409 may be configured to provide power to downhole in-well heater 315, via interconnecting cable 317. In some embodiments, the power from the power-source 409 and communications from a controller may be communicated via cable 317. In some embodiments, the power from the power-source 409, and communicated via cable 317, may be electrical, hydraulic, compressed gas/fluid, mechanical, portion thereof, combinations thereof, and/or the like. In some embodiments, the power and heater control instructions may be communicated differently and/or separately via cable 317.

Continuing discussing FIG. 5A, in some embodiments, a given horizontal-wellbore 501 is always within a given deeply located rock/geologic formation 403 and is never shallowly located below terrestrial surface 207 (i.e., horizontal-wellbore 501 is always deeply located below surface 207). FIG. 5A may not be to scale. In some embodiments, the waste 407 stored (disposed of) within the internal volume of a given horizontal-wellbore 501 be HLW materials. In some embodiments, the waste 407 stored (disposed of) within the internal volume of a given horizontal-wellbore 501 be predominantly (mostly) HLW materials. In some embodiments, the HLW material may comprise spent nuclear fuel assemblies (SNF), portions thereof, combinations thereof, and/or the like.

Continuing discussing FIG. 5A, in some embodiments, a substantially (mostly) vertical-wellbore 301 may be drilled from the Earth's surface 207 to deeply located rock formation 403 using a drill-rig 405 located at a drill site (well-head 411) on the Earth's surface 207. In some embodiments, a distal portion of that substantially vertical-wellbore 301 (e.g., distal from Earth's surface 207) may be turned to the horizontal (lateral) direction within the repository zone 403 formation to begin forming the given horizontal-wellbore 501 (SuperLAT) within that deep geologic (rock) formation 403. In some embodiments, in practice vertical-wellbore 301 and/or horizontal-wellbore 501 may be drilled using air and/or foam as the drilling fluid. Air drilling and/or foam drilling are well-established in the oil field drilling industries, and they may be implemented relatively rapidly to drill a given vertical-wellbore 301 and/or to extend horizontally to form a given lateral horizontal-wellbore 501. In some embodiments, "vertical" in this context may be substantially (mostly) parallel with a direction of a local gravitational vector at that well site; and "horizontal" or "lateral" may be at least substantially (mostly) perpendicular with the vertical direction. In some embodiments, vertical-wellbore 301 may communicatively/operatively link horizontal-wellbore 501 to the Earth's surface 207 at the drill site (e.g., at well-head 411) and/or to drill-rig 405. In some embodiments, the internal volume of the lateral horizontal-wellbore 501 is the volumetric space (as defined by the horizontal/lateral length of the given horizontal-wellbore 501 and its inside diameter) in which the waste 407 materials are stored (emplaced).

Continuing discussing FIG. 5A, in some embodiments, vertical-wellbore 301 may provide a safe and effective pathway for loading the waste 407 (e.g., in waste capsules form) into the given lateral horizontal-wellbore 501 from the Earth's surface 207. In some embodiments, vertical-wellbore 301 may be fixed, static, and/or non-variable, with respect to diameter, width, and/or length of vertical-wellbore 301. In some embodiments, a given diameter of vertical-wellbore 301 may be selected from a range of fifteen (15) inches to thirty-six (36) inches, plus or minus three (3) inches. Such diameter sizes for vertical-wellbore 301 may permit ease of transit of a variety of waste 407 materials (e.g., with the waste 407 inside of capsules). In some embodiments, there may be at least one dedicated vertical-wellbore 301 per a given lateral horizontal-wellbore 501.

Continuing discussing FIG. 5A, in some embodiments, horizontal-wellbore 501 may be fixed, static, and/or non-variable, with respect to diameter, width, and/or length of horizontal-wellbore 501 at any given location along horizontal-wellbore 501. In some embodiments, a given diameter of horizontal-wellbore 501 may be selected from a range of fifteen (15) inches to thirty-six (36) inches, plus or minus three (3) inches. Such diameter sizes for horizontal-wellbore 501 may permit ease of transit of a variety of waste 407 materials (e.g., with the waste 407 inside of capsules). In other embodiments, a different diameter of horizontal-wellbore 501 may be used.

Continuing discussing FIG. 5A, in some embodiments, drill-rig 405 (at the drill site [well-head 411] on the Earth's surface 207) may be used to: operate drilling equipment to form vertical-wellbore 301; to operate specialized steerable drilling equipment to form human-made lateral horizontal-wellbore(s) 501; to facilitate loading (or unloading) of the waste 407 (e.g., with the waste 407 within capsules) into (or out of) the given horizontal-wellbore 501 through vertical-wellbore 301; portions thereof; combinations thereof; and/or the like.

Continuing discussing FIG. 5A, in some embodiments, each such horizontal-well-bore(s) 501 may be thus fully surrounded by the same/homogenous type rock (the given deeply located rock/geologic formation 403) which meets the prerequisite requirements/desires for good, safe, and effective (nuclear and/or radioactive) waste 407 disposal.

Continuing discussing FIG. 5A, in some embodiments, the disposal system 500 may comprise surface storage operations facilities. In some embodiments, surface storage operations facility may be located on or proximate to the Earth's surface 207. In some embodiments, surface storage operations facilities may be located near, adjacent, or proximate to the drill site and/or to drill-rig 405. In some embodiments, surface storage operations facilities may house and/or store: equipment for drilling out vertical-wellbore(s) 301; equipment for drilling lateral horizontal-wellbore(s) 501; equipment for loading (or unloading) waste 407 (e.g., within capsules) into (or out of) horizontal-wellbore(s) 501; loading equipment; waste 407; capsule(s) with waste 407 therein; portions thereof; combinations thereof; and/or the like.

Continuing discussing FIG. 5A, in some embodiments, a given horizontal-wellbore 501 may comprise stored waste 407 materials (wherein waste 407 may be within capsules) which may be loaded from the Earth's surface 207 drill site (well-head 411) location by mechanical and/or by gravitational means operated and/or controlled via drilling-rig 405 which may facilitate loading of the waste 407 materials, in selected batches, via the substantially (mostly) vertical-wellbore 301 that operatively and physically connects to the given horizontal-wellbore 501. In some embodiments, the waste 407 materials (wherein waste 407 may be within capsules) may be stored within a given horizontal-wellbore 501 may be a variety of nuclear waste materials. In some embodiments, it is contemplated that in a single lateral horizontal-wellbore 501 may dispose of hundreds or thousands of pounds of the waste 407 materials (wherein waste 407 may be within capsules) in that given single horizontal-wellbore 501.

Continuing discussing FIG. 5A, in some embodiments, a given vertical-wellbore 301 may be sealed off (closed off) with one or more wellbore plug(s) 313 and/or plug(s) 413. In some embodiments, wellbore plug(s) 313 and/or 413 may be used to seal off (close off) vertical-wellbore 301. In some embodiments, one or more wellbore plug(s) 313 and/or 413 may be deposited within the at least one vertical-wellbore 301, with an intention to permanently and/or completely closing off and/or sealing off that the at least one vertical-wellbore 301 (and its further down at least one horizontal-wellbore 501).

Continuing discussing FIG. 5A, in some embodiments, the above discussions of cap-zones 303 are also applicable to the cap-zone 303 shown in FIG. 5A and in FIG. 5B. In some embodiments, a selected cap-zone 303 may comprise a continuous areal geological layer of variable thickness that has the property to prevent the upward migration of fluid or other material from the below located waste repository zone (e.g., horizontal-wellbore(s) 501 within deep geologic formation 403) and past the above located selected cap-zone 303. In some embodiments, a given cap-zone 303 may be selected during (or after) the drilling process of the vertical-wellbore 301 based on the analysis of the well logging data which may have indicated that the selected cap-zone 303 (that vertical-wellbore 301 passed through during drilling formation) may be adequate for sealing, blocking, preventing, prohibiting, and/or mitigating upwards fluid from fluids/materials located below that selected cap-zone 303 (once the region of vertical-wellbore 301 that passed through that selected cap-zone 303 is sealed as taught herein). In some embodiments a single selected cap-zone 303 may be adequate for sealing off below located waste 407 materials. In actual practice, several possible cap-zones 303 may be available above a given horizontal-wellbore 501 within deep geologic formation 403, especially when multiple sedimentary rock formations have been deposited sequentially over geological time in a geological basin above deep geologic formation 403. In some embodiments, a possible such cap-zone 303 may be selected based on the petrophysical analysis routinely done in drilling operations (e.g., done during vertical-wellbore 301 formation). In some embodiments, a selected cap-zone 303 may have: an adequate thickness (as noted below and/or as noted in the discussion of FIG. 4A); lowest vertical permeability (as compared to other candidate cap-zones 303 above that particular deep geologic formation 403); and largest areal (x,y) extent to encompass the horizontal-wellbore(s) 501 there below (as compared to other candidate cap-zones 303 above that particular deep geologic formation 403).

Continuing discussing FIG. 5A, in some embodiments, a selected cap-zone 303 may comprise a geological layer that has the ability to prevent, block, restrict, prohibit, and/or mitigate the upwards migration of fluids or other materials (including waste 407 materials) from the horizontal-wellbore(s) 501 within the below deep geologic formation 403 getting past that selected cap-zone 303. In some embodiments, cap-zone 303 may be located between 1,000 feet and 10,000 feet below the terrestrial surface 207. In some embodiments, cap-zone 303 vertical thickness may be between ten (10) feet and 100 feet thick, +/- five (5) feet. In some embodiments, the adequate vertical thickness for cap-zone 303 may be at least ten (10) feet; and/or the adequate vertical thickness for cap-zone 303 may be at least two (2) feet taller than downhole in-well heater 315. Tight or relatively impermeable sedimentary rock formations like shales or the like may be selected as a given cap-zone 303 for subsequent implementation of the melted and cooled continuous geologic seal 321 located within that selected cap-zone 303. These shale zones have permeability values that are many thousand times less than common sandstone or other rock formations normally encountered in oil and gas exploration and development. For example, and without limiting the scope of the present invention, most deep shales exhibit between 0.001 mD and 0.0001 mD (millidarcy) permeability values. In some embodiments, a shale permeability of at least 0.001 mD may be sufficient for use as a selected cap-zone 303. In some embodiments, a shale permeability of at least 0.0001 mD may be sufficient for use as a selected cap-zone 303.

In some embodiments, formation of continuous geologic seal 321 with is surrounding selected cap-zone 303, via melting and cooling of the pyro-metamorphic processes illustrated herein, the cooled (resolidified and/or re-crystallized) metamorphosed products may resemble those of the industrial sintered-rock processes; and in these industrial sintered-rock processes, the final resultant of the melt are products that are essentially impermeable with reported porosities less than 0.09%.

It should be stressed herein that in this patent application, a given shale formation that is selected for use as a given cap-zone 303, is not being used to store or dispose of (nuclear and/or radioactive) waste therein, as some nuclear waste disposal researchers have suggested. Rather, and in contrast, the tight shale formations discussed herein, is being selected to provide and function as a cap-zone 303 barrier to prevent upwards migration of the waste 407 from the repository system 501 getting past the selected cap-zone 303. Additionally, the given shale formation that is selected for use as a given cap-zone 303, is not being used herein to extract oil, gas, and/or other materials out of.

Continuing discussing FIG. 5A, in some embodiments, physical and mechanical modifications may be made in the interface between the vertical-wellbore 301 and the selected cap-zone 303 that the vertical-wellbore 301 passes through. These modifications may make the selected cap-zone 303 closure (melting and cooling) operations easier, more efficient, stronger, and/or the like. See e.g., the above discussion of FIG. 3A and its radial-hole(s) 307. In some embodiments, two or more radial-holes 307 may be jet drilled (or the like), using surface drill systems, into the selected cap-zone 303 rock by routine jet drilling operations and from the interface with the vertical-wellbore 301. In some embodiments, these radial-holes 307 may provide conduits for melted fill-material 311 to flow into during the melting operations. In some embodiments, these radial-holes 307 flow channels may provide the hot melt 311 distribution and enhanced high temperature conduction needed to make the overall rock melting process more efficient and/or resulting in a continuous geologic seal 321 that is more thoroughly integrated into its immediately surrounding cap-zone 303 rock matrix. In some embodiments, radial-hole(s) 307 may be from two (2) to three (3) inches in diameter, +/− one (1) inch. In some embodiments, radial-hole(s) 307 may extend five (5) feet, +/− one-half (0.5) feet, laterally (horizontally) into the selected cap-zone 303 from vertical-wellbore 301. In some embodiments, the downhole in-well jet drilling equipment may be removed from the vertical-wellbore 301 once the radial-hole(s) 307 have been formed within the selected cap-zone 303.

Furthermore, in some embodiments, the two or more radial-holes 307 may be equidistant circumferentially disposed around the vertical-wellbore 301, within the selected cap-zone 303, at selected vertical locations. In some embodiments, the two or more radial-holes 307 may be (equidistant) circumferentially disposed around the vertical-wellbore 301, within the selected cap-zone 303, at selected vertical locations; which in some embodiments, may be similar to the arrangement shown in FIG. 1D for oil conveying radial holes 121. In some embodiments, radial-hole(s) 307 may allow melted cap zone fluid 311 to more easily move away from the vertical-wellbore 301 zone further into the rock matrix of the selected cap-zone 303. By moving further into the rock matrix of the selected cap-zone 303, the melted cap zone material 311 may aid in increasing the overall melt-zone 319 (heated-zone 325) volume; and may contribute to a faster heating of the rock matrix of the selected cap-zone 303 adjacent to the vertical-wellbore 301. This increased and wider melt-zone 319 (heated-zone 325) volume in the selected cap-zone 303 may provide a more effective fluid and migratory seal when the melt zone material 321 finally cools and recrystallizes (see e.g., FIG. 3D).

Continuing discussing FIG. 5A, in some embodiments, after the jet drilling operations within the vertical-wellbore 301 have formed the radial-hole(s) 307, then at least some portions of the (steel) casing 305, within that selected cap-zone 303 and towards the rock matrix of that selected cap-zone 303, may be milled out (reamed out), removing those portions of casing 305, to provide a direct contact between at least some of the vertical-wellbore 301 and that selected cap-zone 303 rock. See e.g., FIG. 3B. This now open hole section of void-volume 309 may allow the crushed fill-material 311 which is placed in the vertical-wellbore 301 later, to be in direct physical contact with the selected cap-zone 303 rock. In some embodiments, operationally, it may be beneficial and/or desirable to perform the mill out (ream out) processes that result in void-volume 309, after the radial (and lateral) jet drilling operations that form the radial-hole(s) 307, because the presence of the wellbore casing 305 provides mechanical support for the jet drilling equipment and/or for better/more efficient radial (and lateral) jetting operations.

Continuing discussing FIG. 5A, in some embodiments, the interface at the vertical-wellbore 301 and the native intact cap-zone 303 rock is void-volume 309. In some embodiments, a vertical height of void-volume 309 may be as large or slightly larger than a vertical height of the downhole in-well heater 315. In some embodiments, void-volume 309 may need only to be as large as the milled-out (reamed out) section of vertical-wellbore 301 casing 305 discussed above. The reaming operation, to form void-volume 309, may provide an enlarged cylindrical space/volume which may be later filled by crushed cap rock material 311. In some embodiments, void-volume 309 may enlarge the vertical-wellbore 301 to 1.5 times the original vertical-wellbore 301 diameter size. In some embodiments, void-volume 309 diameter may be between two (2) and three (3) times a diameter of vertical-wellbore 301. In some embodiments, the crushed rock material 311 may later fill this reamed out void-volume 309 (along with downhole in-well heater 315).

Continuing discussing FIG. 5A, in some embodiments, the downhole in-well heater 315 may be lowered into vertical-wellbore 301 to be located within void-volume 309 of the selected cap-zone 303. In some embodiments, the downhole in-well heater 315 may be axially centrally located within void-volume 309 of the selected cap-zone 303. In some embodiments, a particular placement location (e.g., height/vertical position) of the downhole in-well heater 315 within void-volume 309 of the selected cap-zone 303, may be determined by finite element computer simulation modelling and temperature profile (isotherms) analysis of the selected cap-zone 303 during heating, melting, and cooling operations as discussed earlier in FIG. 3D to FIG. 3F. In some embodiments, an optimal downhole in-well heater 315 position selection within void-volume 309 of the selected cap-zone 303 (e.g., from the finite element computer simulation modelling and temperature profile [isotherms] analysis), may make the overall heating, melting, and/or cooling operation(s) more efficient and provide a resulting cap-zone 303 system which when cooled, provides the resulting cap-zone 303 system that may block waste 407 from moving past that resulting cap-zone 303 system.

Continuing discussing FIG. 5A, in some embodiments, the downhole in-well heater 315 may be lowered into the wellbore 301 via its attached cable 317. In some embodiments, cable 317 may be connected to the power supply 409 on the terrestrial surface 207 (and to the downhole in-well heater 315). In some embodiments, the downhole in-well heater 315 may have a sinker weight to keep cable 317 in tension. In some embodiments, cable 317 may have a rapid disconnect or break-away device which allows the downhole in-well heater 315 to be jettisoned after the heat/melt operations are terminated. In some embodiments, the downhole in-well heater 315 may permanently remain inside the cooled melt (e.g., as shown in FIG. 5B, FIG. 4B, and/or in FIG. 3D).

Continuing discussing FIG. 5A, in some embodiments, the melt-zone 319 may develop during the heating process and extend areally and vertically to form a continuum of melted material 311/321. It is contemplated that this melt-zone 319 may re-crystallize and completely seal the below deeply located human-made horizontal-wellbore 501 (within deep geologic formation 403) from above the selected cap-zone 303 by forming a continuous solid rock zone that now is distributed across the selected cap-zone 303 section completely. Furthermore, by controllably cooling the melt-zone 319, for example, by monitoring the downhole in-well heater 315 behavior, recrystallization of the melt-zone 319 may occur in a manner which may provide a resulting solid rock matrix that is extremely impermeable to fluids; and thus, a near perfect geologic seal at the selected cap-zone 303 between terrestrial surface 207 and human-made horizontal-wellbore 501 within deep geologic formation 403.

FIG. 5B shows the same (nuclear and/or radioactive) waste repository sealing system 500 for the waste repository that may comprise at least one human-made horizontal-wellbore 501 (SuperLAT) that is entirely located within a deep geologic formation 403, from the same schematic cross-sectional side view of FIG. 5A; except, FIG. 5B is shown further out in time from FIG. 5A, where melt-zone 319 has cooled sufficiently for the rock materials to fuse, resolidify, and/or recrystallize such that the geologic seal 321 is now integrally fused with its immediately surrounding cap-zone 303 rock matrix. In terms of timing with respect to the melting or cooling process, FIG. 5B is shown at a point in time that is the same or after the timing shown in FIG. 3D. FIG. 5B may not be to scale.

FIG. 5B may illustrate when the rock melting/cooling processes have been completed and sufficiently cooled. In some embodiments, once the rock melting/cooling processes have been completed and sufficiently cooled, then downhole in-well heater 315 may be disconnected from its cable 317; and cable 317 may be removed from vertical-wellbore 301 above the used/implemented cap-zone 303. In some embodiments, once the rock melting/cooling processes have been completed and sufficiently cooled, then downhole in-well heater 315 may remain within cooled, solid, and crystallized geologic seal 321. Note, downhole in-well heater 315 is only shown in FIG. 5B to illustrate the permanent retention of downhole in-well heater 315 within cooled, solid, and crystallized geologic seal 321; however, in reality, downhole in-well heater 315 may be entirely surrounded by cooled, solid, and crystallized geologic seal 321 material. In some embodiments, the used/implemented cap-zone 303 region may now comprise a continuous rock layer, region, and/or section of melted, cooled, resolidified, and recrystallized rock material of both fill-material 311 and of native intact cap-zone 303 rock material that was melted and fused to the fill-material 311. In some embodiments, vertical-wellbore 301 may be interrupted by this used/implemented cap-zone 303 region. In some embodiments, this used/implemented cap-zone 303 region may prevent, block, prohibit, restrict, and/or mitigate upwards movement of waste 407 from human-made horizontal-wellbore 501 (within deep geologic formation 403) getting past this fluid impermeable region of used/implemented cap-zone 303.

Continuing discussing FIG. 5B, in some embodiments, the given vertical wellbore 301 may be additionally sealed off (closed off) above the modified cap-zone 303 region by implementation of at least one upper-plug 413 (e.g., as discussed below in FIG. 6 and/or step 637). In some embodiments, structurally, from a material of construction perspective, and/or as to how implemented, upper-plug 413 may be the same or substantially the same as lower-plug 313; except that, upper-plug 413 may be located above a given cap-zone 303 and lower-plug 313 may be located below that cap-zone 303. Additionally, upper-plug 413 may be implemented at different times from implementing lower-plug 313. In some embodiments, upper-plug 413 may be emplaced within vertical-wellbore 301 after downhole in-well heater 315 has melted backfilled fill-material 311 to at least some of immediately adjacent cap-zone 303 rock material. In some embodiments, upper-plug 413 may be emplaced within vertical-wellbore 301 after the timing of FIG. 5A has completed and at least begun to cool. In some embodiments, upper-plug 413 may be emplaced within vertical-wellbore 301 after the timing of FIG. 3D has commenced or completed. In some embodiments, upper-plug 413 may be emplaced within vertical-wellbore 301 after cable 317 has been removed from vertical-wellbore 301.

Note, it may be desirable to dispose (store) waste 407 within waste-capsules in horizontal-wellbore(s) 501 versus vertical wellbores as is done in some prior art.

FIG. 6 may depict a flowchart. FIG. 6 may depict a method 600. FIG. 6 may depict at least some steps of method 600. In some embodiments, method 600 may be a method of (geologically) sealing a given (nuclear and/or radioactive) waste repository. In some embodiments, method 600 may be a method of (geologically) sealing a given (nuclear and/or radioactive) waste repository such that waste 407 within the given waste repository is prevented, restricted, blocked, prohibited, and/or mitigated from migrating upwards past a selected and modified cap-zone 303 that is located vertically above that given waste repository with waste 407. The given waste repositories (e.g., human-made cavern(s) 401 and/or human-made horizontal-wellbore(s) 501) are always located within a given deep geologic formation 403. And the selected and modified cap-zone 303 is always located above that deep geologic formation 403. In some embodiments, method 600 may be a method of implementing and/or executing system 400 and/or system 500. Recall system 400 may be a system of sealing a (nuclear and/or radioactive) waste repository; and system 500 may be a system of sealing a (nuclear and/or radioactive) waste repository. System 400 may comprise and/or utilize at least one human-made cavern 401 located within a given deep geologic formation 403 (see e.g., FIG. 4A and FIG. 4B for system 400). System 500 may comprise and/or utilize at least one human-made horizontal-wellbore 501 located within a given deep geologic formation 403 (see e.g., FIG. 5A and FIG. 5B for system 500).

Continuing discussing FIG. 6, in some embodiments, method 600 may be a method for disposing of radioactive waste 407 material(s) within human-made cavern(s) 401 and/or within horizontal-wellbore(s) 501; wherein either or both of the human-made cavern(s) 401 and/or the horizontal-wellbore(s) 501 are located within deep geologic formation(s) 403. In some embodiments, method 600 may be a method for sealing a given selected cap-zone 303 above the given waste repository system (above deep geologic formation 403) to limit, prevent, restrict, stop, block, prohibit, and/or mitigate the upwards migration of waste 407 away from the waste repository zone/formation 403. Implementation of method 600 limits, prevents, restricts, stops, blocks, prohibits, and/or mitigates waste 407 from moving upwards past the selected and modified cap-zone 303. The selected and modified cap-zone 303 acts as physical and impermeable barrier to waste 407 over geologic time periods. In some embodiments, method 600 may be a method for heating a selected and modified cap-zone 303 located vertically above the waste repository system to melt and fuse fill-material 311 to the native and intact rock of that selected and modified cap-zone 303 through a pyro-metamorphic process. In some embodiments, method 600 may be a method for selecting a cap-zone 303 vertically above the waste repository system to limit, stop, restrict, block, prevent, prohibit, and/or mitigate the upwards migration of waste 407 away from the waste repository formation zone 403.

Continuing discussing FIG. 6, in some embodiments, method 600 may be a method for disposing of HLW produced/generated from nuclear operations and/or produced from other radioactive sources, within human-made cavern(s) 401 that are located within deep geologic formation(s) 403. In some embodiments, method 600 may be a method of disposing of LLW in at least one (1) human-made cavern 401 that is located within at least one (1) deep geologic formation 403. In some embodiments, method 600 may be a method for disposing of HLW produced/generated from nuclear operations and/or produced from other radioactive sources, within horizontal-wellbore(s) 501 that are located within deep geologic formation(s) 403. In some embodiments, method 600 may be a method of locating, geomechanically modelling, and/or selecting an appropriate a deep geologic formation 403 of appropriate properties needed for efficient and safe disposal of waste 407 into human-made cavern(s) 401 and/or in human-made horizontal-wellbore(s) 501; wherein human-made cavern(s) 401 and/or human-made horizontal-wellbore(s) 501 are entirely within a deep geologic formation 403. In some embodiments, method 600 may be a method of "landing" or loading waste 407 into human-made cavern(s) 401. In some embodiments, method 600 may be a method of "landing" or loading at least capsule containing waste 407 into human-made horizontal-wellbore(s) 501.

Continuing discussing FIG. 6, in some embodiments, method 600 may be a method of constructing at least one (1) radial-hole 307 into a cap-zone 303 by jet drilling (or the like). In some embodiments, method 600 may be a method of constructing at least one (1) radial-hole 307 into sidewall of intact native rock of a cored section/region of a cap-zone 303 by jet drilling (or the like). In some embodiments, method 600 may be a method of milling out (reaming out) and/or removing the (steel) casing 305 in vertical-wellbore 301 where radial-hole(s) 307 may be located. In some embodiments, method 600 may be a method of milling out (reaming out) and/or removing at least some of the (steel) casing 305 in vertical-wellbore 301 within/at the selected cap-zone 303 to form void-volume 309. In some embodiments, method 600 may be a method of selectively reaming out (milling out) and/or selectively radially enlarging a section of the vertical-wellbore 301 into the cap-zone 303 to form enlarged (extended) void-volume 309. In some embodiments, method 600 may be a method of crushing cap-zone 303 rock 311 and adding at least one chemical additive to the fill-material 311, to aid in the melt process. In some embodiments, method 600 may be a method of loading, inserting, landing, placing, filling, and/or the like the crushed fill-material 311, with the at least one chemical, into the vertical-wellbore 301, into the void-volume 309. In some embodiments, method 600 may be a method of heating a cap-zone 303 to a point where rock of that cap-zone 303 melts. In some embodiments, method 600 may be a method of managing the downhole in-well heater 315 operation to control the heating, melting, fusing, and/or cooling processes in the selected and modified cap-zone 303.

Continuing discussing FIG. 6, in some embodiments, method 600 may comprise at least one (or one or more) of the following steps: 601, 603, 605, 607, 609, 611, 613, 615, 617, 619, 621, 623, 625, 627, 629, 631, 633, 635, 637, portions thereof, combinations thereof, and/or the like. In some embodiments, at least one such step may be optional, skipped, and/or repeated. In some embodiments, some such steps may be executed out of numerical order, with respect to these reference numerals of these steps. In some embodiments, method 600 need not start/begin with step 601. In some embodiments, method 600 may be start/begin with a step other than step 601, such as, but not limited to, step 603, step 605, step 607, step 609, step 611, step 613, step 615, step 617, portions thereof, combinations thereof, and/or the like.

Continuing discussing FIG. 6, in some embodiments, step 601 may be a step of forming at least some of vertical-wellbore 301 into at least one candidate cap-zone 303; forming vertical-wellbore 301 from a terrestrial surface 207 well-head 411 and down into a directly vertically below deep geologic formation 403 and through at least one candidate cap-zone 303; and/or of selecting a waste repository type (e.g., at least one horizontal-wellbore 501 and/or at least one human-made cavern 401) to implement directly vertically below the terrestrial surface 207 well-head 411 in the deep geologic formation 403. In some embodiments, vertical-wellbore 301 may be initiated as a pilot well at well-head 411 or a pilot well may be initially drilled near a planned well-head 411 for vertical-wellbore 301, prior to drilling vertical-wellbore 301. Logging and/or coring of the pilot well and/or vertical-wellbore 301 drilling may confirm the presence of one or more acceptable cap-zone(s) 303 that vertical-wellbore 301 passes through. In some embodiments, one or more drill-rig(s) 405 may be used to form the pilot well(s), vertical-wellbore(s) 301, human-made cavern(s) 401, and/or horizontal-well-bore(s) 501. In some embodiments, step 601 may comprise at least one preparatory subtasks, such as, but not limited to: selecting an appropriate waste repository type, be it human-made cavern(s) 401 and/or horizontal-wellbore(s) 501; drilling at least some of vertical-wellbore 301 into at least one candidate cap-zone 303; drilling vertical-wellbore 301 at well-head 411 from terrestrial surface 207, into deep geologic formation 403, and through at least one candidate cap-zone 303; selecting at least one cap-zone 303 (located between terrestrial surface 207 and deep geologic formation 403); portions thereof; combinations thereof; and/or the like. With respect to selecting at least one cap-zone 303, petrophysical properties of candidate cap-zone(s) 303 may be evaluated, such as, but not limited to, permeability, thickness (e.g., a ten foot minimum thickness in some embodiments), and its ability to confine fluids and mitigate migration upwards from the below located repository zone 403. In some embodiments, execution of step 601 may progress method 600 to step 603.

Continuing discussing FIG. 6, in some embodiments, step 603 may be a step of keeping cored samples of the selected cap-zone(s) 303 and/or of the candidate cap-zone(s) 303. In some embodiments, in executing step 601, formation of vertical-wellbore 301 may cause portion(s) of vertical-wellbore 301 to pass through at least one candidate cap-zone 303, wherein a core sample from that candidate cap-zone 303 may be "cut" (generated); and/or in drilling at least one pilot hole, a core sample from a candidate cap-zone 303 may be generated. In some embodiments, in step 603, such core sample(s) of candidate cap-zone(s) 303 rock material may be kept for later use in other step(s) of method 600. In some embodiments, one or more cores of candidate cap-zone(s) 303 rock material may be (geologically and/or petrophysically) analyzed to confirm the selection of the step 601 selected cap-zone 303; or to select a candidate cap-zone 303 as the at least one selected cap-zone 303. In some embodiments, in step 603 a coring operation is made during the vertical drilling operation (of step 601) across one or more candidate cap-zone(s) 303. In this coring operation, the drill bit may be replaced by a core barrel and a vertical core made of a section of the one or more candidate cap-zone(s) 303. In some embodiments, these one or more candidate cap-zone(s) 303 rock specimen may be analyzed in a typical geological/rock lab to determine the physical properties and the behavior of these rock samples under thermal stress and heating operations, as well as, permeability properties. In some embodiments, at least some of the one or more candidate cap-zone(s) 303 rock specimen may be kept to be crushed and/or pelletized into fill-material 311 for later use in method 600, such as, but not limited to, step 625. In some embodiments, execution of step 603 may progress method 600 to step 605, to step 607, and/or to step 625.

Continuing discussing FIG. 6, in some embodiments, step 605 may be a step of (computer) modeling thermal behavior of the selected cap-zone 303. In some embodiments, in step 605 the core samples (from step 603) are analyzed more rigorously by conducting melt tests and other thermal experiments to fully characterize the rock behavior under heating melting and cooling processes. In some embodiments, in this step 605 a fully developed numerical computer model may be created to allow additional analysis and to provide an operational template that may be used to controllably operate the downhole in-well heater 315 in other step(s) of method 600 (such as, step 631 and/or step 633). In some embodiments, execution of step 605 may yield a thermal behavioral computer model of the at least one cap-zone 303 developed from a core sample of the at least one cap-zone 303, such that formation of fractures and/or fissures are minimized within the modified cap-zone during the step 633 (step (g)) cooling. Note, alphabetically enumerated steps, such as, but not limited to, step (g) are steps that may be appears in the claims.

Note, if this analysis determines that the formerly selected cap-zone 303 has insufficient melting and/or permeability properties, then portions of step 601 and/or 603 may be repeated to select another/different cap-zone 303. In some embodiments, execution of step 605 may progress method 600 to step 603 (e.g., if a different cap-zone 303 may be selected) or to step 607 and/or to step 631.

Continuing discussing FIG. 6, in some embodiments, step 607 may be a step of completing formation of vertical-wellbore 301, including, but not limited to, drilling into deep geologic formation 403 and casing at least some of vertical-wellbore 301 with casing 305. In some embodiments, in step 607 the drilling operations for the vertical-wellbore 301 may be completed. This operational process may generally be referred to as "completion" in the field, and may involve the installation of (steel) casing(s) 305 either singly or as multiple concentric casing 305 strings with cement annuli between the (steel) casing 305 and the bare/native rock walls of the formations that vertical-wellbore 301 passes through and/or into. In some embodiments, upon completing step 607, vertical-wellbore 301 may reach from terrestrial surface 207 at well-head 411 and into deep geologic formation 403; and most of vertical-wellbore 301 may be cased with casing(s) 305. In some embodiments, casings 305 may help to protect wellbore, provide structural rigidity to wellbores, and/or facilitate easier movement of materials through the wellbores. In some embodiments, a size and/or a length of vertical-wellbore 301 and its (steel) casing 305 may be selected to meet applicable regulatory requirements; to provide sufficient dimensional clearance/capacity for the various types of nuclear waste 407 forms to be inserted and/or moved therein; to protect the wellbores; to protect the formations external to the casings 305 from materials (e.g., waste 407) within the wellbores; and/or to provide structural strength to the sidewalls of the wellbores. In some embodiments, a completed vertical-wellbore 301 penetrates at least one cap-zone 303 and enters (or penetrates) at least one deep geologic repository zone formation 403. In some embodiments, execution of step 607 may progress method 600 to step 609 and/or to step 611.

Continuing discussing FIG. 6, in some embodiments, step 609 may be a step of forming at least one substantially (mostly) horizontal-wellbore 501 within deep geologic formation 403 from a distal portion of vertical-wellbore 301 (that is vertically disposed away from terrestrial surface 207). In some embodiments, in step 609 the SuperLAT(s) system of FIG. 5A may be implemented for disposal waste 407 in horizontal-wellbores 501. See FIG. 5A and its above discussion. In some embodiments, execution of step 609 may progress method 600 to step 613. In some embodiments, step 613 may be a step of landing (loading, inserting, placing, and/or the like) waste 407 into horizontal-wellbore(s) 501 within deep geologic formation 403, from terrestrial surface 207 using vertical-wellbore 301 as means of reaching horizontal-well-bore(s) 501. In some embodiments, execution of step 613 may progress method 600 to step 617.

Continuing discussing FIG. 6, in some embodiments, step 611 may be a step of forming at least one human-made cavern 401 within deep geologic formation 403 from a distal portion of vertical-wellbore 301 (that is vertically disposed away from terrestrial surface 207). In some embodiments, in step 611 the SuperSILO(s) system of FIG. 4A may be implemented for waste 407 disposal in human-made cavern 401. See FIG. 4A and its above discussion. In some embodiments, execution of step 611 may progress method 600 to step 615. In some embodiments, step 615 may be a step of landing (loading, inserting, placing, and/or the like) waste 407 into human-made cavern 401 within deep geologic formation 403, from terrestrial surface 207 using vertical-wellbore 301 as means of reaching human-made cavern 401. In some embodiments, execution of step 615 may progress method 600 to step 617.

Continuing discussing FIG. 6, in some embodiments, step 617 may be a step of installing at least one lower-plug 313 below the selected cap-zone 303 and above the human-made cavern(s) 401 and/or above the horizontal-wellbore 501, within vertical-wellbore 301. In some embodiments, in step 617 one or more physical and discrete (separate) plugs 313 may be installed within vertical-wellbore 301 above the waste 407 located in the human-made cavern(s) 401 and/or located in the horizontal-wellbore(s) 501. In some embodiments, in step 617 the one or more physical and discrete (separate) plugs 313 may also be installed/located within vertical-wellbore 301 below selected cap-zone 303. In some embodiments, lower-plug(s) 313 (and upper-plug(s) 413) may be a "packer" type device commonly present and used in the oil well industry. In some embodiments, lower-plug(s) 313 may have a dual purpose. First, lower-plug(s) 313 may temporarily seal vertical-wellbore 301 to prevent waste 407 upwards migration for a few hundred years. However, because waste 407 may be dangerous for much longer than a few hundred years, plug(s) 313 and/or 413 may be insufficient at preventing upwards migration of waste 407 over the time period where waste 407 may be dangerous. It should be pointed out that plug(s) 313 and/or 413 are not considered to be the major contributor to waste 407 upwards migration mitigation in the waste disposal process shown, described, taught, and discussed herein. Plug(s) 313 and/or 413 may be reliable for a few hundred years only. The second purpose for lower-plug 313 is to provide a physical floor, base, and/or blockage within vertical-wellbore 301, below or within selected cap-zone 303, to receive and support fill-material 311 and downhole in-well heater 315 on top of lower-plug 313 before melting and fusing operations removes the load from lower-plug 313. In some embodiments, execution of step 617 may progress method 600 to step 619, to step 621, and/or to step 623.

Continuing discussing FIG. 6, in some embodiments, step 619 may be a step of forming the at least one (or the at least two) radial-hole(s) 307 in a lateral/horizontal direction, as compared to the direction of vertical-wellbore 301, and into the rock material of the at least one selected cap-zone 303, using the jet drilling equipment (or the like) and the assistance of drill-rig 405 (or the like) on terrestrial surface 207. The direction of this radial-hole(s) 307 drilling is from portion(s) of vertical-wellbore 301 within the selected cap-zone 303 and towards the rock of the selected cap-zone 303. In some embodiments, casing 305 is not removed from these portion(s) of vertical-wellbore 301 before this lateral/horizontal jet drilling is commenced; i.e., the jet drilling may drill, bore, and/or cut through any casing 305 in front of the operating jet drilling nozzle/cutting apparatus. In some embodiments, in step 619 a jet drill (or the like) process may be implemented at selected locations of vertical-wellbore 301 that are within the selected cap-zone 303 by using surface driven high pressure jet systems common in the oil industry. In some embodiments, in step 619 multiple (plurality and/or two or more) radial-holes 307 may be circumferentially jetted into the rock of the selected cap-zone 303 to a radial (horizontal/lateral) distance up to five (5) feet, +/− one-half (0.5) foot. In some embodiments, radial-hole(s) 307 may permit melted rock (such as, but not limited to, melted fill-material 311) in its melted fluid state to move away more easily and more quickly from the vertical-wellbore 301 zone and further into the interior of the rock matrix of the selected cap-zone 303 that horizontally and radially surrounds the void-volume 309; and by doing so may accelerate the overall melting process and thus the growth of the melt-zone 319. Recall and/or see FIG. 3A and its above discussion that pertains for forming radial-hole(s) 307 into the rock of the selected cap-zone 303 from vertical-wellbore 301. In some embodiments, execution of step 619 may progress method 600 to step 621 and/or to step 629.

Continuing discussing FIG. 6, in some embodiments, step 621 may be a step of forming the void-volume 309 within a portion of vertical-wellbore 301 that is located within the selected cap-zone 303. In some embodiments, in executing step 621 at least some of the casing 305 of vertical-wellbore 301 that is within the selected cap-zone 303 may be removed. Such casing 305 removal may be done by milling, reaming, and/or the like operations originating from within the portion/section/region of vertical-wellbore 301 where casing 305 is to be removed and moving radially outwards towards the selected cap-zone 303. Once this casing 305 has been removed, then a cylindrical void-volume 309 is formed within the selected cap-zone 303, with the vertical-wellbore 301 running both above and below this void-volume 309. In terms of the vertical height of casing 305 material removed, in some embodiments, a minimum of ten (10) feet of casing 305 is removed and/or a height of casing 305 is removed that is two (2) feet longer than the height of downhole in-well heater 315. For example, and without limiting the scope of the present invention, consider a given selected cap-zone 303 that is 100 hundred feet thick in vertical extent and so the portion of initially cased vertical-wellbore 301 that runs through that selected cap-zone 303 is also then 100 feet; but when some of that casing 305 is removed only ten (10) to twelve (12) vertical feet of that casing 305 may be removed, leaving the remaining eighty-eight (88) to ninety (90) feet of vertical-wellbore 301 within that selected cap-zone 303 still cased. Once this casing 305 is removed, void-volume 309 will have a diameter that is larger than an inside diameter of cased sections of vertical-wellbore 301 that are adjacent, proximate, and/or next to this selected cap-zone 303. Recall and/or see FIG. 3B which shows and describes this void-volume 309 formation. In some embodiments, void-volume 309 may be further expanded in that same radially outwards direction by removing rock matrix material of the selected cap-zone 303, again via milling, reaming, and/or the like operations. Once this void-volume 309 is further expanded into the rock matrix of the selected cap-zone 303, then this expanded void-volume 309 will have a diameter that is larger than an outside diameter of cased sections of vertical-wellbore 301 that are adjacent, proximate, and/or next to this selected cap-zone 303. See e.g., void-volume in FIG. 3C which shows such an expanded void-volume 309. In some embodiments, in step 621 a vertical section of the vertical-wellbore 301 casing 305 is milled-out (reamed-out) mechanically to lay bare the interfacing selected cap-zone 303 rock face. Execution of step 621 may result in formation of cylindrical void-volume 309. Such milling (reaming) is an operation that is a standard and routine operation in oil well operations to remove casing sections, or downhole equipment that may be stuck in the given wellbore. In some embodiments, once the applicable casing 305 has been removed to form void-volume 309, then a selected portion of the selected cap-zone 303 rock may be reamed out or enlarged radially by a reaming tool to form enlarged/extended/expanded void-volume 309. In some embodiments, this reamed-out enlarged/extended/expanded void-volume 309 may increase the radius to about three (3) times the original vertical-wellbore 301 radius; and/or up to thirty-six (36) inches, +/− six (6) inches in radius for enlarged/extended/expanded void-volume 309. It is contemplated that later on in step(s) of method 600, that the reamed-out enlarged/extended/expanded void-volume 309 may be filled with crushed core fill-material 311 with additive chemical(s) and with the downhole in-well heater 315 before the melt process proceeds. In some embodiments, execution of step 621 may progress method 600 to step 629.

Continuing discussing FIG. 6, in some embodiments, step 623 may be a step of picking, selecting, and/or determining a vertical position location within an axial center of void-volume 309 to place downhole in-well heater 315 for subsequent melting operations. In some embodiments, step 623 may select the middle vertical positional location of void-volume 309 to locate the downhole in-well heater 315 during melting operations, i.e., the vertical middle of down-hole in-well heater 315 may coincide with the vertical middle of void-volume 309. When void-volume 309 and/or the vertical thickness of the selected cap-zone 303 may be about the same as the height of downhole in-well heater 315 or a few feet taller than downhole in-well heater 315, then downhole in-well heater 315 may simply be placed vertically in the middle of that void-volume 309. However, when void-volume 309 may be more than just a few feet taller than downhole in-well heater 315, then a vertical positional location for placing downhole in-well heater 315 within that (relatively) taller void-volume 309 may need to be picked, selected, and/or determined. In some embodiments, in step 623 a vertical positional location for the downhole in-well heater 315 may be picked, selected, and/or determined by computer modelling and analysis of the physical dimensions and rock properties of the selected cap-zone 303. In some embodiments, the vertical positional location for the down-hole in-well heater 315 with respect to the vertical extent of the selected cap-zone 303 and/or the void-volume 309, may be made to maximize melt process efficiency and to allow an optimal 3D growth and development of the melt-zone 319 around the void-volume 309 to adequately seal the modified cap-zone 303. It is contemplated that this downhole in-well heater 315 vertical positional location pick, selection, and/or determination may be a result of computer simulation modelling and historical experience and/or historical operational knowhow. In some embodiments, execution of step 623 may progress method 600 to step 625 and/or to step 629.

Continuing discussing FIG. 6, in some embodiments, step 625 may be a step of crushing, breaking, smashing, grinding, grounding, pulverizing, pelletizing, and/or the like the core rock materials extracted from the selected cap-zone 303 (and/or from candidate cap-zone(s) 303) obtained (and saved) in step 603 (and/or in step 601). Execution of step 625 may regenerate fill-material 311. In some embodiments, fill-material 311 may be the rock materials from cap-zone 303 (e.g., from coring operations) that have been crushed, broken, smashed, ground, pulverized, pelletized, and/or the like. In some embodiments, after executing step 625 these rock materials (e.g., fill-material 311) of cap-zone 303 may be one-half (0.5) inch or less in any direction. For example, and without limiting the scope of the present invention, a given core sample of cap-zone 303 rock may be from three (3) to four (4) inches in diameter and ten (10) feet or more in vertical height and such a rock core sample may be outputted as fill-material 311 of one-half (0.5) inch or less in any direction via step 625. In some embodiments, fill-material 311 may comprise rocks sized of one-half (0.5) inch or less in any direction; and such dimensions of fill-material 311 rocks may facilitate: movement of fill-material 311 rocks through vertical-wellbore 301 to void-volume 309; filling (backfilling) void-volume 309 with fill-material 311; and/or ease/efficiency of melting of fill-material 311 and/or fusing of fill-material 311 to the native, intact, but melted, rock of cap-zone 303. In some embodiments, execution of step 625 may progress method 600 to step 627 and/or to step 629.

Continuing discussing FIG. 6, in some embodiments, step 627 may be a step of adding and/or mixing at least one chemical additive to the fill-material 311 rocks outputted from step 625. In some embodiments, the at least one chemical additive added to and/or mixed into the fill-material 311 may be configured to act as a flux during the melt process. In some embodiments, these chemical additive(s) may behave operationally as a flux. In some embodiments, these chemical additive(s) may aid in the melt process by promoting fluidity, by making the melting process more efficient, and/or in some cases lowering the rock material melt temperature. In some embodiments, the chemical additive may comprise at least one of: calcium carbonate ($CaCO_3$), magnesium oxide (MgO), iron oxide ($Fe_2O_3$), alumina, silica, borax, portions thereof, combinations thereof, and/or the like. In some embodiments, an appropriate chemical additive may be determined from small scale laboratory experimentation. In some embodiments, a series of laboratory melt tests may be initiated to optimize the gravimetric combinations of these additive chemical(s) in/with fill-material 311. In some embodiments, the chemical additive may be added as a percentage (e.g., by mass and/or weight) of the total crushed rock material mixture; and may be in the range of 10% to 30% for calcium carbonate, 5% to 10% for magnesium oxide, and/or 2% to 5% for iron oxide. In some embodiments, the chemical additive(s) may be added to and/or mixed with the crushed cap-zone 303 rock material to form the fill-material 311 while on terrestrial surface 207. It is contemplated that in this step 627 a select group of at least one chemical additive(s) may be added to the crushed/pelletized rock 311 to act as a flux during the melt process. Recall and/or see FIG. 3C and its above discussion regarding the at least one (one or more) chemical additives added to fill-material 311. In some embodiments, execution of step 627 may progress method 600 to step 629.

Continuing discussing FIG. 6, in some embodiments, step 629 may be a step of landing the downhole in-well heater 315 at the selected vertical positional location within an axial center of void-volume 309 (e.g., as selected from step 623), above lower-plug 313, and then also filling (backfilling) around landed downhole in-well heater 315 with the fill-material 311 (from step 625 and/or step 627), such that downhole in-well heater 315 is completely surrounded by fill-material 311. In some embodiments, cable 317 may be (removably) attached to the downhole in-well heater 315 and may run from landed downhole in-well heater 315 to a location on terrestrial surface 207, such as, but not limited to, power-source 409. In some embodiments, in step 629 the combined rock and chemical additive(s) mixture of fill-material 311 and the downhole in-well heater 315 are inserted into vertical-wellbore 301 and landed at a select cap-zone 303 at a particular selected vertical position location, above lower-plug 313, within void-volume 309. In some embodiments, cable 317 may be used to lower down-hole in-well heater 315 within vertical-wellbore 301 and/or void-volume 309. In some embodiments, cable 317 may be used to power downhole in-well heater 315 within void-volume 309. In some embodiments, the downhole in-well heater 315 may be axially/radially centrally positioned within an axial center of void-volume 309 by two or more centralizers (not shown); wherein such centralizers are commonly used to center downhole devices in wellbores in the oil industry. In some embodiments, downhole in-well heater 315 may comprise and/or have attached one or more weighted sinker(s) to counteract buoyancy of downhole in-well heater 315 from being within surrounding rock that is in a fluid melt state. In some embodiments, weighted sinker(s) of downhole in-well heater 315 may keep downhole in-well heater 315 in its selected vertical position location within void-volume 309 during active melt operations and/or may keep cable 317 under tension during active melt operations. Such weighted sinkers are routinely in rod pumping oil wells to keep pump rods in tension. In some embodiments, fill-material 311 once filled into void-volume 309 and surrounding landed downhole in-well heater 315, may vertically cover downhole in-well heater 315 by at least five (5) vertical feet, +/− one-half (½) foot above. Note, after execution of step 629 void-volume 309 is no longer void, but filled. In some embodiments, execution of step 629 may progress method 600 to step 631.

Continuing discussing FIG. 6, in some embodiments, step 631 may be a step of active melting operations by power-source 409, via cable 317, providing power to downhole in-well heater 315 to melt fill-material 311, as well as, to melt native intact selected cap-zone 303 rock that is proximate, near, and/or adjacent to fill-material 311. In some embodiments, execution of step 631 may create the melt-zone 319 and as 631 continues the melt-zone 319 may expand further into the selected cap-zone 303. In some embodiments, in step 631, the downhole in-well heater 315 may be energized and controllably run for a preselected (predetermined) time to melt the fill-material 311, as well as, to melt the native intact selected cap-zone 303 rock that is proximate, near, and/or adjacent to fill-material 311 out to a given radial distance within the selected cap-zone 303 from downhole in-well heater 315 that is axially centrally located within void-volume 309. Once fill-material 311 melts, the resulting fluid fill-material 311 may flow into the radial-hole(s) 307, to further this overall melting process. In some embodiments, results from step 605 may provide, yield, and/or determine such predetermined run times and operational temperatures for downhole in-well heater 315. Field studies with a 12 kilowatt (kW) electric heater have reported the temperature at the well bore face of 800° C. within 36 hours of active heating operation. Melting of the rock wall began after 8 days of such heater operation. In some embodiments, fill-material 311 and the native intact selected cap-zone 303 rock may be heated to a temperature selected from a range of 800 degrees Celsius (° C.) to 1700° C. by the downhole in-well heater 315. Field studies may indicate an active heating time period, where downhole in-well heater 315 may be energized, of a few weeks up to ten (10) weeks, +/− five (5) days, depending on the heater heat flow input rate for full melt in melt-zone 319. In some embodiments, execution of step 631 may progress method 600 to step 633.

Continuing discussing FIG. 6, in some embodiments, step 633 may be a step of cooling the melt-zone 319 in a controlled, predictable, and/or known manner, so as to maximize fluid impermeability (minimize fracturing) of the resulting cooled, resolidified, and/or recrystallized melted-material 321 (geologic seal 321) along with portions of selected cap-zone 303 rock that had melted but is now cooled, resolidified, and/or recrystallized. Upon sufficient cooling, fill-material 311 (now referred to as geologic seal 321) will be solid rock again and will have been fused and/or annealed to/with the formerly melted select cap-zone 303 rock, that is now solid again, such that geologic seal 321 is a continuous geologic seal with this radially surrounding select cap-zone 303 rock, such that this overall modified region of select cap-zone 303 has high fluid impermeability (and minimal fracture). In some embodiments, in step 633 the downhole in-well heater 315 may still be energized, controllably, for portions of step 633, such that the rock temperature and rock cooling follow a prescribed curve or cooling phase to provide a resultant geologic seal that has no (or minimal) fissures and/or fractures which may develop on too rapid cooling (quenching) of the melt-zone 319. In some embodiments, as step 633 begins to execute, melt-zone 319 shrinks (get smaller), until eventually there no melt-zone 319 remaining, just rock that has resolidified, recrystallized, fused, and/or annealed. In some embodiments, step 633 (the step (g)) cooling may be conducted in a controlled manner according to a thermal behavioral computer model of the at least one cap-zone 303 developed from a core sample of the at least one cap-zone 303 (see e.g., step 605), such that formation of fractures and/or fissures are minimized within the modified cap-zone during the step (g) (step 633) cooling. In some embodiments, execution of step 633 may progress method 600 to step 635.

Continuing discussing FIG. 6, in some embodiments, step 635 may be a step of removing at least most of cable 317 from vertical-wellbore 301. In some embodiments, the initial mechanical connection between cable 317 and the downhole in-well heater 315 may be an intentionally releasable connection, i.e., a form of quick-release connection. In some embodiments, in step 635 a distal portion of cable 317 may be separated and/or detached from the downhole in-well heater 315. At this point, the downhole in-well heater 315 may be permanently stuck, entombed, and/or encapsulated within geologic seal 321 (i.e., within former void-volume 309 and/or former melt-zone 319). In some embodiments, the downhole in-well heater 315 may permanently remain within geologic seal 321; i.e., the downhole in-well heater 315 may be disposable. In some embodiments, in step 635 the downhole in-well heater 315 and the heater cable 317 may be separated from each other, cable 317 removed from vertical-wellbore 301, and the now jettisoned the downhole in-well heater 315 may be left entombed in geologic seal 321 (i.e., within former void-volume 309 and/or former melt-zone 319). In some embodiments, execution of step 635 may progress method 600 to step 637.

Continuing discussing FIG. 6, in some embodiments, step 637 may be a step of installing one or more upper-plug(s) 413 above geologic seal 321 within vertical-wellbore 301. In some embodiments, after step 633, the (step (g)) cooling, the method 600 may comprise a step of installing at least one upper-plug 413 within the at least one wellbore 301 at a position that is above the modified cap-zone and below the terrestrial surface 207. In some embodiments, the at least one upper-plug 413 may completely block an interior region of the at least one wellbore 301 at that position. In some embodiments, upper-plugs(s) 413 may be structurally and functionally similar to lower-plug(s) 313, and may be installed in a similar/same manner; however, upper-plugs(s) 413 (if installed) are located in different location(s) of vertical-wellbore 301 as compared to lower-plug(s) 313; and upper-plugs(s) 413 may be installed within vertical-wellbore 301 at different times from when lower-plug(s) 313 are installed within vertical-wellbore 301. In some embodiments, in step 637 vertical-wellbore 301 may be plugged by filling a section vertical-wellbore 301 above geologic seal 321 with cement, drilling mud, and/or bentonite backfill, forming an upper-plug 413. In some embodiments, upper-plug(s) 413 may reach close to terrestrial surface 207 and/or close to well-head 411 in some cases. In some embodiments, installing one or more upper-plug(s) 413 may not be essential with respect to preventing the upward migration of waste 407, such as, but not limited to upwards radionuclide migration. In some embodiments, in step 637 the vertical-wellbore 301 terrestrial surface 207 and/or well-head 411 location may now be marked by a permanent marker on terrestrial surface 207 to complete the disposal and sealing process.

In some embodiments, method 600 may be a method of sealing a waste repository from upwards migration of waste 407 located within the waste repository from migration past a modified cap-zone (geologic seal 321 along with attached select cap-zone 303) located above the waste repository.

Note, alphabetically enumerated steps, such as, but not limited to, step (a) are steps that may be appears in the claims.

In some embodiments, method 600 may comprise a step (a) of installing at least one lower-plug 313 within at least one wellbore 301 at a location that is below at least one cap-zone 303 and above the waste repository. In some embodiments, the at least one lower-plug 313 may completely block an interior portion of the at least one wellbore 301 at that location. See e.g., step 617. In some embodiments, the at least one wellbore 301 runs from a terrestrial surface 207 through the at least one cap-zone 303 and into a deep geologic formation 403, wherein the waste repository is located within the deep geologic formation 403.

In some embodiments, method 600 may further comprise a step (b) of forming at least one radial-hole 307 within the at least one cap-zone 303 from the at least one wellbore 301 using jet drilling equipment. See e.g., step 619.

In some embodiments, method 600 may further comprise a step (c) of removing rock material from the at least one cap-zone 303 in an outward radial direction from a portion of the at least one wellbore 301 that is passing through the at least one cap-zone 303, wherein an output of this step (c) removal is a region of void-volume 309 located within the at least one cap-zone 303. See e.g., step 621.

In some embodiments, method 600 may further comprise a step (d) of landing a downhole in-well heater 315 into the void volume 309. See e.g., step 629.

In some embodiments, method 600 may further comprise a step (e) of filling the void-volume 309 around the downhole in-well heater 315 with crushed rock (fill-material 311) until the downhole in-well heater 315 is completely covered by the crushed rock 311. See e.g., step 629.

In some embodiments, method 600 may further comprise a step (f) of melting rock within a melt-zone 319 by energizing the downhole in-well heater 315. In some embodiments, the melt-zone 319 may comprise the crushed rock 311 within the void-volume 309 and may comprise native intact rock of the at least one cap-zone 303 that is interfacing and adjacent to the crushed rock 311 within the void-volume 309. See e.g., step 631. In some embodiments, after the method 600 has executed the step (0 (step 631) the downhole in-well heater 315 remains within the modified cap-zone.

In some embodiments, during execution of the step (0 (step 631) as the crushed rock 311 within the void-volume 309 is melted into a fluid state, at least some of the fluid state molten crushed rock 311/321 flows into the at least one radial-hole 307 to promote melting of the native intact rock of the at least one cap-zone 303 in a faster manner as compared to if the at least one cap-zone 303 had no such radial-holes 307.

In some embodiments, method 600 may further comprise a step (g) of cooling the melt-zone 319, such that an output of the step (g) cooling is the modified cap-zone. In some embodiments, the modified cap-zone may comprise the crushed rock 311 within the void-volume 309 and the native intact rock of the at least one cap-zone 303 that were formerly melted during the step (f) (step 631) and that are now resolidified and recrystallized. In some embodiments, an exterior radial/circumferential boundary of the modified cap-zone may be (continuously) rock welded, fused, and/or annealed to the at least one cap-zone 303 that surrounds the modified cap-zone. In some embodiments, the modified cap-zone is configured to prevent the upwards migration of the waste 407 and fluids located within the waste repository (or located above the waste repository but below the modified cap-zone) from getting past this modified cap-zone. See e.g., step 633.

In some embodiments, the step (g) (step 633) cooling may be conducted in a controlled manner according to a thermal behavioral computer model of the at least one cap-zone 303 developed from a core sample of the at least one cap-zone 303, such that formation of fractures and/or fissures are minimized within the modified cap-zone during the step (g) (step 633) cooling.

In some embodiments, prior to executing the step (a) (step 617), the method 600 may comprise a step of the forming the waste repository within the deep geologic formation 403. In some embodiments, the deep geologic formation 403 is located below the at least one cap-zone 303. In some embodiments, the forming of the waste repository comprises drilling the at least one wellbore 301 from the terrestrial surface 207, through the at least one cap-zone 303, and into the deep geologic formation 403, and once the at least one wellbore 301 reaches the deep geologic formation 403, then excavating within the deep geologic formation 403 to form the given waste repository. In some embodiments, the given waste repository may comprise and/or may take the form of at least one substantially horizontal running wellbore 501 and/or at least one human-made cavern 401. See e.g., FIG. 4A and FIG. 5A. In some embodiments, after the method 600 has formed the waste repository and prior to executing the step (a) (step 617), the method 600 comprises a step of loading (inserting) at least some of the waste 407 into the waste repository from the terrestrial surface 207 and using the at least one wellbore 301 to reach the given waste repository from the terrestrial surface 207. See e.g., FIG. 4A and FIG. 5A.

Devices, systems, and methods for geologically sealing (and/or closing) a nuclear and/or radioactive waste repository from upwards migration past the geologic seal (modified cap-zone) have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of sealing a waste repository from upwards migration of waste located within the waste repository from migration past a modified cap-zone located above the waste repository, wherein the method comprises steps of:

(a) installing at least one lower-plug within at least one wellbore at a location that is below at least one cap-zone and above the waste repository; wherein the at least one lower-plug completely blocks an interior portion of the at least one wellbore at that location, wherein the at least one wellbore runs from a terrestrial surface through the at least one cap-zone and into a deep geologic formation, wherein the waste repository is located within the deep geologic formation;

(b) forming at least one radial-hole within the at least one cap-zone from the at least one wellbore using jet drilling equipment;

(c) removing rock material from the at least one cap-zone in an outward radial direction from a portion of the at least one wellbore that is passing through the at least one cap-zone, wherein an output of this step (c) removal is a region of void-volume located within the at least one cap-zone;

(d) landing a downhole in-well heater into the void volume;

(e) filling the void-volume around the downhole in-well heater with crushed rock until the downhole in-well heater is completely covered by the crushed rock;

(f) melting rock within a melt-zone by energizing the downhole in-well heater, wherein the melt-zone comprises the crushed rock within the void-volume and native intact rock of the at least one cap-zone that is interfacing and adjacent to the crushed rock within the void-volume; and (g) cooling the melt-zone, such that an output of the step (g) cooling is the modified cap-zone, wherein the modified cap-zone comprises the crushed rock within the void-volume and the native intact rock of the at least one cap-zone that were formerly melted during the step (f) and that are now resolidified and recrystallized, wherein an exterior radial boundary of the modified cap-zone is welded and fused to the at least one cap-zone, wherein the modified cap-zone is configured to prevent the upwards migration of the waste and fluids located within the waste repository from getting past the modified cap-zone.

2. The method according to claim 1, wherein the waste repository comprises at least one substantially horizontal running wellbore and/or at least one human-made cavern.

3. The method according to claim 1, wherein the waste is one or more of: nuclear waste, high-level nuclear waste, spent nuclear fuel waste, low-level radioactive waste, radioactive waste, radionucleotide waste, hazardous waste, dangerous waste, derivatives thereof, and/or byproducts thereof.

4. The method according to claim 1, wherein the deep geologic formation is located at a minimum depth from 2,000 feet to 12,000 feet, plus or minus 1,000 feet, below terrestrial surface.

5. The method according to claim 1, wherein the deep geologic formation is igneous rock, metamorphic rock, tight shale, portions thereof, and/or combinations thereof.

6. The method according to claim 1, wherein the at least one wellbore runs in a substantially vertical direction from the terrestrial surface to the deep geologic formation, wherein this substantially vertical direction is at least mostly parallel with a local gravitational vector at a well head of the at least one wellbore located at the terrestrial surface.

7. The method according to claim 1, wherein the at least one cap-zone is always a separate and distinct geologic formation with respect to the deep geologic formation.

8. The method according to claim 1, wherein the at least one cap-zone is always located above the deep geologic formation and below the terrestrial surface.

9. The method according to claim 1, wherein the at least one cap-zone is at least one sedimentary rock formation.

10. The method according to claim 1, wherein the at least one cap-zone is at least one sedimentary rock formation with a maximum permeability of 0.01 millidarcy (mD).

11. The method according to claim 1, wherein the at least one wellbore is lined with casing to isolate the at least one wellbore from formations that surround the at least one wellbore.

12. The method according to claim 11, wherein in executing the step (b), the jet drilling equipment first bores through a portion of the casing before forming the at least one radial-hole within the at least one cap-zone.

13. The method according to claim 11, wherein after executing the step (b) and prior to executing the step (c), the method comprises a step of removing the casing from at least a section of the portion of the at least one wellbore that is passing through the at least one cap-zone.

14. The method according to claim 1, wherein the at least one radial-hole runs in a direction that is substantially orthogonal to a direction that the at least one wellbore runs in.

15. The method according to claim 1, wherein the crushed rock is obtained from at least one core sample taken from the at least one cap-zone.

16. The method according to claim 1, wherein prior to executing the step (e) the method comprises a step of mixing with the crushed rock at least one chemical additive, wherein the at least one chemical additive is configured to function as a flux during the step (f).

17. The method according to claim 1, wherein during execution of the step (f) as the crushed rock within the void-volume is melted into a fluid state, at least some of the fluid state molten crushed rock flows into the at least one radial-hole to promote melting of the native intact rock of the at least one cap-zone in a faster manner as compared to if the at least one cap-zone had no such radial-holes.

18. The method according to claim 1, wherein after the method has executed the step (f) the downhole in-well heater remains within the modified cap-zone.

19. The method according to claim 1, wherein the step (g) cooling is conducted in a controlled manner according to a thermal behavioral computer model of the at least one cap-zone developed from a core sample of the at least one cap-zone, such that formation of fractures and/or fissures are minimized within the modified cap-zone during the step (g) cooling.

20. The method according to claim 1, wherein after the step (g) cooling, the method comprises a step of installing at least one upper-plug within the at least one wellbore at a position that is above the modified cap-zone and below the terrestrial surface; wherein the at least one upper-plug completely blocks an interior region of the at least one wellbore at that position.

21. The method according to claim 1, wherein prior to executing the step (a), the method comprises a step of the forming the waste repository within the deep geologic formation, wherein the deep geologic formation is located below the at least one cap-zone, wherein the forming of the waste repository comprises drilling the at least one wellbore from the terrestrial surface, through the at least one cap-zone, and into the deep geologic formation, and once the at least one wellbore reaches the deep geologic formation excavating within the deep geologic formation to form the waste repository.

22. The method according to claim 21, wherein after the method has formed the waste repository and prior to executing the step (a), the method comprises a step of loading at least some of the waste into the waste repository from the terrestrial surface and using the at least one wellbore to reach the waste repository from the terrestrial surface.

* * * * *